(12) United States Patent
Venkata et al.

(10) Patent No.: US 12,216,673 B2
(45) Date of Patent: Feb. 4, 2025

(54) TECHNIQUES FOR SEMANTIC SEARCHING

(71) Applicant: Oracle International Corporation, Redwood Shores, CA (US)

(72) Inventors: Ananth Venkata, San Ramon, CA (US); Satish Gopalakrishna, Fremont, CA (US); Jacques Vigeant, Fort Lauderdale, FL (US); Wai On Lee, Foster City, CA (US); Dustin Bauder, Broomfield, CO (US); Reginald A. Hansbrough, Aurora, IL (US); Narayan Madhavan Nayar, Oak Park, IL (US)

(73) Assignee: Oracle International Corporation, Redwood Shores, CA (US)

( * ) Notice: Subject to any disclaimer, the term of this patent is extended or adjusted under 35 U.S.C. 154(b) by 436 days.

(21) Appl. No.: 16/662,695

(22) Filed: Oct. 24, 2019

(65) Prior Publication Data

US 2020/0117658 A1 Apr. 16, 2020

Related U.S. Application Data

(63) Continuation-in-part of application No. 16/513,459, filed on Jul. 16, 2019, now Pat. No. 11,334,583,
(Continued)

(51) Int. Cl.
*G06F 16/248* (2019.01)
*G06F 16/2453* (2019.01)
*H04N 5/272* (2006.01)

(52) U.S. Cl.
CPC ...... *G06F 16/248* (2019.01); *G06F 16/24534* (2019.01); *H04N 5/272* (2013.01)

(58) Field of Classification Search
CPC .................. G06F 16/248; G06F 16/24534
(Continued)

(56) References Cited

U.S. PATENT DOCUMENTS

| 5,418,948 A | 5/1995 | Turtle |
| 7,047,242 B1 | 5/2006 | Ponte |

(Continued)

FOREIGN PATENT DOCUMENTS

| AU | 2005311621 | | 6/2006 | |
| CA | 2658419 A1 | * | 1/2008 | ........... G06K 7/0008 |

(Continued)

OTHER PUBLICATIONS

"Data Sources for Power BI Service", Microsoft Power BI, Available Online at: //powerbi.microsoft.com/en-us/documentation/powerbi-service-get-data/, 2015, 7 pages.

(Continued)

*Primary Examiner* — Emmanuel L Moise
*Assistant Examiner* — Mariegeorges A Henry
(74) *Attorney, Agent, or Firm* — Kilpatrick Townsend & Stockton LLP

(57) ABSTRACT

Techniques are disclosed for querying, retrieval, and presentation of data. A data analytic system can enable a user to provide input, through a device to query data. The data analytic system can identify the semantic meaning of the input and perform a query based on the semantic meaning. The data analytic system can crawl multiple different sources to determine a logical mapping of data for the index. The index may include one or more subject areas, terms defining those subject areas, and attributes for those terms. The index may enable the data analytic system to perform techniques for matching terms in the query to determine a semantic meaning of the query. The data analytic system can determine a visual representation best suited for displaying (Continued)

results of a query determined by semantic analysis of an input string by a user.

20 Claims, 36 Drawing Sheets

Related U.S. Application Data which is a continuation of application No. 15/297,037, filed on Oct. 18, 2016, now Pat. No. 10,417,247, application No. 16/662,695 is a continuation-in-part of application No. 15/273,567, filed on Sep. 22, 2016, now Pat. No. 10,516,980, said application No. 15/297,037 is a continuation-in-part of application No. 14/861,893, filed on Sep. 22, 2015, now Pat. No. 10,664,488.

(60) Provisional application No. 62/396,088, filed on Sep. 16, 2016, provisional application No. 62/356,471, filed on Jun. 29, 2016, provisional application No. 62/246,031, filed on Oct. 24, 2015, provisional application No. 62/055,402, filed on Sep. 25, 2014.

(58) Field of Classification Search
USPC .......................................................... 707/709
See application file for complete search history.

(56) References Cited

U.S. PATENT DOCUMENTS

| | | | |
|---|---|---|---|
| 7,640,336 B1* | 12/2009 | Lu | H04L 51/212 |
| | | | 709/224 |
| 7,802,195 B2 | 9/2010 | Saul et al. | |
| 8,533,619 B2 | 9/2013 | Baier et al. | |
| 8,719,217 B1* | 5/2014 | Vivalda | G06F 16/283 |
| | | | 707/607 |
| 8,788,514 B1 | 7/2014 | Ramanarayanan et al. | |
| 8,860,727 B2 | 10/2014 | Beers et al. | |
| 8,954,446 B2 | 2/2015 | Vijayan Retnamma et al. | |
| 8,966,386 B2 | 2/2015 | Fok et al. | |
| 9,092,802 B1 | 7/2015 | Akella | |
| 9,098,183 B2 | 8/2015 | Vonshak et al. | |
| 9,292,628 B2 | 3/2016 | Beers et al. | |
| 9,338,652 B1 | 5/2016 | Allen et al. | |
| 9,424,318 B2 | 8/2016 | Anand et al. | |
| 9,501,585 B1* | 11/2016 | Gautam | G06F 16/3328 |
| 9,582,913 B1 | 2/2017 | Kraft et al. | |
| 9,600,528 B2 | 3/2017 | Mackinlay et al. | |
| 9,613,102 B2 | 4/2017 | Anand et al. | |
| 9,654,598 B1* | 5/2017 | Crawford | H04W 4/023 |
| 9,665,641 B1 | 5/2017 | Zhang | |
| 9,858,292 B1 | 1/2018 | Setlur et al. | |
| 9,870,629 B2 | 1/2018 | Cardno et al. | |
| 10,048,854 B2 | 8/2018 | Zhang et al. | |
| 10,417,247 B2 | 9/2019 | Venkata et al. | |
| 2004/0117366 A1* | 6/2004 | Ferrari | G06F 16/3344 |
| 2005/0060286 A1 | 3/2005 | Hansen et al. | |
| 2005/0076085 A1 | 4/2005 | Budd et al. | |
| 2007/0279484 A1 | 12/2007 | Derocher et al. | |
| 2008/0118916 A1 | 5/2008 | Sood et al. | |
| 2008/0233980 A1 | 9/2008 | Englund et al. | |
| 2009/0327263 A1 | 12/2009 | Maghoul | |
| 2010/0057679 A1 | 3/2010 | King et al. | |
| 2010/0070448 A1 | 3/2010 | Omoigui | |
| 2011/0055241 A1 | 3/2011 | Lewis | |
| 2011/0055722 A1* | 3/2011 | Ludwig | G06T 11/206 |
| | | | 715/751 |
| 2011/0081948 A1 | 4/2011 | Shirai et al. | |
| 2011/0123115 A1 | 5/2011 | Lee et al. | |
| 2011/0249900 A1 | 10/2011 | Thoern et al. | |
| 2012/0066602 A1 | 3/2012 | Chai et al. | |
| 2012/0084689 A1 | 4/2012 | Ledet et al. | |
| 2012/0088543 A1 | 4/2012 | Lindner et al. | |
| 2012/0110565 A1 | 5/2012 | O'Sullivan et al. | |
| 2012/0134590 A1 | 5/2012 | Petrou et al. | |
| 2012/0150732 A1* | 6/2012 | Isaacson | G06Q 20/384 |
| | | | 705/39 |
| 2012/0166446 A1 | 6/2012 | Bowman et al. | |
| 2012/0259833 A1 | 10/2012 | Paduroiu | |
| 2012/0289290 A1 | 11/2012 | Chae et al. | |
| 2012/0311074 A1 | 12/2012 | Arini et al. | |
| 2012/0323910 A1 | 12/2012 | Ilyas et al. | |
| 2013/0006904 A1 | 1/2013 | Horvitz et al. | |
| 2013/0042259 A1 | 2/2013 | Urbach | |
| 2013/0113943 A1 | 5/2013 | Wormald et al. | |
| 2013/0117319 A1 | 5/2013 | Soltani et al. | |
| 2014/0033079 A1 | 1/2014 | Sage et al. | |
| 2014/0040977 A1 | 2/2014 | Barton et al. | |
| 2014/0046934 A1 | 2/2014 | Zhou et al. | |
| 2014/0108793 A1 | 4/2014 | Barton et al. | |
| 2014/0165105 A1* | 6/2014 | Mountain | H04N 21/8456 |
| | | | 725/46 |
| 2014/0172408 A1 | 6/2014 | Vukosavljevic et al. | |
| 2015/0012830 A1 | 1/2015 | Choi et al. | |
| 2015/0012854 A1 | 1/2015 | Choi et al. | |
| 2015/0026145 A1 | 1/2015 | Prakash et al. | |
| 2015/0026153 A1 | 1/2015 | Gupta et al. | |
| 2015/0095194 A1 | 4/2015 | Maslovskis | |
| 2015/0138228 A1 | 5/2015 | Lum et al. | |
| 2015/0227632 A1 | 8/2015 | Lunardi et al. | |
| 2015/0242086 A1 | 8/2015 | Mindlin | |
| 2015/0347920 A1 | 12/2015 | Medlock et al. | |
| 2015/0356068 A1 | 12/2015 | Hill et al. | |
| 2015/0365426 A1 | 12/2015 | Henocque | |
| 2016/0012052 A1 | 1/2016 | Zoryn et al. | |
| 2016/0055374 A1 | 2/2016 | Zhang et al. | |
| 2016/0085602 A1 | 3/2016 | Jacobson et al. | |
| 2016/0103801 A1 | 4/2016 | Bortz et al. | |
| 2016/0117072 A1 | 4/2016 | Sharifi et al. | |
| 2016/0306777 A1 | 10/2016 | George et al. | |
| 2016/0371495 A1 | 12/2016 | Bhat et al. | |
| 2016/0381203 A1* | 12/2016 | Winther Jespersen | |
| | | | H04M 1/72469 |
| | | | 455/414.4 |
| 2017/0031825 A1 | 2/2017 | Chen et al. | |
| 2017/0031831 A1 | 2/2017 | Bohra et al. | |
| 2017/0041296 A1 | 2/2017 | Ford et al. | |
| 2017/0160895 A1 | 6/2017 | Hu et al. | |
| 2017/0220633 A1* | 8/2017 | Porath | G06F 9/542 |
| 2017/0221237 A1* | 8/2017 | Pate | G06T 19/00 |
| 2017/0237868 A1 | 8/2017 | Sato | |
| 2017/0242934 A1 | 8/2017 | Bullotta et al. | |
| 2017/0308271 A1 | 10/2017 | Li | |
| 2017/0351708 A1 | 12/2017 | Lahmann et al. | |
| 2017/0357437 A1 | 12/2017 | Peterson et al. | |
| 2018/0069947 A1 | 3/2018 | Antipa et al. | |
| 2018/0121468 A1 | 5/2018 | Setlur et al. | |
| 2018/0150899 A1 | 5/2018 | Waldron et al. | |
| 2018/0335911 A1 | 11/2018 | Nilo et al. | |
| 2018/0335912 A1 | 11/2018 | Nilo et al. | |

FOREIGN PATENT DOCUMENTS

| | | | | |
|---|---|---|---|---|
| WO | WO-9422088 A1 * | 9/1994 | ......... | G06F 13/4022 |
| WO | 2018204696 | 11/2018 | | |

OTHER PUBLICATIONS

"Google Now", Available online at https://en.wikipedia.org/wiki/Google_Now, Oct. 29, 2015, 6 pages.

"Microsoft Power BI (Business Intelligence)", Available online at: //en.wikipedia.org/wiki/Power_BI, Aug. 29, 2016, 2 pages.

"Power BI—Basic Concepts", Microsoft Power BI, Available online at: //powerbi.microsoft.com/en-us/documentation/powerbi-service-basic-concepts/, 2015, 11 pages.

"Power BI Support, Q&A in Power BI", Available online at https://powerbi.microsoft.com/en-us/documentation/powerbi-service-q-and-a/, 2015, 4 pages.

(56) References Cited

OTHER PUBLICATIONS

"Search-Driven Analytics for Humans-Now Anyone Can be Their Own Data Analyst", Thought Spot, Available online at: www.thoughtspot.com, Accessed from Internet at Mar. 10, 2016, 4 pages.

U.S. Appl. No. 14/861,893, "Final Office Action", mailed Jul. 18, 2019, 17 pages.

U.S. Appl. No. 14/861,893, "Final Office Action", mailed Jan. 24, 2018, 18 pages.

U.S. Appl. No. 14/861,893, "Non-Final Office Action", mailed Sep. 11, 2017, 13 pages.

U.S. Appl. No. 14/861,893, "Non-Final Office Action", mailed Jan. 31, 2019, 16 pages.

U.S. Appl. No. 14/861,893, "Third Party Submission", mailed Apr. 10, 2016, 13 pages.

U.S. Appl. No. 15/273,567, "Non-Final Office Action", mailed Sep. 14, 2018, 23 pages.

U.S. Appl. No. 15/273,567, "Non-Final Office Action", mailed Jan. 17, 2019, 25 pages.

U.S. Appl. No. 15/273,567, "Notice of Allowance", mailed Aug. 21, 2019, 16 pages.

U.S. Appl. No. 15/297,037, "Non-Final Office Action", mailed Sep. 21, 2018, 9 pages.

U.S. Appl. No. 15/297,037, "Notice of Allowance", mailed May 8, 2019, 7 pages.

U.S. Appl. No. 15/297,037, "Notice of Allowance", mailed Mar. 4, 2019, 8 pages.

Novet, "Birst Lets You Search Enterprise Data Like You Search Google", VentureBeat, Available online at http://venturebeat.com/2013/12/10/birst-boosts-business-intelligence-with-google-like-search-to-visualize-data/, Dec. 10, 2013, 3 pages.

U.S. Appl. No. 16/513,459, "Non-Final Office Action", mailed Jul. 9, 2021, 10 pages.

\* cited by examiner

TECHNIQUES FOR SEMANTIC SEARCHING

CROSS-REFERENCE TO RELATED APPLICATIONS

The present application claims priority and benefit as follows:
1) The present application is a continuation-in-part of, and claims the benefit and priority from U.S. application Ser. No. 16/513,459, filed Jul. 16, 2019, entitled "TECHNIQUES FOR SEMANTIC SEARCHING," which is a continuation of U.S. application Ser. No. 15/297,037, filed Oct. 18, 2016, entitled "TECHNIQUES FOR SEMANTIC SEARCHING," now U.S. Pat. No. 10,417,247, which in turn is a continuation-in-part application of U.S. application Ser. No. 14/861,893, filed Sep. 22, 2015, entitled "SEMANTIC SEARCHES IN A BUSINESS INTELLIGENCE SYSTEM," which in turn is a non-provisional of and claims the benefit and priority under 35 U.S.C. 119(e) of U.S. Application No. 62/055,402, filed Sep. 25, 2014, entitled "SEMANTIC SEARCHES IN A BUSINESS INTELLIGENCE SYSTEM." U.S. application Ser. No. 15/297,037 also further claims the benefit and priority under 35 U.S.C. 119(e) of U.S. Provisional Application No. 62/356,471, filed Jun. 29, 2016, entitled "TECHNIQUES FOR SEMANTIC SEARCHING," and of U.S. Provisional Application No. 62/396,088, filed Sep. 16, 2016, entitled "TECHNIQUES FOR SEMANTIC SEARCHING."
2) The present application is also a continuation-in-part of U.S. Non-Provisional application Ser. No. 15/273,567, filed Sep. 22, 2016 titled "AUTOMATIC REDISPLAY OF A USER INTERFACE INCLUDING A VISUALIZATION," which claims the benefit and priority under 35 U.S.C. 119(e) of U.S. Provisional Application No. 62/246,031 filed Oct. 24, 2015, entitled "DAY-BY-DAY"."

The entire contents of each of the above-identified patent applications (Ser. Nos. 16/513,459; 15/297,037; 14/861,893; 62/055,402; 62/356,471; 62/396,088; 15/273,567; and 62/246,031) are incorporated herein by reference for all purposes and are considered part of this disclosure.

BACKGROUND

Large computer systems, such as enterprise and cloud computer systems use large, very complex data stores in the form of databases and data warehouses, as examples. These stores are accessible by sophisticated trained users that can produce the requested information by using complex query structures and reports in the vernacular of the databases.

Not all users have sophistication and training to search and access data. These users area comfortable with 'textual searching' or user-friendly interfaces provided by search engines. Large-scale systems do not have the capability to provide the user with this type of access, nor do they produce the responses in a format that the user can understand. Users may not be familiar with terminology to determine terms for a query and an order in which to present those terms. As a result, users may be unable to locate information they seek unless knowing the proper terminology for the source of the data. Computer systems implemented to perform a search may perform endless processing to locate data for a query. The data may not be responsive to a user's query.

Further, with the advent of mobile devices, such as smart phones and tablets, users have become accustomed to accessing data and getting answers wherever they are located. They often demand to input textual questions, even into complex, large, databases and data warehouses, and receive the answers in an easily understandable format. Mobile devices further introduce new challenges for presenting users with choices and results for querying data.

Software for facilitating conveying information is employed in various demanding applications, including general collaboration software, mobile enterprise applications enabling user access to enterprise data, and so on. Such applications often demand user friendly software and accompanying user interfaces that enable efficient and timely content access, delivery, and sharing, and that provide features for interacting with content, mechanisms for selecting and delivering content, and so on.

Efficient user friendly mechanisms for selecting, delivering, and presenting content can be particularly important in enterprise applications, such as mobile Business Intelligence (BI) enterprise applications, where enterprise personnel often demand timely delivery of relevant information organized in readily understandable formats, and where inefficient information access can inhibit informed decision making and associated business growth. Enterprises are particularly motivated to enhance workforce knowledge, thereby enabling improved business decisions.

Conventionally, a BI enterprise application includes enterprise data analysis tools used by data specialists tasked with accessing data from a database and for building reports, charts, graphs, and so on, based on requests from other enterprise personnel. Generally, data specialists will use the BI tools to connect to a database; extract data; then analyze and/or format that data before delivering resulting static reports to other enterprise personnel.

However, such conventional BI applications and associated approaches are often time consuming and require detailed user knowledge of the database architecture or schema. Enterprise personnel must often wait for requested reports to be prepared and delivered by a data specialist. However, untimely content delivery can further inhibit informed decision making. Accordingly, conventional BI applications and associated systems often exhibit friction or inefficiencies between enterprise users and sought content.

BRIEF SUMMARY

In certain embodiments, techniques are provided (e.g., methods, systems, and computer-readable media) for querying, retrieval, and presentation of data. A data analytic system is disclosed that enables a user to provide input, through a device (e.g., a mobile device), to query data. The input may be provided without a syntax of a known language (e.g., English). In some embodiments, the input may include terms defining the query, without a syntax such as articles or other terms that define the terms of the query. The data analytic system can identify the semantic meaning of the input and perform a query based on the identified semantic meaning. Based on the identified semantic meaning, the data analytic system can query one or more data sources to retrieve data responsive to the query. One or more data sources may be searched for responsive data.

The data analytic system may generate an index of data accessible from one or more data sources. The data analytic system can crawl multiple different sources to determine a logical mapping of data for the index. The index may include one or more subject areas, terms defining those subject areas, and attributes for those terms. The index may enable the data analytic system to perform techniques for matching terms in the query to determine a semantic meaning of the query.

In some embodiments, the data analytic system can determine a visual representation best suited for displaying results of a query determined by semantic analysis of an input string by a user. A graphical interface is generated to display the results according to the best-suited visual representation. The visual representation may be chosen based on a user's past behavior in interaction with the data analytic system. The visual representation may be selected based on the number of terms for which data is displayed and the attributes requested to display information about the terms.

In some embodiments, a computer system may implement techniques disclosed herein. The computer system may include a memory coupled to one or more processors, the memory storing instructions, where the instructions, upon execution by the one or more processors, cause the one or more processors to perform one or more methods or operations disclosed herein. In at least one embodiment, the one or more processors and the memory are included in a mobile device. Yet other embodiments relate to systems, consumer devices, computer program products, systems, and machine-readable storage media, which can employ or store instructions to cause methods and operations disclosed herein to be performed.

In some embodiments, a method may include processing an input string as a search query for data from one or more data sources, where the input string is processed to identify a plurality of terms. The method may include performing a first comparison of each of the plurality of terms to a plurality of subject areas in a subject area index. The method may include, based on the comparing, selecting a set of subject areas in the plurality of subject areas, the set of subject areas selected as having a closest match with the plurality of terms. The method may include performing a second comparison of the plurality of terms to a subject area column index based on the selected set of subject areas, the second comparison includes comparing each of the plurality of terms to terms in each of the selected set of subject areas of the subject area column index and to one or more attributes of each of the terms in each of the selected set of subject areas. The method may include, based on the second comparison, selecting one or more terms of the plurality of terms based on a threshold number of terms that match from the plurality of terms. The method may include comparing each of the selected one or more terms to a value for each of the plurality of terms in the selected set of subject areas of the subject area column index. The method may include determining one or more matching terms of the selected one or more terms based on the comparing of the selected one or more terms to the value for each of the plurality of terms in the selected set of subject areas. The method may include generating a query based on the determined one or more matching terms.

In at least one embodiment, processing the input string to identify the plurality of terms includes: tokenizing the input string to identify a set of terms based one or more characters; determining a stem word for each of the set of terms; determining a relationship between any pair of terms in the set of terms; and generating the plurality of terms based on the set of terms and the relationship between any terms in the set of terms.

In some embodiments, the method may include generating one or more first data structures as the subject area column index based on selected the set of subject areas. The subject area column index may have a different plurality of columns for each of the selected set of subject areas. Each of the plurality of columns may be associated with one or more attributes of each of the terms in a subject area. In some embodiments, the method may include generating one or more second data structures having one or more values for each of the one or more attributes for a subject area corresponding to the column in the plurality of columns, where the comparing is performed using the one or more second data structures.

In some embodiments, the one or more matching terms includes a set of terms. Generating the query may include determining an order in the set of terms based on the comparing of the selected one or more terms to the value for each of the plurality of terms in the selected set of subject areas.

In some embodiments, the method may include performing a crawl process based on a crawl configuration. The method may include generating one or more data structures as the subject area index based on the crawl process.

In at least one embodiment, the method includes retrieving the data from one or more data sources based on the query. The query may be different from the search query. The query may have a format of a logical structured query language (SQL). In some embodiments, the method may include identifying one or more dimensions for the one or more matching terms. The method may include using the one or more dimensions, determining a layout for presenting the retrieved data. The method may include generating a graphical interface based on the layout.

An example method facilitates presenting informative, dynamically updating, and interactive User Interface (UI) display screen sections, such as UI cards. The example method includes displaying a UI display screen section within a larger UI display screen; presenting a UI mechanism (e.g., one or more UI controls) that allows specification of a condition (e.g., a bring back condition); determining when the condition is met; and then automatically redisplaying at least a portion of the UI display screen section in response to the determining, resulting in a redisplayed UI display screen section in response to the condition being met.

In a more specific embodiment, the step of determining further includes determining when the condition is met after the UI display screen section has been closed but while software for facilitating implementing the method is running. The UI display screen section includes a listing or feed of plural UI display screen sections, including one or more visualizations displayed within one or more of the UI display screen sections.

The plural UI display screen sections may include (or represent) one or more UI cards suitable for display via a computing device, such as a smartphone. The one or more UI display screen cards may represent an activity feed, wherein each of the one or more UI display screen cards of the feed is automatically selected for display based on usage context information derived, in part, from user interaction with software used to implement the method.

In the specific embodiment, the user interface mechanism (for enabling specification of the bring back condition) includes one or more user interface controls enabling user specification of at least one aspect of the condition. The aspect is based on user-specified context information, such as a particular time, date, contact, location, and so on. The step of determining then involves comparing the user-specified context information with dynamic context information (e.g., context information indicating where the computing device is located, who contacted a user of the computing device, when the user was contacted, what subject matter may be relevant given other context information, and so on) to determine if the user-specified context information matches the dynamic context information, thereby indicating that the condition has been met.

In an alternative example embodiment, the example method further includes automatically specifying the condition (e.g., as opposed to relying solely upon explicit user-specification of the condition) using an inference derived from context information. An inference engine may monitor available context information to generate accurate and timely inferences and associated conditions.

In the alternative example embodiment, the UI display screen section includes an activity feed that includes one or more UI display screen cards with automatically determined content. The automatically determined content may be determined based on context information, e.g., device usage history for an individual user, device usage history for plural users, and so on.

Another specific example embodiment includes receiving a natural language input query representing intrinsic context information (e.g., user-specified or selected context information); accessing dynamic extrinsic context information (e.g., context information that changes or is otherwise subject to change as a user interacts with the computing device); using the intrinsic context information and the extrinsic context information to select and display one or more interactive visualizations; providing one or more UI controls enabling specification of the condition; comparing the condition with extrinsic context information to determine when the condition is met; and when the condition is met, automatically displaying an updated version of the one or more interactive visualizations when software used to implement the method is active, the software used to implement the method including software running on the computing device.

In another specific example embodiment, users may enter queries about data in an abbreviated conversational manner, whereby the system used to implement the method interprets the query and makes decisions about the type and manner of visualizations or other UI cards to present.

In a particular embodiment a user has a home page or dashboard with various UI display screen sections that may include visualizations and accompanying UI controls for enabling user interaction with the visualizations, e.g., for enabling filtering operations, drilling down, pivoting (e.g., changing data axis), changing visualization types, and so on. A list of analytics can be established that dynamically changes, e.g., changes throughout the day based on context information, e.g., context information indicating what the user is doing, who they are communicating with, where they are, and so on.

Accordingly, various embodiments discussed herein may obviate the use of conventional inefficient catalog/directory paradigms or data models that rely upon BI experts to access content (e.g., in response to a request from other enterprise personnel) and then use other tools to generate reports and accompanying analytics. Note that such conventional paradigms often require problematic expertise to browse or navigate complex database structures or catalog hierarchies, and/or to open special tools to generate and manipulate lists of data measures, dimensions, create data filters, and so on.

Various embodiments discussed herein may be implemented via software and accompanying computing environments to learn what, when, where, and who is of interest to a user, i.e., what matters to the user. Timely and informative BI content (e.g., including visualizations, enterprise social network blogs, and so on) can then be delivered when and where needed; real time content can be shared with other users (e.g., nearby users who may follow content on the user's device); information can be dispatched ahead of time (e.g., before important meetings, at specified business locations, on certain dates, when the user is contacted by a particular contact, and so on); and so on. Users may explicitly specify when content is to be displayed or redisplayed and/or the software may automatically infer when to display particular content based on context information.

By enabling such efficient content delivery (e.g., to mobile computing devices, such as smartphones, tablets, laptops, etc.), including automatically delivered content in accordance with context information, attendees of business meetings may have efficient access to relevant, informative, and timely information; may share content using cross-platform collaboration functionality, and so on.

Embodiments may monitor business activities; selectively deliver alerts and other content, and so on, all without requiring users to be database experts or analysts. Accordingly, embodiments may empower enterprise personnel and laypersons to view content in interactive and readily understandable formats, where the content may adjust daily and/or in real time, enhancing situational awareness of the enterprise personnel. The enhanced situational awareness may translate into enhanced overall enterprise decision making, thereby facilitating positive change and enterprise growth.

Hence, certain embodiments discussed herein effectively address a need for user friendly BI analytics usable by a mobile enterprise workforce, which removes friction (e.g., enhances efficiencies) between enterprise users and sought information, without requiring detailed technical expertise, thereby facilitating informed decision making.

A further understanding of the nature and the advantages of particular embodiments disclosed herein may be realized The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 31 illustrates a seventh example UI display screen showing various user options for interacting with content of a selected UI card, including drilling, annotating, sharing a live chart or screen shot thereof, and so on.

FIG. 33 illustrates a ninth example UI display screen showing a pop up window displayed responsive to user selection of the bring back option from the eighth UI display screen of FIG. 32, wherein the pop up window includes user options (e.g., UI controls) for facilitating user specification of bring back conditions, e.g., time, place, when contacted by, and so on.

DETAILED DESCRIPTION

In the following description, for the purposes of explanation, specific details are set forth in order to provide a thorough understanding of embodiments of the present disclosure. However, it will be apparent that various embodiments may be practiced without these specific details. The figures and description are not intended to be restrictive. The computing environment disclosed in the figures is not intended to suggest any limitation as to scope of use or functionality of described embodiments.

In certain embodiments, techniques are provided (e.g., methods and systems) for querying, retrieval, and presentation of data. A data analytic system is disclosed that enables a user to provide input, through a device (e.g., a mobile device), to query data. The input may be provided without a syntax of a known language (e.g., English). In some embodiments, the input may include terms defining the query, without a syntax such as articles or other terms that define the terms of the query. The data analytic system can identify the semantic meaning of the input and perform a query based on the identified semantic meaning. Based on the identified semantic meaning, the data analytic system can query one or more data sources to retrieve data responsive to the query. One or more data sources may be searched for responsive data.

The data analytic system may generate an index of data accessible from one or more data sources. The data analytic system can crawl multiple different sources to determine a logical mapping of data for the index. The index may include one or more subject areas, terms defining those subject areas, and attributes for those terms. The index may enable the data analytic system to perform techniques for matching terms in the query to determine a semantic meaning of the query.

In some embodiments, the data analytic system can determine a visual representation best suited for displaying results of a query determined by semantic analysis of an input string by a user. A graphical interface is generated to display the results according to the best-suited visual representation. The visual representation may be chosen based on a user's past behavior in interaction with the data analytic system. The visual representation may be selected based on the number of terms for which data is displayed and the attributes requested to display information about the terms.

I. High-Level Overview of Data Analytic System

Figure 1:
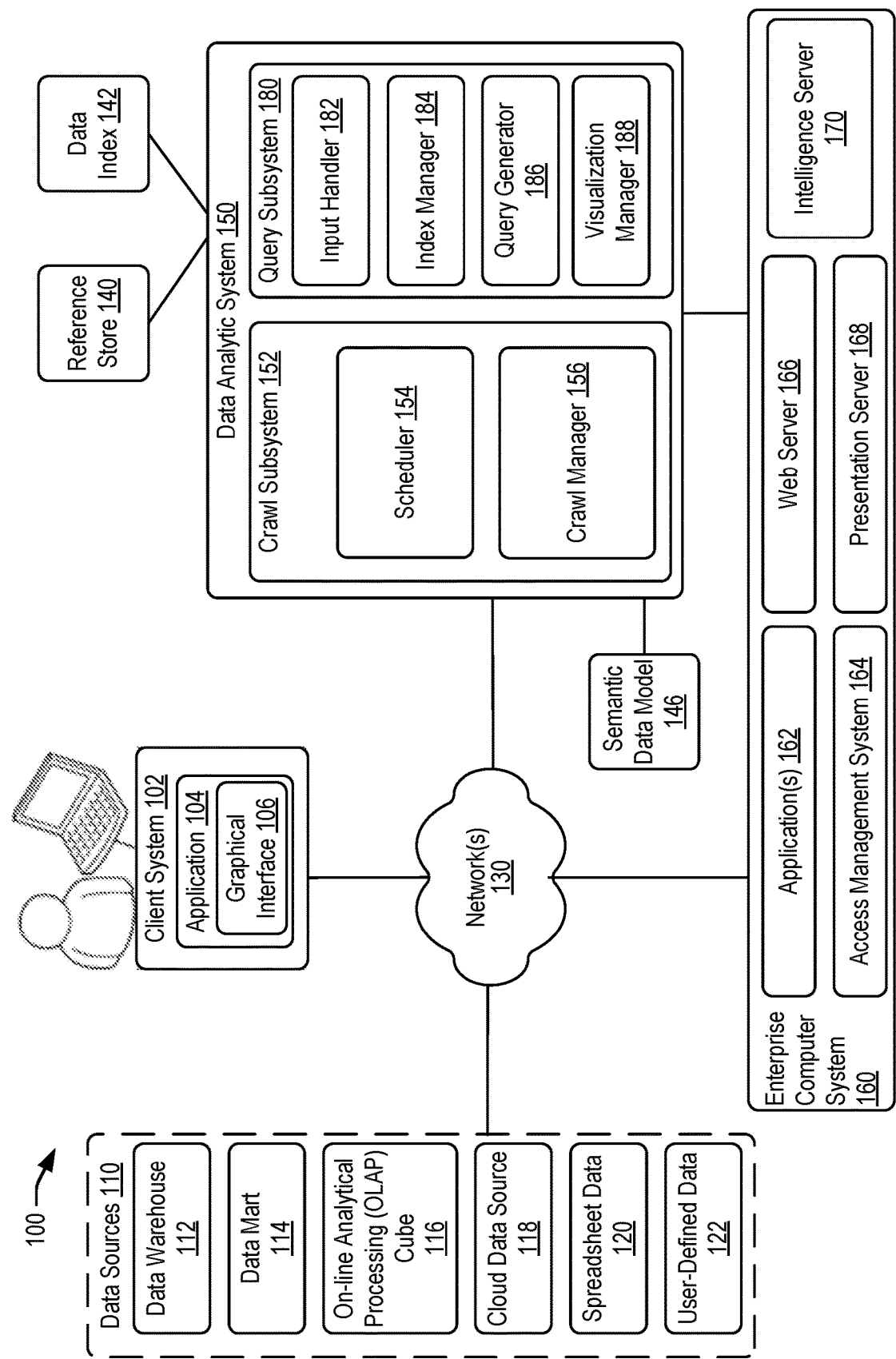
FIG. 1 illustrates a high-level diagram of an architecture for a data analytic system in accordance with an embodiment.

FIG. 1 illustrates an example of a system 100 including a data analytic system (referred to as an "Intelligence Ask System") in accordance with some embodiments. One or more of the disclosed techniques may be implemented in or involve one or more computer systems.

Figure 2:
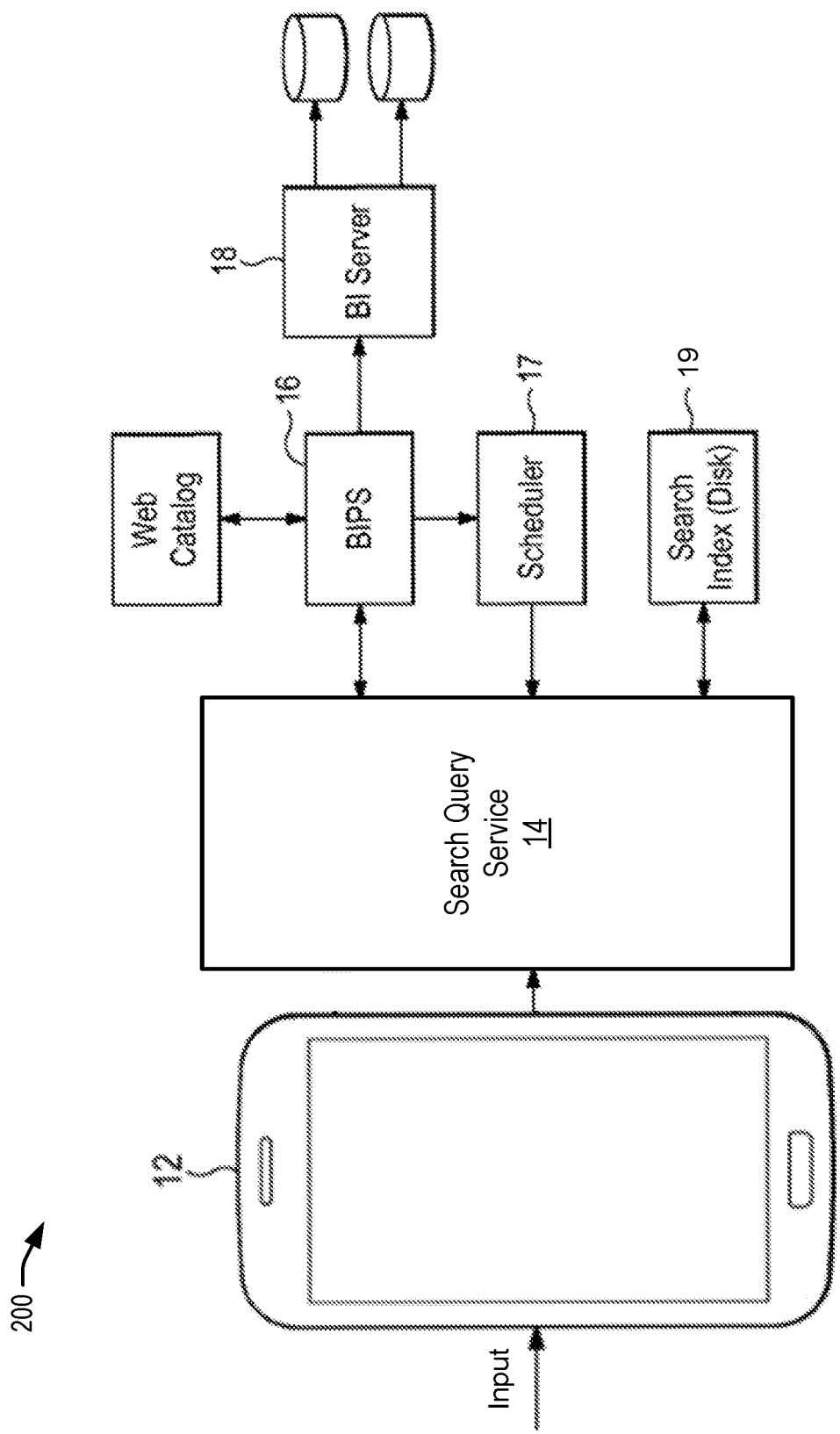
FIG. 2 illustrates a detailed diagram of a data analytic system in accordance with an embodiment.

System 100 may include one or more client systems 102 (referred to herein as "client system" or "client") and data analytic system 150. One example of a client system is a mobile device (e.g., a smartphone) as illustrated in FIG. 2. Client systems may be operated by one or more users. Data analytic system 150 may be implemented by a computer system. Data analytic system 150 may perform operations according to techniques disclosed herein. Specifically, data analytic system 150 may perform operations for querying, retrieving, and/or displaying data accessible from one or more data sources 110. Operations may be performed in response to input received from client system 102. Data analytic system may perform operations to provide services to one or more users through client system 102.

System 100 may include an enterprise computer system 160. Enterprise computer system 160 may provide client systems with access to objects, such as applications (e.g., applications, services, or data. Access to objects may be provided via network 130. In the example shown in FIG. 1, client system 102 may access objects, such as applications and data objects.

Client system 102 may provide an application 104 to access features (which may be provided as services) of data analytic system 150. Client system 102 may access services of data analytic system 150 using application 104. Data analytic system 150 may enable a user to query data from one or more data sources 110. Application 104 may provide one or more graphical interfaces, e.g., graphical interface 106, for receiving input to query data and for displaying the results of the query. In some embodiments, application 104 may enable a user to configure operation of data analytic system 150, such as a crawl configuration for indexing data from data sources 110.

A query processed by data analytic system 150 may be limited to the data accessible to the user providing the input. For example, in an enterprise system, data may be restricted based on a role of the user. In some embodiments, a query may be performed against the data the user requesting the query is permitted to access.

Client system 102, data analytic system 150, data sources 110, and enterprise computer system 160 may be communicatively connected via one or more communication networks 130. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols. In general, communication network 130 may include any communication network or infrastructure that facilitates communications between client systems and computer systems, such as enterprise computer system and data analytic system 150.

Data analytic system 150 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, data analytic system 150 may correspond to a computer system for performing processing as described herein according to an embodiment of the present disclosure. The computing system that makes up data analytic system 150 may run any number of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, data analytic system 150 may be included in or implemented as a service of Business Intelligence provided by Oracle® corporation. In various embodiments, data analytic system 150 may be configured to run one or more services or software applications described in the foregoing disclosure.

In some embodiments, data analytic system 150 may be implemented as an enterprise computing system or a cloud computing system comprising one or more computers and/or servers that may include those described above. For example, data analytic system 150 may be implemented as part of enterprise computer system 160. Data analytic system 150 may include several subsystems and/or modules, including some, which may not be shown. For example, data analytic system 150 may include crawl subsystem 152 and query subsystem 180. Crawl subsystem 152 may include scheduler 154 and crawl manager 156. Query subsystem 180 may include input handler 182, index manager 184, query generator 186, an visualization manager 188. Each of the elements of data analytic system 150 is described in detail further below. Data analytic system 150 may have more or fewer subsystems and/or modules than shown in the figure, may combine two or more subsystems and/or modules, or may have a different configuration or arrangement of subsystems and/or modules. Subsystems and modules of data analytic system 150 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, data analytic system 150 may also provide other services or software applications can include non-virtual and virtual environments. In some embodiments, these services may be offered as web-based or cloud services or under Software as a Service (SaaS) model to the users of client systems. The services offered by data analytic system 150 may include application services. Application services may be provided by data analytic system 150 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in data analytic system 150, which may be implemented as a cloud infrastructure system. Users can acquire the application services without the need for customers to purchase separate licenses and support. Various different SaaS services may be provided. Users operating client systems 102 may in turn utilize one or more applications to interact with data analytic system 150 to utilize the services provided by subsystems and/or modules of data analytic system 150.

Data analytic system 150 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in data analytic system 150 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Data analytic system 150 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, data analytic system 150 may be coupled to or may include one or more data stores, such as reference store 140, data index 142, and semantic data model 146. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. Although depicted as different data stores, more or fewer data stores may be implemented to store data according to the techniques disclosed herein.

System 100 may also include or be coupled to storage, such as data sources 110, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. As an example, data sources 110 may include, without limitation, a data warehouse 112, a data mart 114, an on-line analytical process (OLAP) cube 116, a cloud data source 118, spreadsheet data 120, and user-defined data 122.

Data in any one of the data sources 110 may include data received from an enterprise computer system, data sent to an enterprise computer system, data processed by an enterprise computer system, or combinations thereof. Data may include enterprise data, business data, consumer data, or any other type of data. In certain embodiments, data may include data processed, stored, used, or communicated by an application or a service executing in an enterprise computer system. For example, enterprise data may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, data using representational state transfer (REST) techniques (referred to herein as "RESTful data"), system data, configuration data, synchronization data, or combinations thereof.

In an enterprise computing environment, client systems may communicate with data analytic system 150 to query data and obtain results, which can be viewed at the client systems. Data analytic system 150 may receive queries from client systems. Data analytic system 150 may be configured based on a configuration specified to data analytic system. For example, data analytic system 150 may be configured using techniques disclosed in "Configuration" of Appendix A in U.S. Provisional Application No. 62/055,402, filed Sep. 25, 2014 and entitled "SEMANTIC SEARCHES IN A BUSINESS INTELLIGENCE SYSTEM." Such techniques may enable configuration of a query (e.g., a crawl) as properties defined by one or more criteria in a configuration file.

Crawl subsystem 152 may perform crawl operations to generate data index 142. Data analytic system 150 may create a logical mapping of data in data index. The logical mapping may be stored in semantic data model 146. The semantic data model may be used to determine a mapping of data index 142. The data index 142 may be used for semantic analysis of a query. By generating a data index, a search system can be implemented with reduced storage, such that hundreds of gigabytes of storage can be reduced to a fraction of the storage. By reducing the storage, processing of a computer system implementing a search can be increased as less data will be searched to identify a similarity of terms for semantic analysis. The data index further enables a search system to combine different subject areas or domains of data into a single index, which may be further limited by the access permitted to the group of users. By reducing the storage for data and creating an index of data based on many data sources, multiple data sources may be searched for semantic analysis of text-based query.

Query subsystem 180 to process an input string by a user to determine a semantic meaning of the input string. Data analytic system 150 may process the input string into words and compare those words to data index 142 to determine a closest match for the terms. A semantic meaning of the terms may be determined based on a similarity measure with the terms. Techniques for semantic analysis are described further below. Query subsystem 180 may determine a best-suited visual representation for the results of a query based on the query that is requested.

Enterprise computer system 160 may provide services such as access to applications 162. Enterprise computer system 160 may include an access management system 164, such Oracle Access Manager provided by Oracle® corporation. Access management system 164 may be used to determine a level of access of a user operating client system 102. Access may be defined by one or more levels. One or more roles may be defined for access, which are associated with one or more levels. Enterprise computer system may include web server 166, which handles communications (e.g., requests and responses) internally and externally to enterprise computer system 160. Data analytic system 150 may request access management system 164 to provide access information to enable data analytic system 150 to determine a Enterprise computer system 160 may include presentation server 168. Presentation server 168 may provide a presentation service, such as Business Intelligence Presentation Service (BIPS) provided by Oracle® corporation. Data analytic system 150 may communicate results of a query to presentation server 168. The results may be communicated with a best-suited visual representation for the results. Presentation server 168 can generate a report for display in a graphical interface (e.g., graphical interface 106). The report may indicate the results of the query according to the visual representation. Described below with references to FIGS. 10-17 are examples of techniques for displaying results.

In some embodiments, data analytic system 150 may maintain a presentation mapping in semantic model 146. The presentation mapping may indicate a hierarchy for displaying data. Examples of the presentation mapping are described further with reference to FIG. 9.

Enterprise computer system 160 may include intelligence server computer 170. Intelligence server 170 may provide an intelligence service, such as Oracle Business Intelligence service provided by Oracle® corporation. Data analytic system 150 may communicate with intelligence server 170 to obtain data from one or more data sources. Intelligence server 170 may aggregate data from one or more data sources 110 and a create a physical mapping of data to data sources. Data analytic system 150 can request data from intelligence server 170 for crawling to generate data index 142. In some embodiments, data analytic system 150 may communicate with intelligence server 170 via presentation server 168.

In some embodiments, enterprise computer system 160 may have an interface (e.g., an application programming interface) enabling communication. Enterprise computer system 160, in particular presentation server 168 and intelligence server 170 may support communication using a query language. The query language may be structured, unstructured, or semi-structured. For example, data analytic system 150 may communicate with enterprise computer system 160 using a logical query language. During crawling, data analytic system 150 may request data to build data index 142 by issuing one or more logical queries, each defining a the subject matter for which data is requested. During searching, data analytic system 150 may request data for a query based on a logical query constructed after determining a semantic meaning of a query. Terms defining in data index 142 may be used to identify the data for the subject matter requested.

Through this disclosure, various flowcharts and techniques are disclosed illustrating processes according to some embodiments of the present disclosure. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in the figures may be implemented in software (e.g., code, instructions, program) executed by one or more processing units (e.g., processors cores), hardware, or combinations thereof. For example, data analytic system 150 of FIG. 1 can implement the processes described with reference to any of the figures. Any of the processes may be implemented as a service. In some embodiments, any of the elements in the figures may be implemented with more or fewer subsystems and/or modules than shown in the figure, may combine two or more subsystems and/or modules, or may have a different configuration or arrangement of subsystems and/or modules. Subsystems and modules may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

The particular series of processing steps in the figures is not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, data may be stored using one or more data structures. Data structures may be organized in a variety of ways depending on how, what, and/or where data is stored. Although each of the data structures are shown including particular data, more or fewer data structures may be implemented to store the data. A data structure can include a reference to other data structures. The data structures may be implemented using one or more types of data structures including, without restriction, a linked list, an array, a hashtable, a map, a record, a graph, or other type of data structure. A data structure may be implemented in a hierarchical manner. Each of the data structures may be defined in a declarative manner based on input by a user. The data structures can be defined based on a template, e.g., a template defined based on a markup language, such as Extended Markup Language (XML). A data structure may have one or more formats, also referred to as a document format.

II. Detailed Views of Data Analytic System

FIG. 2 illustrates a detailed diagram of a system 200 in accordance with an embodiment. System 200 may include several subsystems and/or modules of data analytic system 150 and/or enterprise computer system 160 of FIG. 1. Client system 12 (e.g., a mobile device) may be a client system that communicates with data analytic system 150. Data analytic system 150 may provide client system 12 with a search query service 14. Search query service 14 may enable a user operating client system 12 to query data in one or more data sources. Search query service 14 may be provided through an application on client system 12. For example, client system 12 may receive input in the form of a query from a user. Client system 12 may request search query service 14 to perform a search based on the query.

In one embodiment, client system 12 may be provided as a Java® service running in a J2EE environment of data analytic system 150. A user can provide input to client system 12, which is provided to search query service 14. Search query service 14 can process the input to generate one or more queries for data accessible through enterprise computer system 160. The generated queries can be submitted to enterprise computer system 160 to retrieve the data for the user. Search query service 14 may be exposed by data analytic system 150. In particular, search query service 14 may provide an interface for functionality to communicate with BIPS 16, scheduler 17, and search index 19.

In some embodiments, the search query service 14 may generate data in a format based on results obtained from a query. The data may be in a tabular format. Search query service 14 may send a query to BIPS 16, which exposes access to the BI Server 18. BIPS 16 may perform a query on data stored by BI Server 18. BIPS 16 may provide results back to search query service 14. BIPS 16 may also provide search query service with metadata report and interfaces (e.g., dashboards) for presentation of results for a search. Search query service 14 may perform operations disclosed herein as being performed by operations disclosed herein. For example, search query service 14 may perform the algorithms for generating an index for searching. The index may be stored in search index 19.

In some embodiments, data analytic system 150 may include scheduler 17 (e.g., scheduler 154 of FIG. 1). Scheduler 17 may schedule and manage queries performed for the search query service 14. Scheduler 17 may manage operation of data analytic system 150 according to one or more criteria, such as time, date, one or more events, system-defined attributes, user-defined attributes, or a combination thereof. For example, scheduler 17 may be configured to operate based on user input. Input may be provided to configure crawling of data sources to generate a search index 19 of data. Search index 19 may include one or more terms defining a corpus of data.

System 200 may include a presentation server, such as presentation server 168, for providing one or more graphical interfaces for display at client system 14. Presentation server 168 (also referred to as a "presentation layer") may be provided as part of a service, such as a Business Intelligence Presentation Service (BIPS), provided by Oracle® corporation. Input may be received through an interface presented at client system 12. Presentation server 168 may request data analytic system 150 to operate based on input presentation server 168 receives.

Scheduler 17 may operate to initiate operation of crawl manager 156 of FIG. 1 to crawl one or more data sources to build a search index of data 19 to be used by search query service 14 to generate queries based on user input. Search index 19 may be generated by a crawl process, such as the process described with reference to FIGS. 3 and 4. Scheduler 17 may operate based on a schedule indicated by input received from search query service 14. Crawling may be performed based on a crawl configuration. Scheduler 17 may schedule and manage data indexing based on input received from a user. Scheduler 17 may initiate a crawl with to build search index 19.

In some embodiments, a crawl may be initiated by an element other than search query service 14. For example, scheduler 17 of data analytic system 150 might be operated based on input through an interface provided by data analytic system 150. Through the interface, a user (e.g., an administrator) can configure a crawl search process to generate search index 19 based on a schedule independent of user input.

The crawl may include communicating with an intelligence server 18 ("BI Server"), such as intelligence server 170. Search query service 14 may initiate a crawl based on user input. Search query service 14 may initiate a search crawl by communication with BIPS 16 that provides an interface to query BI Server 18 for a search or crawl. A crawl process may include sending queries to intelligence server 18 to using a query language, such as a structured query language (SQL). The query language may be a logical query language to indicate the data to be queried. As described below, intelligence server 18 can maintain a physical mapping of data from one or more data sources. BI server 18 can process a logical query from data analytic system 150 and retrieve data from one or more data sources. In some embodiments, a query for a crawl may be directed to all data accessible for all levels of access so that the crawl is performed to capture all data. The crawl may be performed with a level of access that permits access to all data so that search index is based on all data accessible from data sources. BI Server 18 may initiate a crawl on data sources based on the query received from data analytic system 150. Multiple queries may be submitted to BI server 18 such that BI server 18 performs crawls concurrently.

Once search index 19 has been created, search query service 14 can facilitate a search based on input received from client system 12. Presentation server 16 may provide an interface to receive a search query from search query service 14 based on user input. Search query service 14 can allow a user that does not have a background in a specific language of a data source to perform a textual search of the data to get an answer to a simple query that is not defined by a structured language. In some embodiments, search query service 14 may provide a graphical interface to receive input as a query. For example, a user can provide input such as a 'regular' question. Examples include queries like, "What is the revenue of iPods for the North East in 2011?" or "Compare 2011 Q1 revenue to 2012 Q3." An input string of a query may be processed as disclosed herein to determine one or more terms, such as each word in a query. The terms may be used by a process, such as process 800 of FIG. 8 to generate a query. Search query service 14 may implement process 800 of FIG. 8 to generate a query in a format understandable by presentation server 16. In some embodiments, search query service 14 may indicate a presentation type for displaying the data for the query provided to presentation server 16.

Data analytic system 150 can process the query to search for a result using the search index 19. The search may be performed using techniques disclosed herein, such as the processes described with reference to FIGS. 5 and 8. The data identified as a result of the search may be processed by search query service 14 into a query defined based on the user's input. The query may be provided to presentation server 16, which then communicates with BI server 18 to retrieve the data responsive to the query. Presentation server 16 provides the data in a graphical interface, allowing the user to visualize the answer to the user's input, received in a form of a text-based search. The data may be presented in a graphical visualization to enables the user to understand the data. When a client system is a small device, understanding the data becomes difficult. A graphical visualization of the data enables the user to view the data without limitations of a client system having limited display capabilities.

III. Detailed Views of Crawl Subsystem and Search Subsystem

Figure 3:
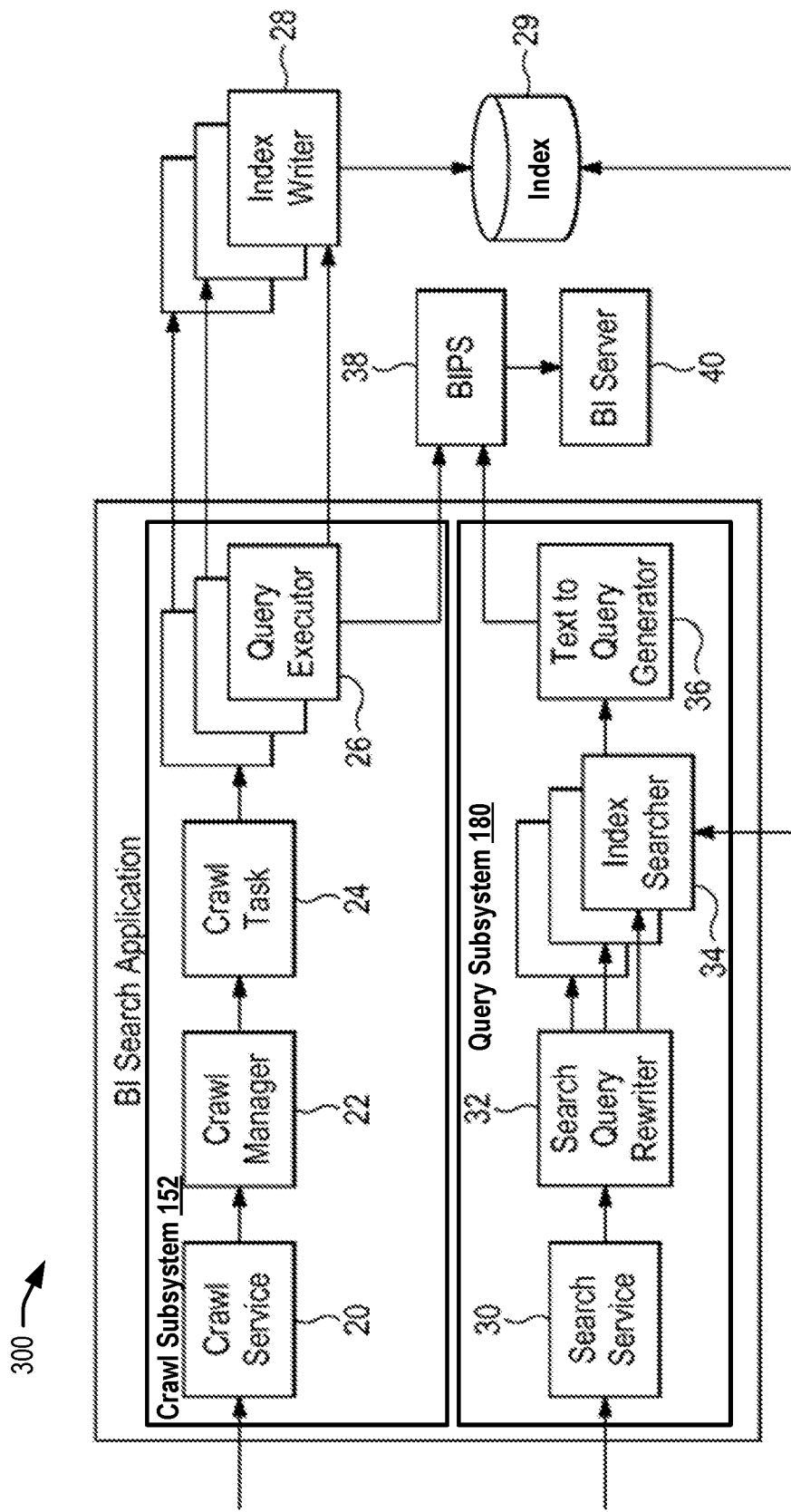
FIG. 3 illustrates a detailed diagram of a data analytic system in accordance with an embodiment.

FIG. 3 illustrates a detailed diagram of a data analytic system 300 in accordance with an embodiment. All or a portion of data analytic system 150 may be included in data analytic system 300. In some embodiments, data analytic system 300 may be implemented as an application executing in data analytic system 150. An example of an application is a business intelligence application ("BI application") provided by Oracle® corporation.

Data analytic system 300 may include crawl subsystem 152 of FIG. 1 and query subsystem 180. Crawl subsystem 152 may provide a crawl service 20. Query subsystem 180 may provide a search service 30. Search service 30 may perform operations described with reference to search query service 14 of FIG. 2. Crawl service 20 and query service 30 may be Java® services running in a Java® platform enterprise environment (e.g., J2EE). The crawl and the query service may be initiated using graphical interfaces, such as those shown in U.S. patent application Ser. No. 14/861,893, filed Sep. 22, 2015 and entitled "SEMANTIC SEARCHES IN A BUSINESS INTELLIGENCE SYSTEM" and U.S. Provisional Application No. 62/055,402, filed Sep. 25, 2014 and entitled "SEMANTIC SEARCHES IN A BUSINESS INTELLIGENCE SYSTEM."

Crawl subsystem 152 may provide crawl service 20 according to a schedule. The schedule may be managed by scheduler 154. The crawl service 20 may invoke a crawl manager 22 included in crawl subsystem 152. Crawl manager 22 may be crawl manager 156 of FIG. 1. Crawl manager 22 can manage the one or more crawls to query data from one or more data sources. Crawl manager 22 may query data to generate an index 29 of the data obtained from one or more data sources. Index 29 may be part of a logical data mapping of a semantic data model. As illustrated and described using techniques and interfaces disclosed in U.S. patent application Ser. No. 14/861,893, filed Sep. 22, 2015 and entitled "SEMANTIC SEARCHES IN A BUSINESS INTELLIGENCE SYSTEM" and U.S. Provisional Application No. 62/055,402, filed Sep. 25, 2014 and entitled "SEMANTIC SEARCHES IN A BUSINESS INTELLIGENCE SYSTEM," a crawl subsystem may be managed and controlled by one or more graphical interfaces. Crawl manager 22 may operate based on input from a user defining one or more crawls. The input may define a schedule for initiating the crawls. A crawl may be defined using a query language, which is structured, unstructured, or semi-structured. A crawl may be defined using any language, such as plain English. In some embodiments, a crawl may be defined as part of automated process to index data from one or more data sources. Crawls may be defined a configuration (e.g. crawl configuration). Embodiments for generating an index of data are described with reference to FIG. 4.

Crawl manager 22 may initiate one or more crawls, each executed as a crawl task, such as crawl task 24. Multiple crawl tasks may be initiated, some of which may run concurrently (i.e., at the same time). The crawl manager 22 may, for example, limit the number of crawls operating simultaneously to one, and set up a queue for the other crawl requests. A crawl task 24 may be initiated by scheduler 154, an automated process that performs a crawl. The progress of a crawl, such as the statistics of number of areas indexed, number of subject area columns indexed, total number data values indexed, etc., may be stored in log files as informational entries. The areas indexed may include metadata, such as measures, dimensions and data members and attributes. Once a crawl has been completed, a user may be notified (e.g., through an interface) using the delivery of a message, success or failure. Further, crawl manager 22 may provide monitoring of the crawl. A user may receive an email indicating that the crawl has begun, with the option of a link to allow the user to stop the crawl. When the crawl completes, another email may notify the user of its completion.

Upon execution, a crawl task may be executed to perform one or more queries of data from one or more data sources. Queries may be executed based on the language or a query defined for the crawl. In some embodiments, crawl subsystem 152 may include a query executor 26. A query executor 26 may convert a query for a crawl task into a language for querying one or more data sources to generate index 29. Index 29 may include a corpus of terms grouped by one or more subject areas. The index 29 may be used by query subsystem 180 to generate a query defined based on the user's input for a search. For example, a query for a crawl task may be converted into a query defined by a logical query language, such as a logical structured query language (logical SQL).

Queries generated by query executor 26 may be executed against one or more data sources. In some embodiments, queries may be issued to a presentation server (e.g., presentation server 168) that provides a presentation service 38, such as BIPS. BIPS 38 may request an intelligence server 40, such as a business intelligence server (BI Server), to execute the query. Intelligence server 40 may be intelligence server 170. BI Server 40 may use a physical data mapping of data sources to execute the query to identify data responsive to the query from one or more data sources. In some embodiments, query executor 26 may send queries directly to a data source. Crawl subsystem 152 may utilize an index writer 28 to index queries and the data responsive to the queries in index 29.

Query subsystem 180 may provide a search service 30 (e.g., search query service 14). Search service 30 may enable a user to search data as an unstructured query. For example, query subsystem 180 allows a user to input 'textual searches' in the form most users are familiar. When a user enters a desired search, a search process converts it to queries and accesses the index of the semantic layer to provide the answers. The search process is further described with references to FIGS. 5 and 8.

In at least one embodiment, query subsystem 180 may receive a request to search. The request may be received via an interface (e.g., a search interface) provided for search service 30. When the users launches the search interface on the user's device, typically a smart phone or other mobile device, that starts the search service 30. The user then inputs a search term or terms, which can be of varying levels of complexity.

Upon receiving a query for search service 30, search query rewriter 32 may perform processing to adjust and/or modify the query for searching index 29. For example, an input defining a query may be processed according to techniques described with reference to FIGS. 5 and 8 to produce a set of terms (e.g., an array of terms) to search index 29. Index searcher 34 of query subsystem 180 may perform a search on index 29 based on the one or more terms output by search query rewriter 32.

Index searcher 34 may perform operations to search index 29 to identify terms matching the closest if not identical to the terms of a query output by search query rewriter 32. Based on the closest terms identified by index searcher 34, index searcher 34 may retrieve the data corresponding to the matching terms in the index. Index searcher 34 may provide output data to generator 36 ("text to query generator"). The output data can be the matching terms and/or the data corresponding to the matching terms.

In some embodiments, generator 36 may perform operations to generate a query from input (e.g., text-based input) received by search service 30. The query may be constructed or assembled based on the matching terms identified by index searcher 34.

Query subsystem 180 may perform operations to selectively determine one or more options for displaying data responsive to the constructed query. For example, query subsystem 180 may determine a visual type for best representing the data responsive to the query. The visual representation may be selected using techniques disclosed herein, such as those described with reference to FIGS. 9-17.

Query subsystem 180 provides the generated query to presentation server 38. Query subsystem 180 may provide the selected visual representation type to presentation server 38. Presentation server 38 may perform operations to request BI server 40 to retrieve data for the query provided by generator 36. BI server 40 may identify and retrieve data responsive to the query received from presentation server 38. BI server 40 provides the retrieved data to presentation server 38, which generates a graphical interface that provides a visual representation of the retrieved data. The visual representation may be determined based on the type of visual representative indicated by generator 36.

IV. Generating a Data Index

Figure 4:
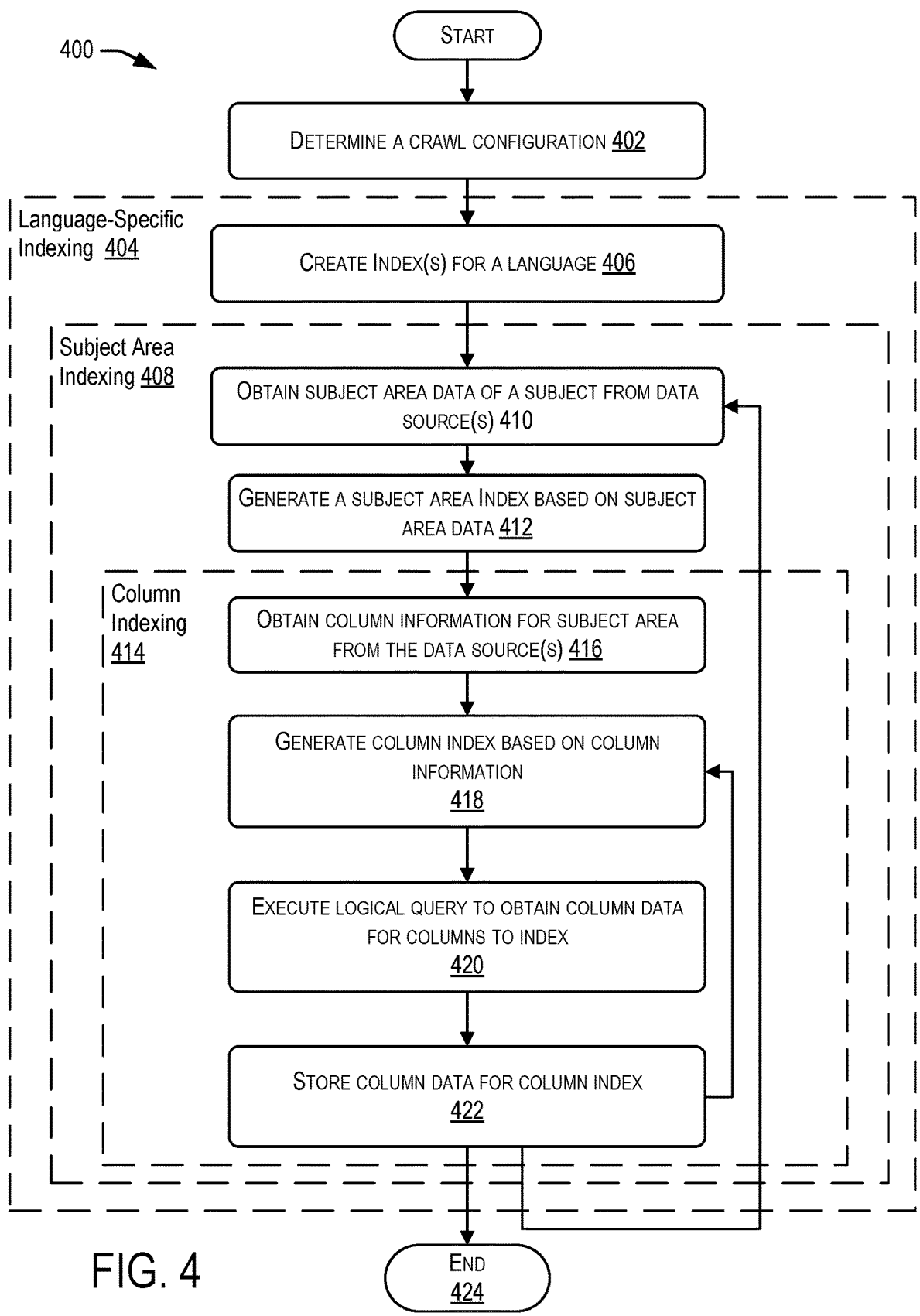
FIG. 4 illustrates a flow diagram of a process for generating a data index in accordance with an embodiment.

FIG. 4 illustrates a flow diagram of a process 400 for generating an index for data according to an embodiment. Specifically, process 400 may be implemented by crawl subsystem 152. A crawl process may be implemented using techniques disclosed in U.S. patent application Ser. No. 14/861,893, filed Sep. 22, 2015 and entitled "SEMANTIC SEARCHES IN A BUSINESS INTELLIGENCE SYSTEM" and U.S. Provisional Application No. 62/055,402, filed Sep. 25, 2014 and entitled "SEMANTIC SEARCHES IN A BUSINESS INTELLIGENCE SYSTEM." For example, Appendix A (Section 4 and 5) of U.S. Provisional Application No. 62/055,402, filed Sep. 25, 2014 and entitled "SEMANTIC SEARCHES IN A BUSINESS INTELLIGENCE SYSTEM" may include crawling and indexing of a semantic layer and client interfaces for performing such operations. Crawl subsystem 152 may implement process 400 to generate a data index (e.g., data index 142) from one or more data sources. An example of data index 142 is described below with reference to FIG. 6. As explained above, semantic data model 146 of FIG. 1 may include a logical mapping for data index 142. The logical mapping may be used by data analytic system 150 to determine a semantic meaning of terms in an input string. Data index 142 may include information about one or more subject areas of data from a corpus of data obtained from one or more data sources. Each subject area may have one or more words, or terms (e.g., entities or terms) having meaning that define data in the subject area. The terms may be associated with one or more attributes about the data for the term, such as a measure, a sum, and other attributes defining a type of information stored for the term. In some embodiments, the attributes may be pre-defined for data associated with the term.

Process 400 may be performed with access permitted at a highest level or greatest level of access for all users of data analytic system 150. For example, the access may be defined for an enterprise with respect to enterprise computer system 160. By generating the data index based on all types of access permitted, the data index can be generated for all data accessible to user for all different levels of access.

Process 400 may be operated based on a configuration defined for data analytic system 150. Process 400 may perform one or more operations (e.g., a crawl) to generate data index 142. The operations may be configured according to a crawl configuration.

Process 400 may include step 402 for determining a crawl configuration. A crawl configuration may be determined at design-time or run-time of data analytic system 150. The crawl configuration may be generated based on input by a user. The input may be received from one or more graphical interfaces, such as those described any of the interfaces disclosed in U.S. patent application Ser. No. 14/861,893, filed Sep. 22, 2015 and entitled "SEMANTIC SEARCHES IN A BUSINESS INTELLIGENCE SYSTEM" and U.S. Provisional Application No. 62/055,402, filed Sep. 25, 2014 and entitled "SEMANTIC SEARCHES IN A BUSINESS INTELLIGENCE SYSTEM." The crawl configuration may include information indicating when to conduct a crawl, how to conduct a crawl, what data sources to read for a crawl, and any other information for performing one or more crawls to generate data index 142. In some embodiments, a crawl configuration may be generated based on user input received at design-time. Step 402 may be performed at run-time during which the crawl configuration is determined by being read.

Process 400 may perform operations 404 to generate data index 142. Data index 142 may include one or more indices, each specific to a different language. Process 400 may perform step 406 to create an index for each different language. A data structure may be generated as an index for a language. An index for a language may include data for multiple different subject areas from one or more different data sources. Creating an index for a language may include performing operations 408 to index different subject areas for the language. For a language, different subject areas may be identified. The steps for process 400 may be performed in part by requesting information from intelligence server 40. Intelligence server 40 may have a physical data mapping of data for one or more data sources. As such, crawl subsystem 152 can communicate with intelligence server 40 to obtain data to generate data index 142.

To perform subject area indexing 408, process 400 may perform step 410, step 412, and operations for column indexing 414. Operations for subject area indexing 408 may be performed for each different subject area. At step 410, data about one or more subject areas is obtained from one or more data sources. For example, one or more data sources may be defined for a particular subject area. The data may include information indicating each of the subject areas, which may cover multiple different industries, departments, products, services, or other aspects in an enterprise. Information about the subject area may be obtained by issuing one or more queries, such as a logical query to identify the subject areas accessible to all users. The query may be communicated to an intelligence server to obtain the subject area mapped from data from one or more data sources. At step 412, a subject area index is generated based on the data obtained for a subject area. The index may be generated as a data structure. Subject area indexing 408 may be repeated for each of the different subject areas identified for a language.

Operations 414 for column indexing may be performed to generate a column index for multiple columns in a subject area. Operations 414 for process 400 include step, 416, step 418, step 420, step 422, and step 424. At step 416, process 400 includes obtaining column information for a subject area. Each subject area may have one or more terms, which are words having a meaning for the subject area. Each column may correspond to a different attribute for terms in the subject area. A column index may be created for each column corresponding to a set of terms for a subject area. Examples of attributes may include a dimension, or facts (e.g., a measure or a value) for the terms having the attribute. Terms may define a subject area. A term could be an attribute associated with a value (e.g., a measure or a metric) or a dimension that describes an aspect of a subject area. A column may be defined based one or more terms, each having an attribute that defines the terms for the column.

Steps of 418, 420, and 422 may be performed for each column index to be generated for column indexing operations 414. At step 418, one or more column indices are generated. A column index may be generated as a data structure. The data structure can be associated with a data structure (e.g., subject area index) storing information about the subject area for which the column index is generated. A column index may be generated for each column identified in the column information. At step 420, a query may be executed to obtain column data for each column index. The query may be a logical query to obtain all data accessible for all levels of access. The column data for a column index may be stored at step 422. Column indexing operation 414 may be repeated for each column index.

Upon completion of column indexing 414, process 400 may perform operations for subject area indexing for one or more subject areas that were identified in an index for a language. Process 400 may proceed to step 410 for subject area indexing.

If no subject areas remain for indexing, process 400 may proceed to end at which point an index for a language has been generated by process 400. Process 400 may be repeated to create an index for different languages and/or to capture updates to an existing language. All or some of the steps in process 400 may be repeated to capture changes or updates to an index, such as the addition of one or more subject areas and/or columns for a subject area.

Figure 5:
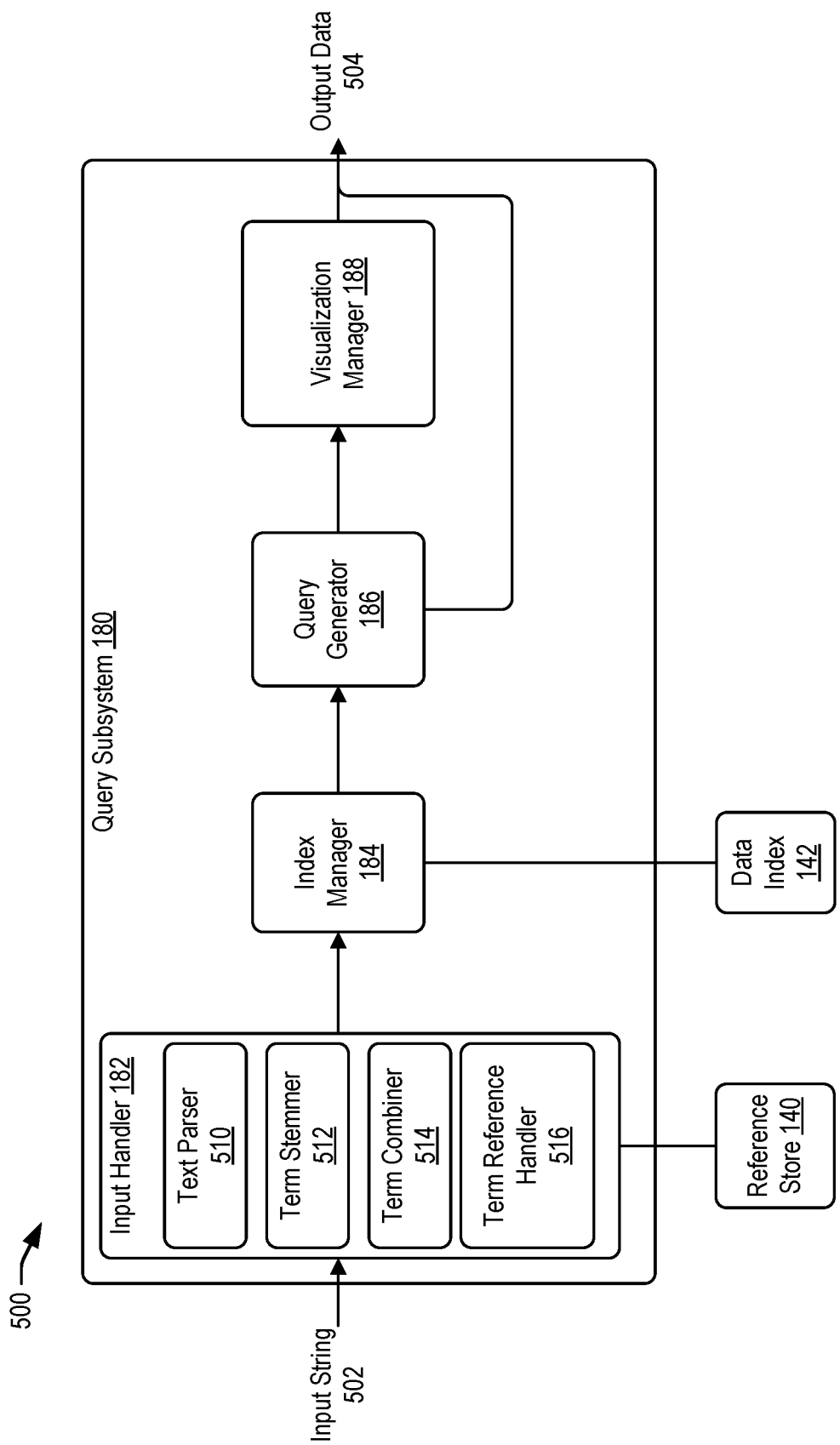
FIG. 5 illustrates a detailed diagram of a query system in accordance with an embodiment.

FIG. 5 illustrates a detailed diagram of a query system 500 in accordance with an embodiment. Query system 500 may be implemented for query subsystem 180. Query system 500 receives an input string 502 from an interface of an application providing a query service. The interface may be provided at a client system. The input string may include one or more strings of characters. Each string may have one or more characters. One or more strings of characters may be identified as words. Collectively, the input string 502 may represent a query for data or may have a meaning intended as an inquiry for data. Query system 500 may perform processing on input string 502 to determine a meaning from the input string 502. In determining the meaning, query system 500 may perform processing to determine a semantic meaning of the input string 502.

Query system 500 may formulate a query based on processing the input string 502. Query system 500 may produce output data 504. Query system 500 may communicate output data 504 to a computer system (e.g., an enterprise computer system) that can perform the query against one or more data sources. The computer system may provide a presentation service to that can generate a graphical visualization for presentation of results produced for the query. In some embodiments, query system 500 may determine a best-suited visualization for displaying the results of the query. Output data 504 may include information indicating the visualization for displaying the results of the query.

Query system 500 includes one or more subsystems and/or modules, such as those described with reference to FIG. 1 including input handler 182, index manager 184, query generator 186, and visualization manager 188.

Input handler 182 may perform operations described with reference to search query rewriter 32 of FIG. 3. Input handler 182 may perform pre-processing of the input string to identify words to be processed for generating a query. Input handler 182 may include one or more subsystems and/or modules, such as text parser 510, term stemmer 512, term combiner 514, and term reference handler 516. The operations performed by input handler 182 may be performed in many different orders. The examples described with reference to input handler 182 is merely one example of a set of operations performed by input handler 182.

Text parser 510 may perform operations to process input string into one or more subs-strings, each having one or more characters. For example, text parser 510 may perform one or more known algorithms to process the input string to identify unique strings. Input string 502 may be processed based on white spaces, hyphens, or other characters to identify different words or phrases. In some embodiments, text parser 510 may tokenize an input string for further processing by input handler 182. Input string 502 can be processed to remove (e.g., trim) articles and other strings that do not have meaning in the language of the input string. Text parser 510 may determine a root word for each of the words in input string 502. Text parser 510 may generate a data structure (e.g., an array) including each of the strings identified in input string 502. The strings may be stored in an order or sequence as identified in input string 502 to preserve a meaning of input string 502. The output of text parser 510 may be a data structure of strings. Each of the strings may represent one or more words or terms (e.g., characters having a meaning). In some embodiments, a string in the output may have multiple words, or terms.

Figure 7:
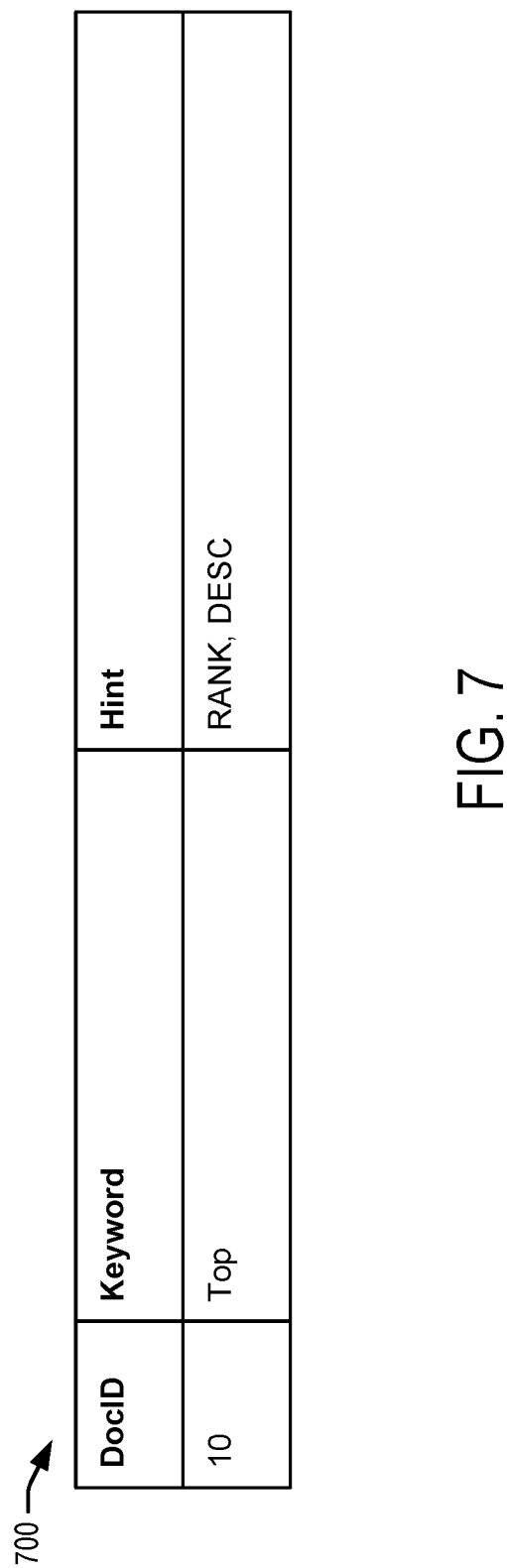
FIG. 7 illustrates a reference data structure according to some embodiments.

In some embodiments, term reference handler 516 may perform operations to identify a string with a word that is a reference word, or term. Term reference handler 516 may perform operations according to a sequence of one or more steps to match a term to a known, or reference term, if existing. One or more comparisons of a term may be performed to determine if a reference term exists. For example, a root term identified by text parser 510 may be compared to reference terms. A reference term may be identified as such if it matches a term in a reference store 140 (e.g., a reference dictionary), which stores terms that have a meaning with other terms. The terms in reference store 140 may be pre-defined. Some terms in reference store 140 may have a meaning within the scope of a subject area or domain of knowledge. Specifically, term reference handler 516 may determine whether any string in input string 502 has a meaning to any other term based on the terms in reference store 140. FIG. 7 illustrates examples of terms that indicate a meaning with respect to other terms.

Term reference handler 516 may process terms in input string 502 to identify one or more of terms matching with a term in reference store 140. Based on the identified term, term reference handler 516 may examine each of the string(s) following the identified term to determine whether any word in the strings satisfy the hint with respect to the identified term. The reference store 140 may indicate an action as to how the identified terms and the terms identified by the hint are to be interpreted. Term reference handler 516 may perform processing initially before index manager 184 performs processing to identify words that have meaning. The terms identified based on term reference handler 516 may be stored with information indicating the meaning identified from those terms. For example, the data structure of strings may be modified to identify those strings having a reference terms and other terms related to the reference term(s). The identified terms may be removed from the array of terms for further processing. In some embodiments, input handler 182 may implement natural language processing (NLP) techniques to further identify meaning of one or more of the terms. Terms that have an identified meaning can be removed from the terms for processing using data index 142.

Term stemmer 512 can perform operations to process strings identified by text parser 510. Term stemmer 512 may perform processing to identify a word stem, a word base, or root form of a term in a string. Term stemmer 512 may perform operations on terms in any of the strings identified by text parser 510. One or more known techniques for stemming may be implemented to identify a root form of a term. For terms in a specific domain or subject area, reference store 140 may be used to identify a root form of a word. The data structure of strings may be modified such that the terms may be further modified to include the root form of those terms.

Term combiner 516 may perform processing to identify whether any of the terms in input string 502 can be combined or have a relationship with each other. For example, the terms identified from the operations described above for input handler 182 may processed by term combiner 516. Reference store 140 may store information about terms in a particular subject area or domain. The information may indicate a meaning or a relationship between the terms. Reference store 140 may include terms such as synonyms, business terms, user-defined terms, industry terms, or any other types of terms not ordinarily defined in a language of the input string. Term combiner 516 may identify terms as being part of a name or having a meaning in a particular subject area defined by a group of users. Term combiner 516 may determine a meaning of one or more terms of input string 502 based on identification of a synonym or relationship with one or more terms of a group identified in reference store 140. Term combiner 516 may store information about a meaning of one or more terms identified using reference store 140.

Input handler 182 produces output data for processing by index manager 184. The output data may include a data structure of strings identified in input string 502. The strings may be modified or associated with data based on operations performed by input handler 182, such as stemming, trimming, parsing, and identification of terms that can be combined and/or have meaning with other terms in input string 502.

Index manager 184 performs operations based on data output by input handler 182. Index manager 184 may determine a measure of comparison (e.g., a comparison score) for the terms compared with data index 142. The measure of comparison may indicate a relevancy ranking score of each terms and/or the terms collectively as they compare to different subject areas, and the terms within those subject areas. The measure of comparison may be useful for determining a meaning of terms in the input string 502. A semantic meaning may be determined based on the meaning of the terms in the input string 502. Some or all operations performed by input handler 18 may be performed before index manager 184. Specifically, index manager 184 may perform operations described with reference to index searcher 34 of FIG. 3. Index manager 184 may implement operations according to algorithms and techniques described with reference to index search 34 of FIG. 3 and with reference to FIG. 6.

Index manager 184 can determine a measure of comparison for terms in input string 502 as they compare to terms in different subject areas of data index 142. Data index 142 may include an index of terms for one or more subject areas or domains. Using data index 142, index manager 184 can determine a closest match of terms in input string 502 to a subject area to determine a meaning of input string 502. The meaning of the terms in input string 502 can be used to construct a query using the terms. Specifically, the terms in output data produced by input handler are compared against terms in different subject areas to determine the best matching subject area. A meaning of the terms may be inferred based on the matching terms in a subject area. An order of the terms may be identified based on a meaning of the terms determined from comparison with data index 142.

Terms that are combined may be compared to data index 142 according to the combination. Terms that were identified as having a meaning with other terms may not be compared to data index 142. In some embodiments, not all terms having a meaning identified by term reference handler may be compared to data index 142. The terms that are not used to infer the meaning on other terms may be compared to data index 142 to determine a collective meaning of all terms in input string 502.

Index manager 184 may generate a data structure of terms based on comparison of terms with data index 142. A measure of comparison (e.g., a relevancy ranking score) may be included with information (e.g., compared terms) from data index 142 used to generate the measure of comparison. Some terms may be grouped together based on a comparison of those terms as a group. In some embodiments, the data structure generated by index manager 184 may include values that indicate a measure of comparison for the terms compared with data index 142. The measure of comparison may be provided by a top number (n) matches with data index 142. The measure of comparison may include the measures computed for each of the different data structures in data index 142 described with reference to FIG. 6.

Query generator 186 may perform operations including those described with reference to generator 36. The operations performed by query generator 186 may include generating a query based on the data generated by input handler 182, and index manager 184. Query generator 186 may assess the output of input handler 182 and index manager 184 to determine a semantic meaning of terms in input string 502. Specifically, query generator 186 may consider the measure of comparison of terms, the terms identified by input handler 182, and other meaning determined by input handler 182 in determining a meaning of terms in input string 502.

Query generator 186 may determine a semantic meaning of the terms identified by input handler 182. Specifically, query generator 186 can assess a meaning of terms based on the measure of comparison, which can be used to determine how close a term matches a term in data index 142. A meaning for each of the terms individually or collectively can be inferred based on the closest matching terms according to the measure of comparison. The terms may be considered in an order or sequence of input string 502. Query generator 186 may determine a meaning of terms collectively based on the subject area having terms that closely match the terms in input string 502. Some terms may be identified as a dimension for the subject area. Some terms may be identified as an attribute for which to limit a search in the subject area for one or more dimensions. As further described below, a query may be generated for the terms being considered collectively based on the measure of comparison using data index 142.

Query generator 186 may further infer meaning based on terms that are combined by term combiner 514 and/or terms that are grouped as having a closest match to a subject area. Query generator 186 may further consider a relationship of terms determined by term reference handler 516. In some embodiments, terms for input string 502 may be further considered in combination with the hint for a reference term. Query generator 186 can generate a query according to the considerations described above. Techniques for generating a query based on an input string are described below.

A query may be generated in many different languages, which are structured, semi-structured, or unstructured. The format of a query may be defined by a search system of an intelligence service provided by intelligence server 170. For example, the format of a query may be generated as a logical SQL query defined by a computer system providing the intelligence service. In some embodiments, query generator 186 may output a query as output data 504.

In some embodiments, output data 504 may include data indicating one or more visual representations for displaying results of the query generated by query generator 186. The output data 504 may indicate the visual representation best-suited for displaying the results. Visualization manager 188 may determine a visual representation for displaying results of the query. The visual representation may indicate information for determine a graphical interface to display the results of a query. The visual representation may indicate information for producing a graphical display, such as a format, a layout, or a diagram (e.g., a chart or a diagram). The visual representation may be determined based on user-defined preferences, user behavior, and/or type of data to display. Described below are examples of techniques for determining a visual representation for displaying results and examples of visual representations.

V. Data Index

Figure 6:
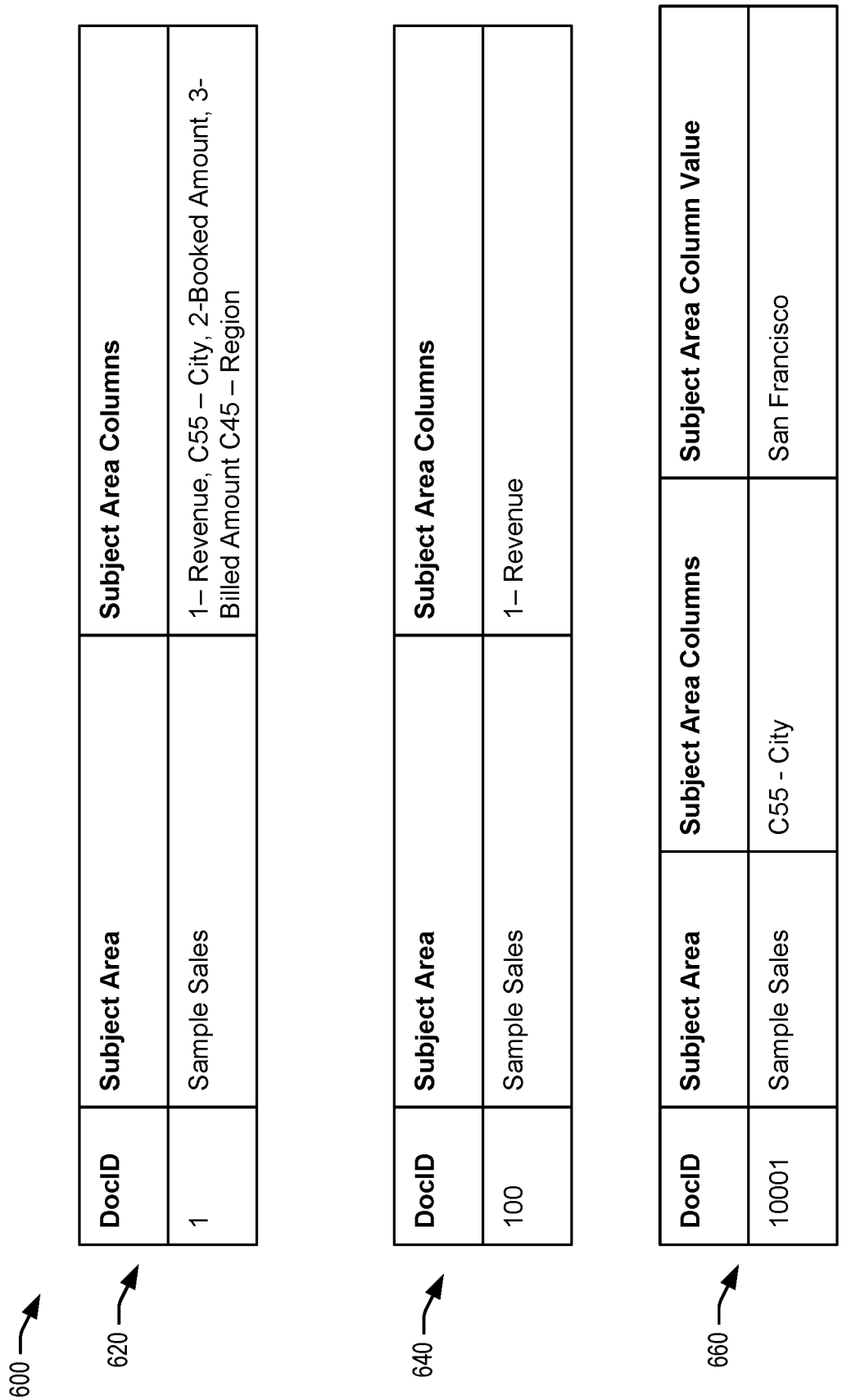
FIG. 6 illustrates data structures of a data index according to some embodiments.

FIG. 6 illustrates data structures of a data index 600 according to some embodiments. Data index 600 is an example of data index 142 of FIG. 1. Data index 600 may be generated by a process, such as one described with reference to FIG. 4. Data index 600 may be defined by multiple documents such as those shown in FIG. 6. Each of the documents may have different formats. A data structure may be generated on the format of the document. Data index 600 provides a logical mapping of data identified by crawling one or more data sources. The mapping may be useful to determine a meaning of terms for a query.

Data index 600 may be defined by a hierarchical data structure. Data index 600 may be used by data analytic system 150 to determine a semantic meaning of an input string. The semantic meaning may be used to generate a query for data based on the meaning.

In at least one embodiment, data structure 620 may be generated for one or more documents about subject areas ("subject area documents"). Data structure may represent a global subject area index for different subject areas or domains of information. Each subject area may be identified by crawling one or more data sources. A subject area may be identified as a topic or subject area for presentation ("presentation subject areas") as disclosed by techniques in U.S. patent application Ser. No. 14/861,893, filed Sep. 22, 2015 and entitled "SEMANTIC SEARCHES IN A BUSINESS INTELLIGENCE SYSTEM" and U.S. Provisional Application No. 62/055,402, filed Sep. 25, 2014 and entitled "SEMANTIC SEARCHES IN A BUSINESS INTELLIGENCE SYSTEM." In the example of FIG. 6, data structure 620 is created for multiple subject area documents, each represented by a record associated with a document identifier ("DocID"). Each subject area in a record may have a subject area name ("Subject Area") and one or more columns ("Subject Area Columns"). Each subject area column may correspond to one or more words, or terms, identified as having a meaning for the subject area. The terms of a subject area may be pre-defined or defined based on data stored for the subject area. Each term may be associated with a column identifier (e.g., column index), which can be used to reference a data structure with information about columns for a subject area.

Data structure 640 may be generated for one or more documents about columns for a subject area (e.g., subject area columns). Each subject area column may be identified as a presentation column having data for the subject area. Data structure 640 may include a document identifier ("DocID") for each document corresponding to a subject area column. The subject area column in data structure 640 may be referenced by a column identifier in data structure 620. Data structure 640 may include a record for each subject area column associated with a subject area. Each subject area column may be associated with a term for which data can be presented for a subject area. Data structure 640 may represent column indexes for each subject area.

Data structure 660 may be generated for values of each subject area column. Data structure 660 may store values for each column index. Data structure 640 may include a document identifier ("DocID") for each document corresponding to a subject area column. Each subject area column may have one or more attributes for the column. Examples of attributes may include a value of the subject area column and dimensions, or dimension members for the column. The dimension may be used for determining how to display values for a column of a subject matter. Each subject area column may be identified based on the subject area column index. A dimension may be a factor that limits a scope of a measure for an attribute.

VI. Reference Index

FIG. 7 illustrates a reference data structure 700 according to some embodiments. Reference data structure 700 may be a reference data index in reference store 140. Reference data structure 700 may be defined with one or more keywords that have meaning when combined with other strings of characters (e.g., words) in an input string. The keywords may have meaning within a subject area. Each record in data structure 700 may correspond to a different keyword and an associated hint. One or more hints may be associated with a keyword to determine whether any words following the keyword have meaning in relation to the keyword. The keywords may be defined with respect to a subject area. Each of the keywords may be defined with respect to a particular subject area, or may have a specific meaning in a subject area. As such, multiple reference indices may be defined for different subject areas, where the keyword has a different meaning. The reference index may be chosen for a particular subject area.

Input handler 182 may use data structure 700 to identify strings of characters, such as words or terms, having meaning in relation to any keywords identified in an input string. Those words identified as having meaning based on an identified keyword, may be stored in association with the keyword for consideration later. Input handler 182 can examine words in a string to determine whether any satisfy the hint with respect to the keyword. Upon identifying a closely, or identically matching term in data index, the data for the term can be considered for display in view of the meaning of the keyword.

VII. Semantic Analysis

Figure 8:
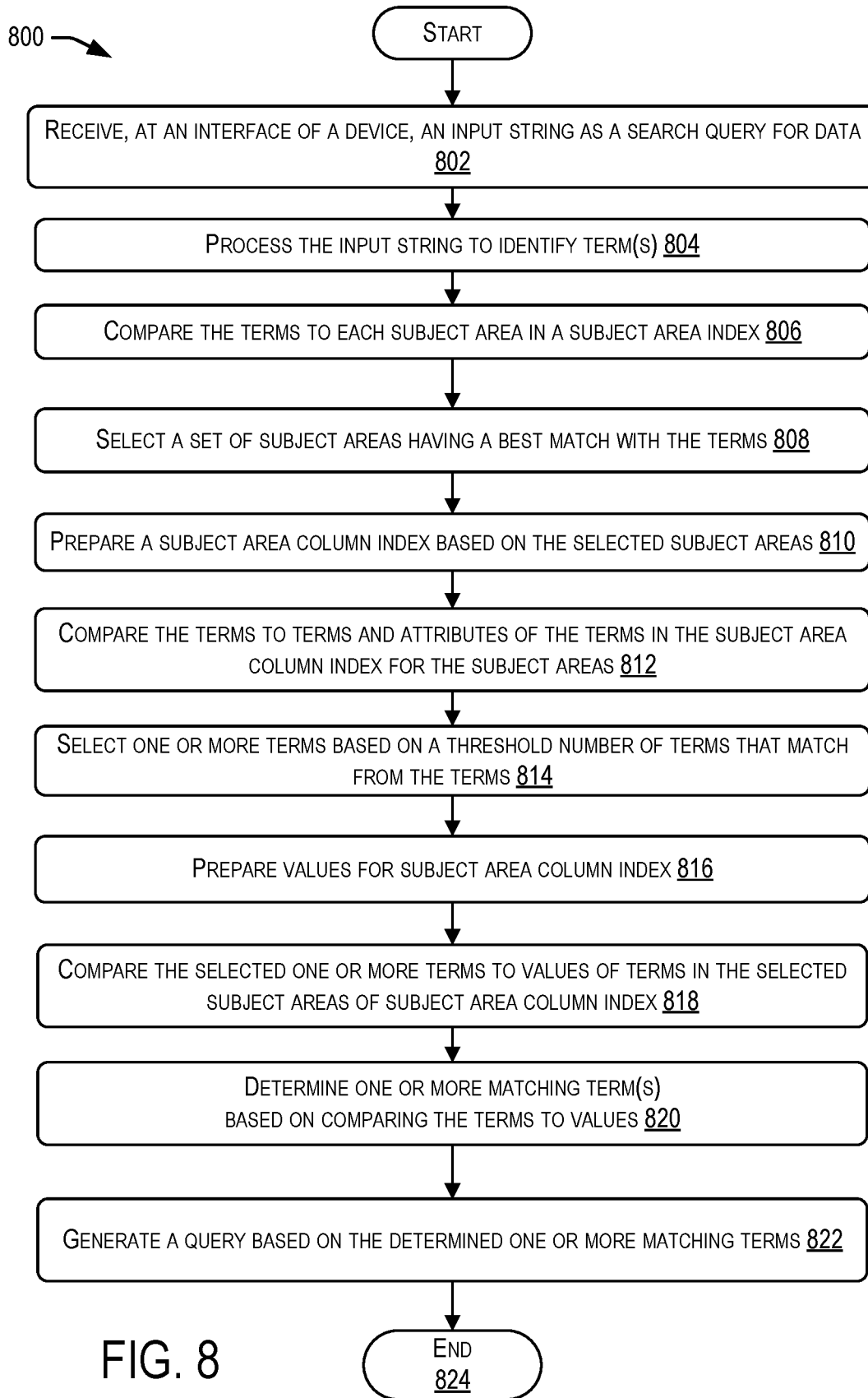
FIG. 8 illustrates a process for determining a semantic meaning of an input string according to some embodiments.

FIG. 8 illustrates a process 800 for determining a semantic meaning of an input string according to some embodiments. Process 800 can be implemented by query subsystem 180 of FIG. 1.

Process 800 may include step 802 in which an input string (e.g., input string 402) is received. The input string may be based on input by a user. The input may be received through an interface disclosed herein. The input string may be a search query for data from one or more data sources.

At step 804, the input string may be processed. For example, the input string may be processed according to operations described with reference to input handler 182. The input string may be processed to identify one or more terms to compare against data index 142.

In at least one embodiment, processing the input string to identify the plurality of terms includes tokenizing the input string to identify a set of terms based one or more characters. The set of terms may be processed to determine a stem word, if existing, for each of the set of terms. Each of the set of terms may be processed to determine a relationship between any pair of terms in the set of terms. The plurality of terms may be identified based on the processing performed by input handler 182. For example, the plurality of terms may be identified based on the set of terms and the relationship between any pair of terms in the set of terms. The processing may include changing an order of terms in the set of terms. The set of terms may be modified to add or remove terms based on processing by input handler 182.

At step 806, a comparison (e.g., a first comparison) is performed between one or more terms identified in the input string to each of the terms of different subject areas, such as data structure 620 of FIG. 6. The terms may be compared to the terms in the subject area columns for each subject area in a subject area index of data index 142. The subject area index may include terms for all subject areas accessible to all users, not just the access permitted to the user that provided the input string.

Terms may be compared based on one or more factors, such as user attributes, term matching, etc. The first comparison may be a measure of comparison (e.g., a score) determined for comparison of the terms in the input string with terms in the subject area. The measure may be weighted based on one or more criteria. A value (e.g., a score) may be determined for each subject area. The score for a subject area may be determined based on a number of terms matching the subject area. Comparing the terms may include determining a measure of comparison of the terms with the subject areas. The terms may be compared in any order. However, some terms may be identified with an order based on a reference term indicating a meaning of multiple terms. In some embodiments, the comparison may be performed based on one or more algorithms for similarity analysis. The measure of comparison may be calculated based on one or more measures of determining relevancy. For example, the comparison may be performed using term frequency-inverse document frequency (TFIDF). The measure of comparison may indicator a relevant value of comparing a term to the subject areas.

At step 808, a set of subject areas are selected based on having a score reflecting a closest (e.g., a best or greatest) match with terms. The set of subject areas may be selected as a set from the subject index as having a closest match with the terms in the input string. The set may be a top number (n) of subject areas. A closest match may be based on one or more attributes of the first comparison. Attributes may include the number of terms matching between the input string and terms in a subject area. In one example, the top three subject areas may be selected as having the closest number of matching terms. The subject areas may be selected by having a greatest number of terms matching, or terms having a closest match.

At step 810, a subject area column index is prepared for the subject areas selected at step 808. An example of a subject area column index is data structure 640 of FIG. 6. The subject area column index may include attributes for the terms, such as a measure (e.g., a dimension), a sum, or other attributes about the term for which data exists. In some embodiments, a subject area column index may be generated dynamically based on the selected subject areas in subject area index.

At step 812, a comparison (e.g., a second comparison) is performed for the terms identified in an input string to a subject area index for each of the selected subject areas. Performing the second comparison includes comparing each of the plurality of terms to terms in each of the selected set of subject areas of the subject area column index and to one or more attributes of each of the terms in each of the selected set of subject areas. The terms may be compared based on the attributes of those terms to identify the terms for which attributes are requested for a query. Comparing the terms with the subject area column index may include determining a measure of comparison of the terms with each of the terms compared in the subject area column index. The measure of comparison may be a value (e.g., a relevancy score) that indicates how close terms of the input string are to terms in a subject area. For example, the measure of comparison may be a relevancy score. The measure of comparison may be determined using an algorithm such as TFIDF. The measure may be weighted based on one or more factors, such as a number of attributes that match with the term.

At step 814, based on the second comparison, one or more terms may be selected for the terms in the subject area index for each of the selected subject areas. The one or more selected terms may correspond to a threshold number of matches ("hits") with terms in the subject areas of the subject area column index. For example, a threshold number of matches (e.g., 30 matches) may be selected for the matches that have the highest measure of comparison, e.g., a highest or greatest relevancy score. The threshold number of matches may be across multiple subject areas. The threshold number may be chosen based on a maximum number of matches that can be shown on a display of a client system.

At step 816, values for the subject area column index 816 may be prepared. For example, a data structure, such as data structure 660 of FIG. 6, may be generated (e.g., populated) or data may be retrieved for values for the terms of the subject areas selected at step 814. In some embodiments, data structure 660 may be generated as part of data index 142. Portions of data index 600 may be identified based on the terms that are selected at step 814.

At step 818, the terms selected at step 814 may be compared to the values of the matching terms in each of the selected subject areas of the subject area column index. The terms may be compared using one or more algorithms, such as TFIDF. The terms may be compared individually and in combination to identify a match of each term or group of terms to the values. The comparing may include determining a measure of comparison, which indicates a value of comparing a term or term(s).

At step 820, one or more matching terms of the selected one or more terms are determined based on the comparing of the selected one or more terms to the value for each of the plurality of terms in the selected set of subject areas. The terms having the best match, if not identical to the terms in the subject area column index, may be identified as having a meaning corresponding to the matched terms. The terms having the best match (e.g., highest value or score), if not identical to terms in the subject area column index, can be selected as the terms defining a query. The terms having the best match may be understood to have a semantic meaning of the terms that match.

At step 822, a query is generated based in determining the one or more matching terms. In some embodiments, a query (e.g., a logical SQL query) may be generated based on the terms determined at step 820. Based on identifying terms being in a particular subject area and having a relationship with other terms, a query can be constructed based on the meaning of the terms determined from the input string. Terms may be arranged based on their best match with a term in the subject area column index. Each of the matching terms may be determined as a best match based on a measure of comparison to a value of a terms in the subject area column index. An order of the matching terms may be determined based on the meaning of the terms determined based each of their best matches to a term in the subject area column index.

Process 800 may proceed to end at step 824. Process 800 can be performed for multiple different input strings. In some embodiments, process 800 can be performed for an input string as it is formed. Process 800 may be repeated as the input string changes.

VIII. Graphical Visualization of Search Results

Figure 9:
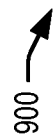
FIG. 9 illustrates a diagram of a data structure for determining a visualization of data according to some embodiments.

FIG. 9 illustrates a diagram of a data structure 900 for determining a visualization of data according to some embodiments. Data structure 900 is an example of information (e.g., a visual presentation mapping) used by data analytic system 150 to determine a visual representation best suited for displaying results of a query determined by semantic analysis of an input string by a user. Client systems, such as a mobile device, are limited in display of information due to a screen size that is smaller than other client systems. It may be desirable to display search results in a manner better suited for display at a client system having limited display space. It may be further desirable to track a user's behavior with respect to a subject area to determine a visual representation that may be best suited for the user based on previous results displayed.

The information in data structure 900 may be created in many ways. Some or all of the information in data structure 900 may be pre-defined based on the different terms to display in a subject area. A different data structure 900 may be created for different users or other criteria. In some embodiments, a different data structure such as data structure 900 may be created for different subject areas, and within a subject are, different terms. Data structure 900 may be modified based on user preferences or behavior.

In at least one embodiment, data structure 900 may indicate options for visual representation of data responsive to a query. Data structure 900 may be defined by one or more axes, each of which is a factor in determining a visual representation for displaying data. For example, data structure 900 has one axis of data structure 900 defined based on one or more measures, e.g., a metric or a value, each corresponding to a term matching an input string. The visual representation (e.g., a pie chart, a scatter/bubble chart, a bar chart, a bubble chart, or a table) may change based on the number of measures. In the example of FIG. 9, data structure 900 may be defined based on another axis of dimensions, corresponding to a dimension for an attribute of a term. The visual representation may change based on the number of dimensions for a term. A dimension may be an attribute that defines or limits a term measure. In the example of FIG. 9, a visual representation may be selected based on the number of measures and the number of dimensions identified for a term having the measures. For a term defined by multiple measures and multiple dimensions, a visual representation such as a bubble chart or a table might be useful to see multiple axes of information. Data analytic system 150 may select a visual representation using data structure 900. The visual representation may be provided to presentation server 168 to generate a graphical interface according to the visual representation.

U.S. Provisional Application No. 62/356,471, filed Jun. 29, 2016 and entitled "TECHNIQUES FOR SEMANTIC SEARCHING," and U.S. Provisional Application No. 62/396,088, filed Sep. 16, 2016 and entitled "TECHNIQUES FOR SEMANTIC SEARCHING," including Appendix C, discloses examples of different graphical interfaces for displaying results of queries submitted to data analytic system 150 for a query service. The examples show different types of visual representations of results for a different query. Each of the examples includes a data structure in a formatted language defining the visualization for a display of results based on measures and dimensions. Different visual representations of data are displayed based on the number of measures and dimensions for results. The example data structures in Appendix C of U.S. Provisional Application No. 62/356,471, filed Jun. 29, 2016 and entitled "TECHNIQUES FOR SEMANTIC SEARCHING," and U.S. Provisional Application No. 62/396,088, filed Sep. 16, 2016 and entitled "TECHNIQUES FOR SEMANTIC SEARCHING," may be generated as a visual representation of results for a query. In some embodiments, all or some of the data structures may be generated by data analytic system 150. The visual representation may be communicated to a presentation service to determine a display based on the data structure for a visual representation. Each of the data structures may include the measures, dimensions, formatting, display characteristics, and other information indicating a relationship of data for display.

FIGS. 10-17 illustrate graphical interfaces for searching and viewing search results according to an embodiment. Appendices A and B describe some embodiments with references to FIGS. 10-17. Specifically, the graphical interfaces shown in FIGS. 10-17 may be generated by data analytic system 150, by a presentation service provided by a presentation server (e.g., presentation server 168), or a combination thereof. The graphical interfaces may include a visual representation that is determined by data analytic system 150 based on a query generated after semantic analysis of an input string. In some embodiments, data analytic system 150 may provide information about the visual representation to a presentation server to generate a graphical interface. In at least one embodiment, a user may perform a process for searching using a graphical interface providing access to a query service provided by data analytic system 150. The process for searching may be performed as described with reference to "Search," such as section 5.1.3 in Appendix A of U.S. Provisional Application No. 62/055,402, filed Sep. 25, 2014 and entitled "SEMANTIC SEARCHES IN A BUSINESS INTELLIGENCE SYSTEM." The process may be explained further below with reference to FIGS. 10-17.

In some embodiments, the graphical interfaces disclosed herein may be provided by a presentation server to a client system. The graphical interface may be provided for a query service by data analytic system 150. In several of the examples show below, a graphical interface may enable a user to provide input for the query service to query data. The graphical interface may be modified to show a visual representation of the data responsive to the query. In some embodiments, a graphical interface may be presented to enable a user to further refine input for a query. For example, the graphical interface may provide options for input based on the input already provided to the graphical interface. In another example, the graphical interface may provide one or more interactive elements to select a visual representation and/or refine input for a query.

Responsive to input in a graphical interface, data analytic system 150 may perform further processing to determine possible options for input based on input already provided. The presentation server may provide the input at run-time to data analytic system 150 which can then perform processing including semantic analysis of current input to determine possible options for further input. In some embodiments, data analytic system 150 may determine results responsive to the current input data and send the results to the presentation server to display in the graphical interface. Data analytic system 150 may perform a search based on input and cause the presentation server to display the results for the input in a manner best-suited for the query. In other words, the graphical interface may be dynamic such that it is updated to display results responsive to input as new input is entered. The graphical may present different options for visualization as the result for input changes (e.g., one or more measure or dimensions are identified in a search result). Data analytic system 150 may communicate with a presentation server to receive input from a user via a graphical interface and to perform query processing and adjust a display of results responsive to the input from the user.

Figure 10:
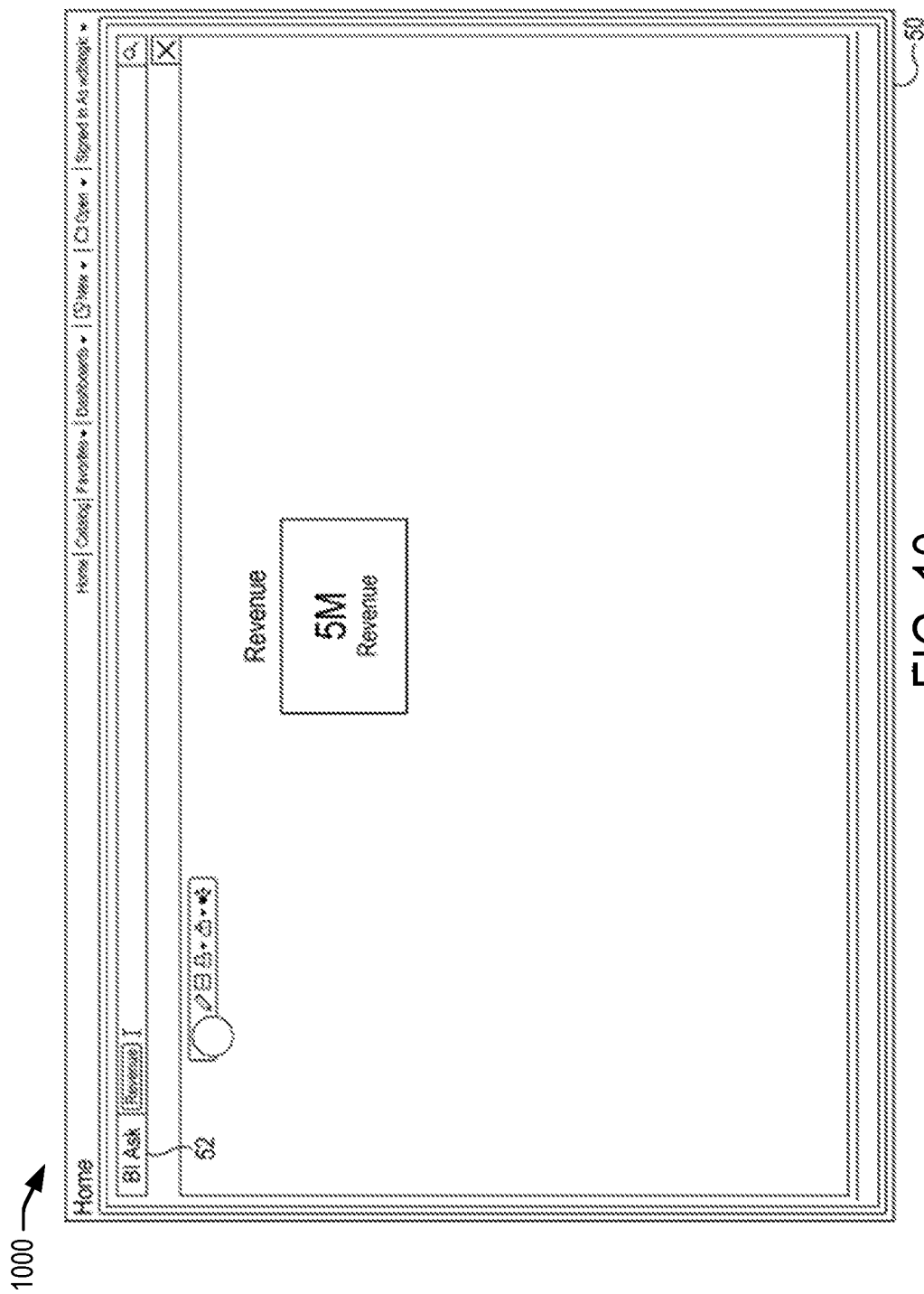
FIGS. 10-17 illustrate graphical interfaces for searching and viewing search results according to an embodiment.

In FIG. 10, graphical interface 1000 may be displayed at a client system. Graphical interface 1000 may include an interactive element 52 to specify search input such as "revenue." Data analytic system 150 may process the input to determine a query to construct based on the input. For example, data analytic system 150 rewrite the input it into a query language form, such as logical SQL. The logical SQL may be communicated to an intelligence server to obtain data responsive to the query. A visual representation for the query is selected and displayed for the query. Using data structure 900, data analytic system 150 can determine a visual representation for displaying results of a query for a single term ("revenue") having a single dimension.

Figure 11:
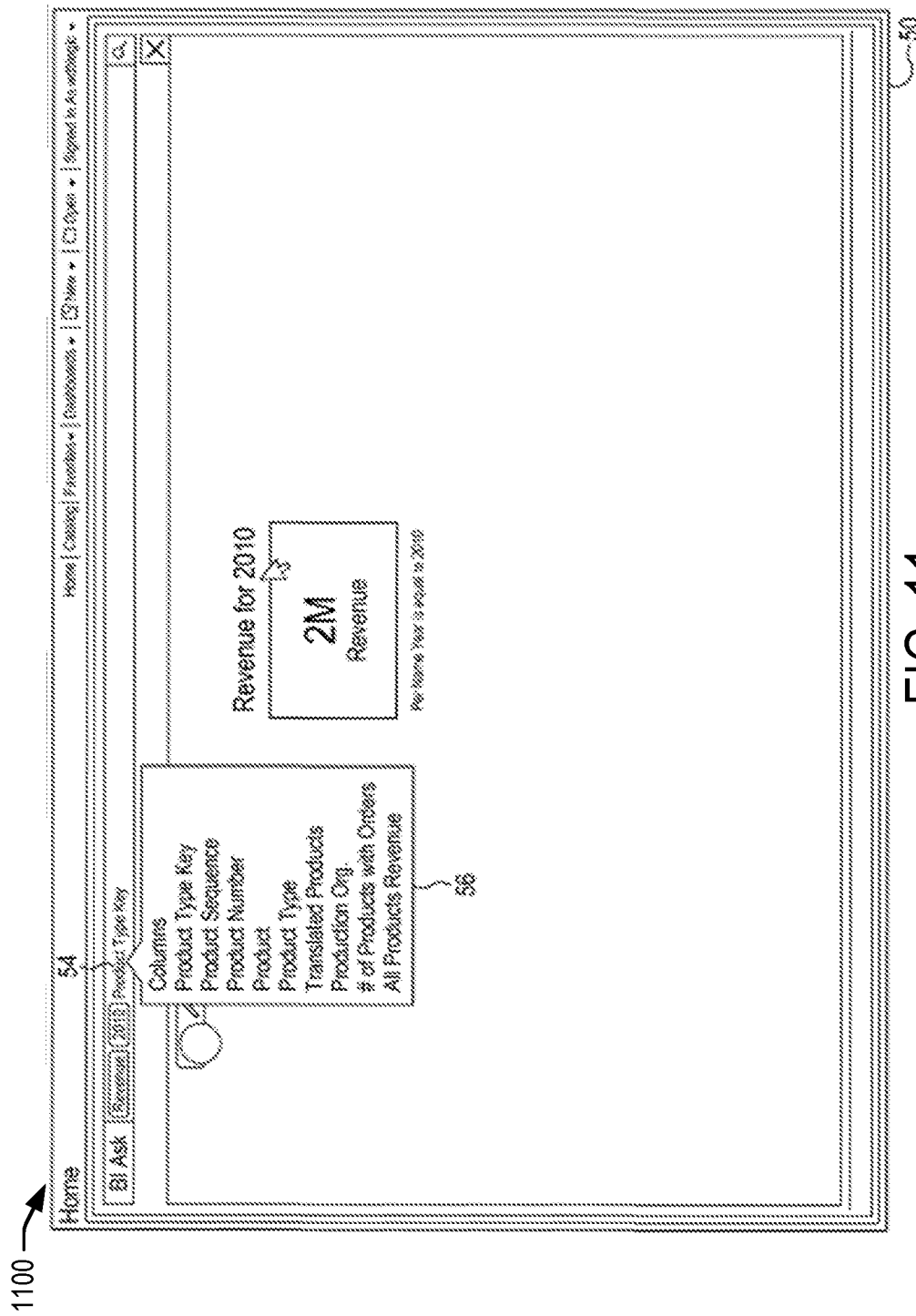

FIG. 11 illustrates a graphical interface 1100 is shown after a user further enters input such as "2010" for revenue. Data analytic system 150 may perform a query process to parse the input and determine a semantic meaning of the input. A list of matching terms may be identified by data analytic system 150 and shown to user in graphical interface 1100 as a drop down list 56 of suggested other parameters. The terms may be listed in order of best possible match. The terms may be identified based on their association with terms in a subject area matching the terms in the input. As mentioned above, the search process may document and save the search terms and their associated queries for future use. In one embodiment, they are stored by user, so the system can access a list of terms used by the user and the statistics of the most frequently used terms. Accessing this list would allow the system to populate the drop down list 56.

Figure 12:
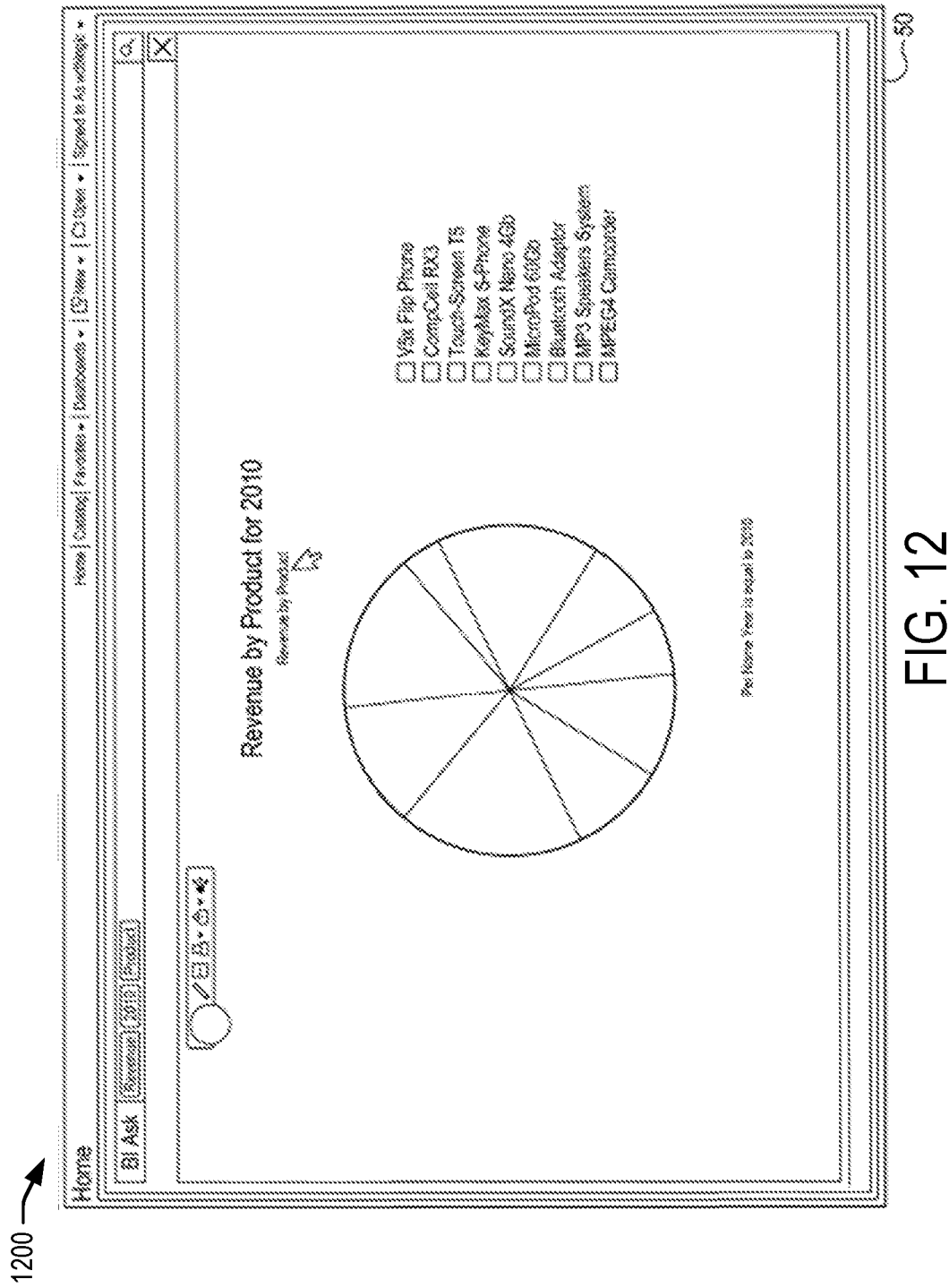

FIG. 12 illustrates a graphical interface 1200 of a visual representation of results in response to the additional input of "product" with the input described in FIG. 11. The system may process the new input string to identify its meaning and generate a query to obtain new results. The new results may be displayed in a different visual representation based on the new measures and dimensions in the input. In some embodiments, a visual representation may include additional interactive elements to selectively filter data by one or more dimensions, such as different types of devices illustrated in graphical interface 1200. The dimensions may be identified as options based on their match in a subject area identified for the input.

Figure 13:
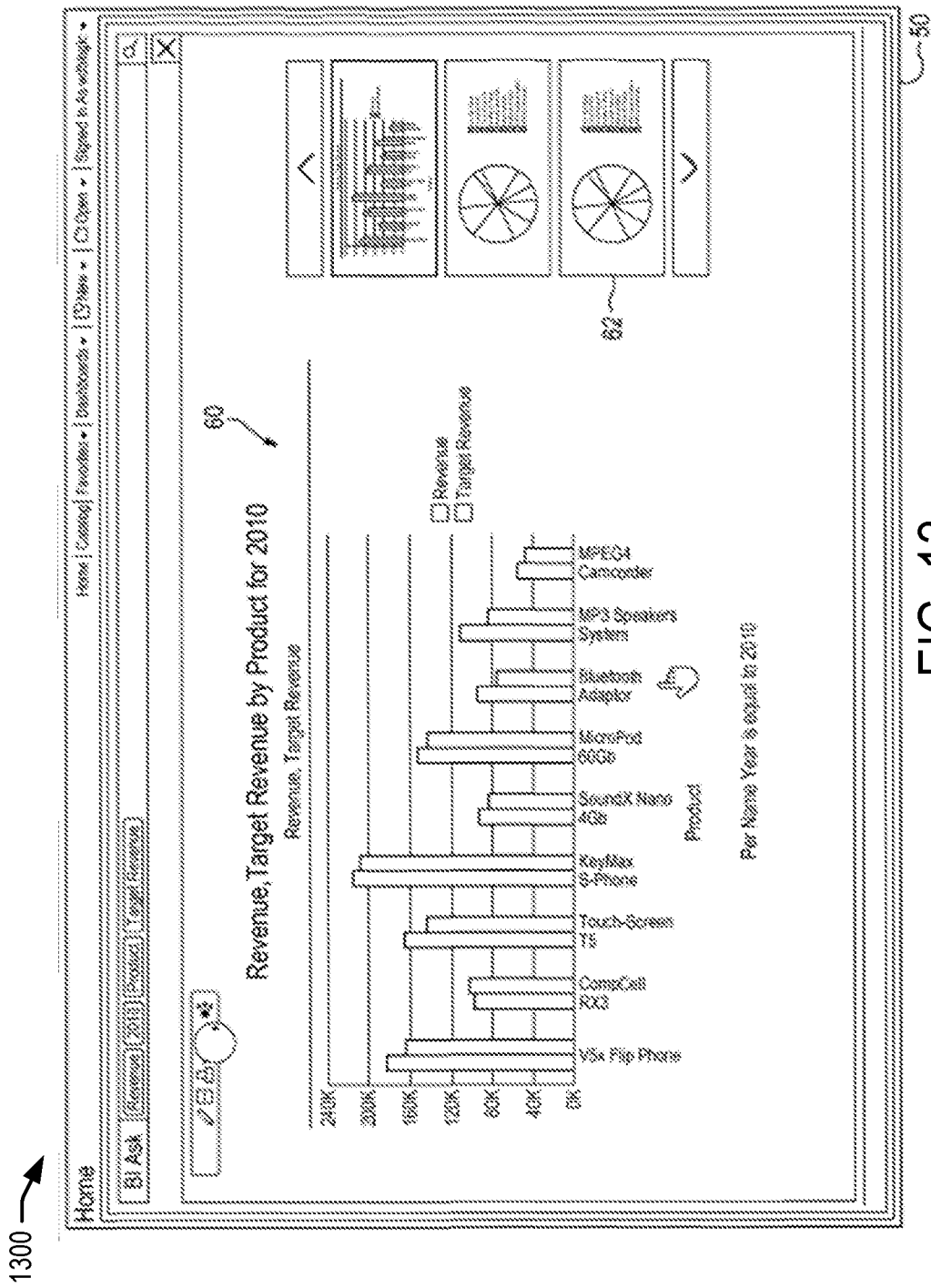

FIG. 13 illustrates a graphical interface 1300 of a visual representation of results in response to the additional input of "target revenue" with the input described in FIG. 12. As the system presents visualizations, it can also offer other formats for the user, such as visual representations 62. Visualizations may be chosen based on the measures and dimensions, using the data structure described with reference to FIG. 9. In some cases, such as FIG. 14, a user may type in the terms 'chart' in the search bar. The system would then present the appropriate visualization or options for choosing a visualization. The system can use this as another opportunity to learn about the user and gather statistics as to what types of visualizations the user prefers. This particular user may prefer pie charts, so the system may default to presenting information to the user in pie charts.

In FIG. 13, for example, the additional element of "target revenue" is added. There are now four elements to the user's search, each of which will have its own query statements, results and conversion to visualization. The user may have different visualization depending upon the number of elements of the search, or the nature of the search. He or she may prefer comparative bar charts as shown in FIG. 13 when there is a 'target' or 'projected' or the term 'versus' in the original search request. The system gathers all of this information and accesses it when the user logs in and performs a search. The text-to-query generator can retrieve it from the BI server and use it to generate the visualizations. Side bar 62 displays other visualization options to the user. If the user starts selecting one of the other charts more frequently, the system will gather this statistic as well and use it to learn the user's preferences.

Figure 14:
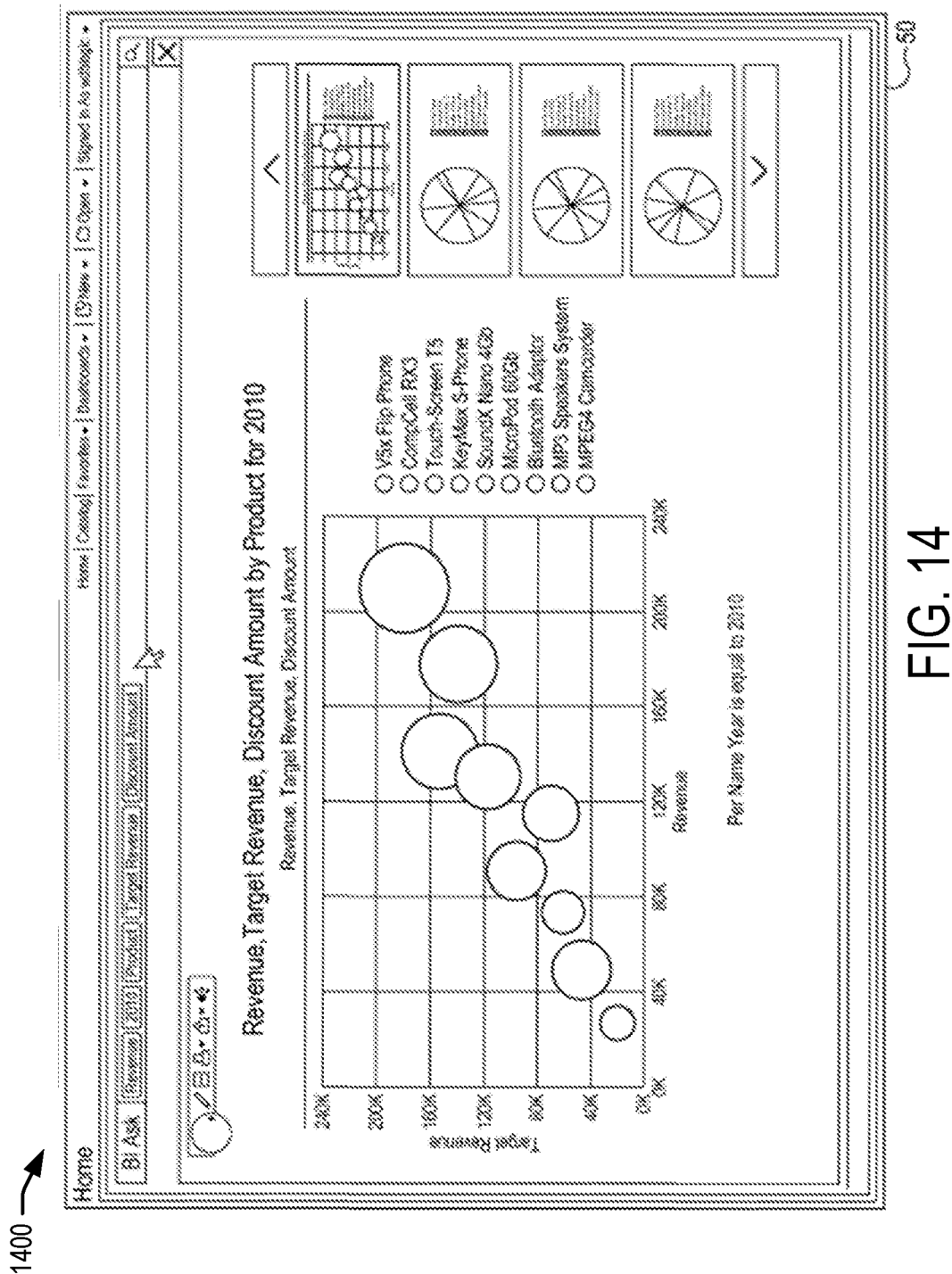
Figure 15:
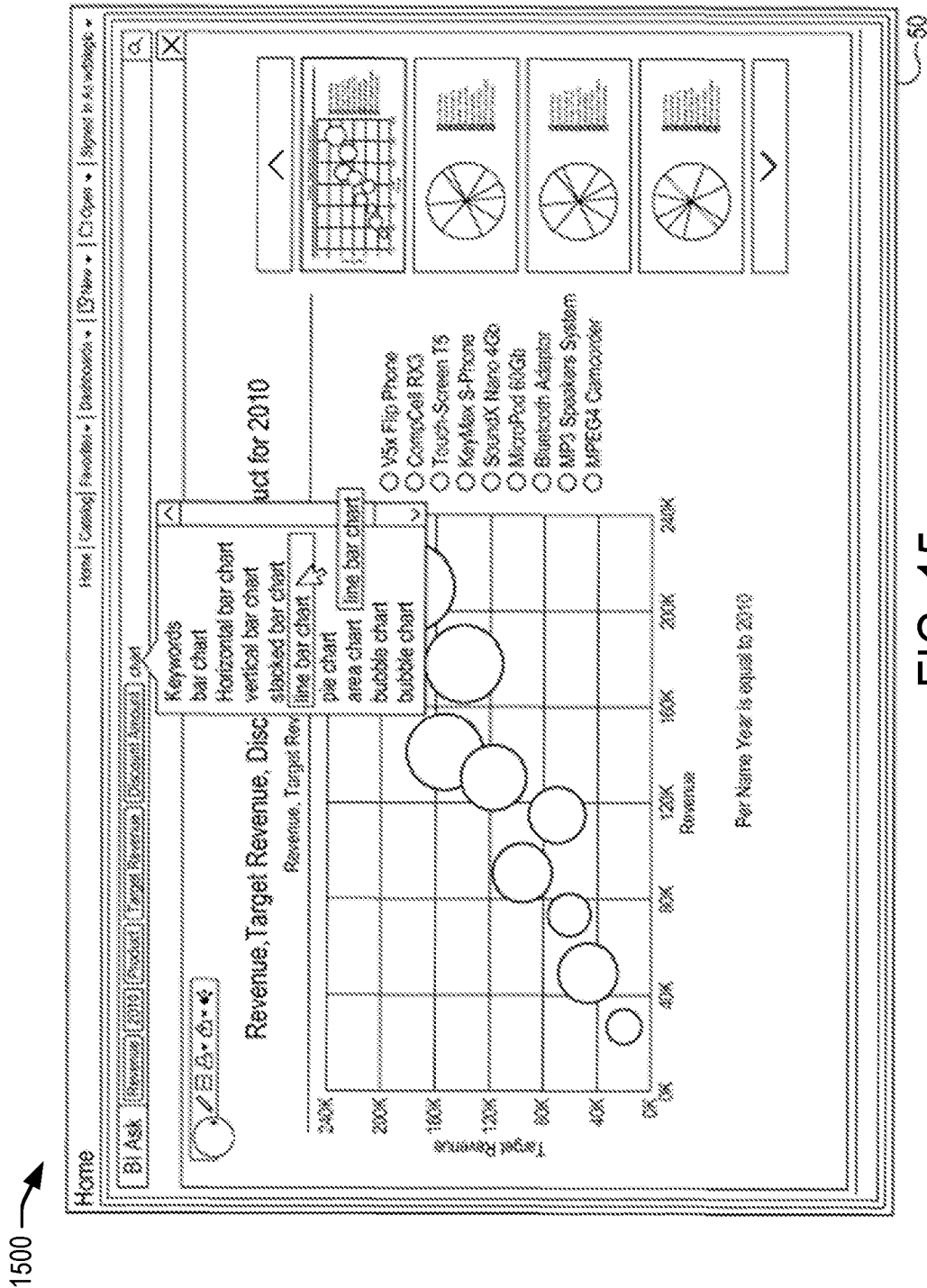

FIG. 14 shows graphical interface 1400, which is an alternative view for presentation to the user. One should note that the sidebar only shows this type of chart and pie charts as options. This may be based upon the user's preferences as noted above, or may be based upon the level of complexity of the query. However, this does not limit the user to those particular types. Under the term 'chart' in the search bar, as shown in graphical interface 1500 of FIG. 15, the pull down list allows the user to select one of many different charts. As the user uses the system and this information is gathered, the system will start to be more accurate in matching the offered visualizations with the user's preference, making the system more efficient and user friendly.

Figure 16:
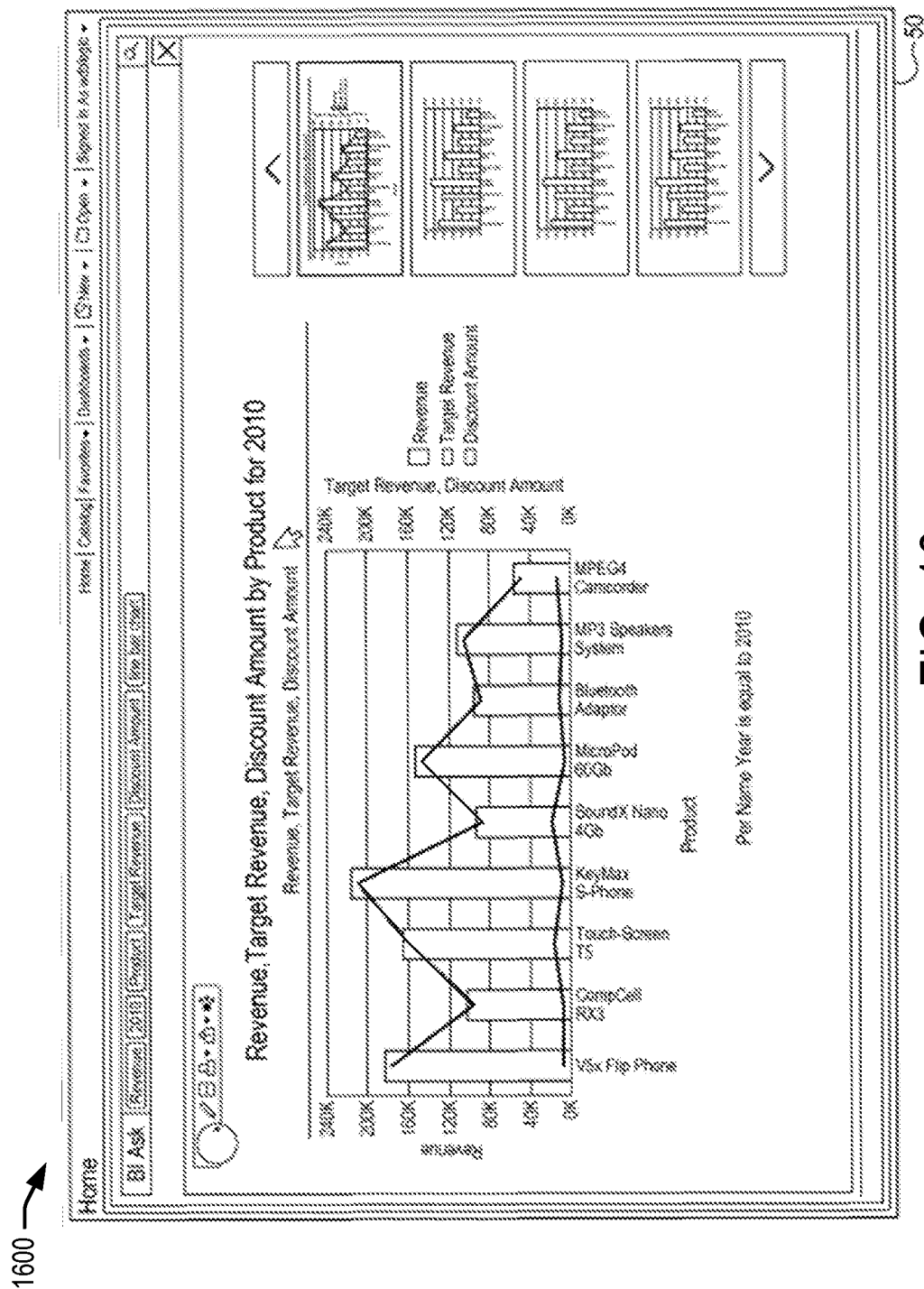
Figure 17:
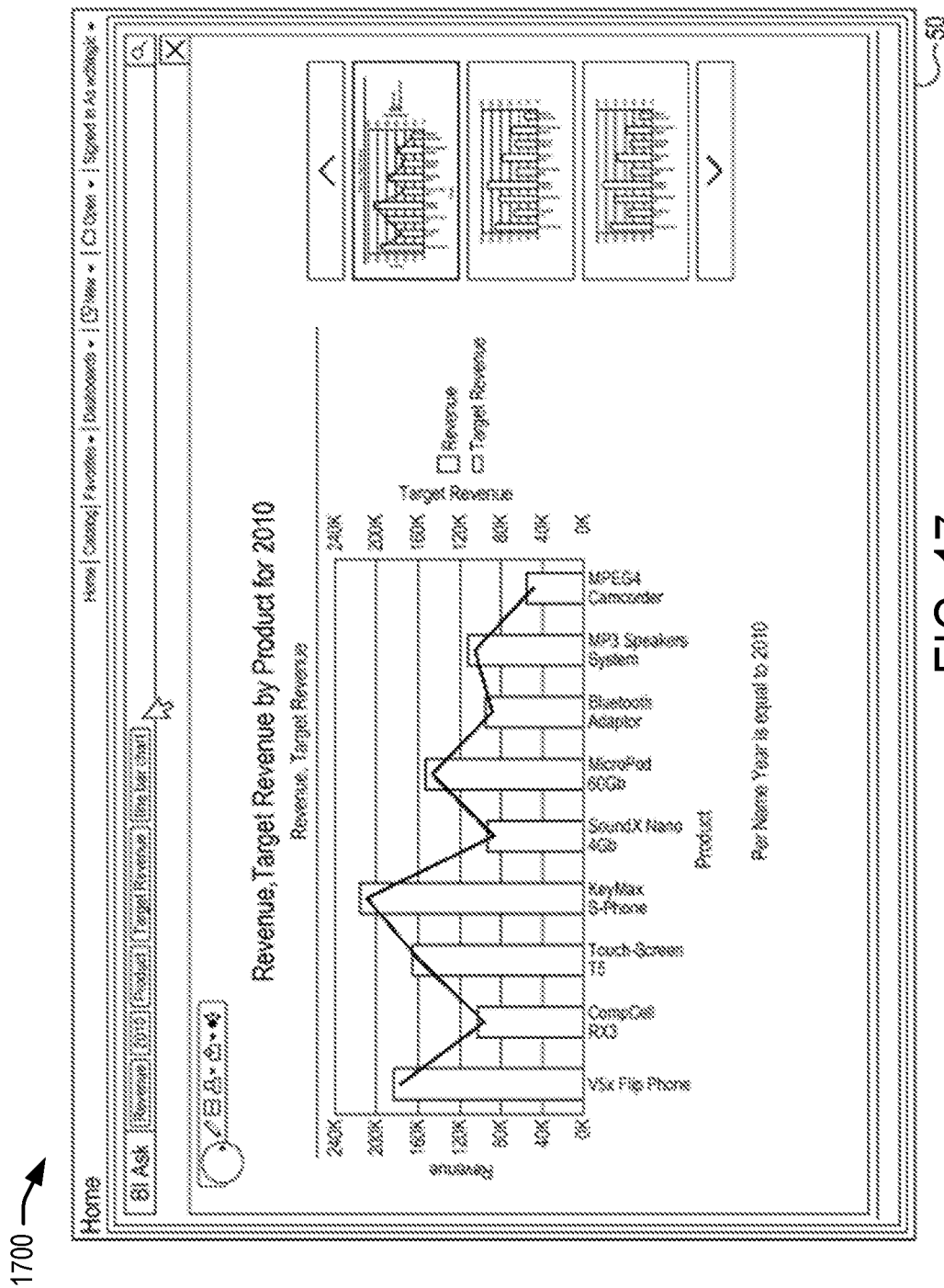

FIG. 16 illustrates graphical interface 1600, which shows the resulting line bar chart, with other line bar charts offered to the right. If the user decides that he or she does not want to see the discount amount that is included with the chart, highlighted in FIG. 16, the user can remove it. Each of the search terms in the search bar will have their own pull down list to allow the user to change or delete that term. In FIG. 17 illustrates a graphical interface 1700 that shows an example in which the user as removed the discount amount term from the search bar. The removal of a term is not necessarily depending upon the other terms in the search bar.

One should note that the above user interfaces were shown in 'desktop' form, but will have mobile versions as well. Using this system, a relatively unsophisticated user can access the wealth of data stored in their organizations business intelligence system. The system can gather statistics on the user's interaction with the system to allow it to offer suggestions as to search terms, visualizations, reports, etc. The storage of the resulting searches and visualizations will also allow the system to have access to already formatted query statements and other information to make it run more efficiently.

IX. Computing Environments

Figure 18:
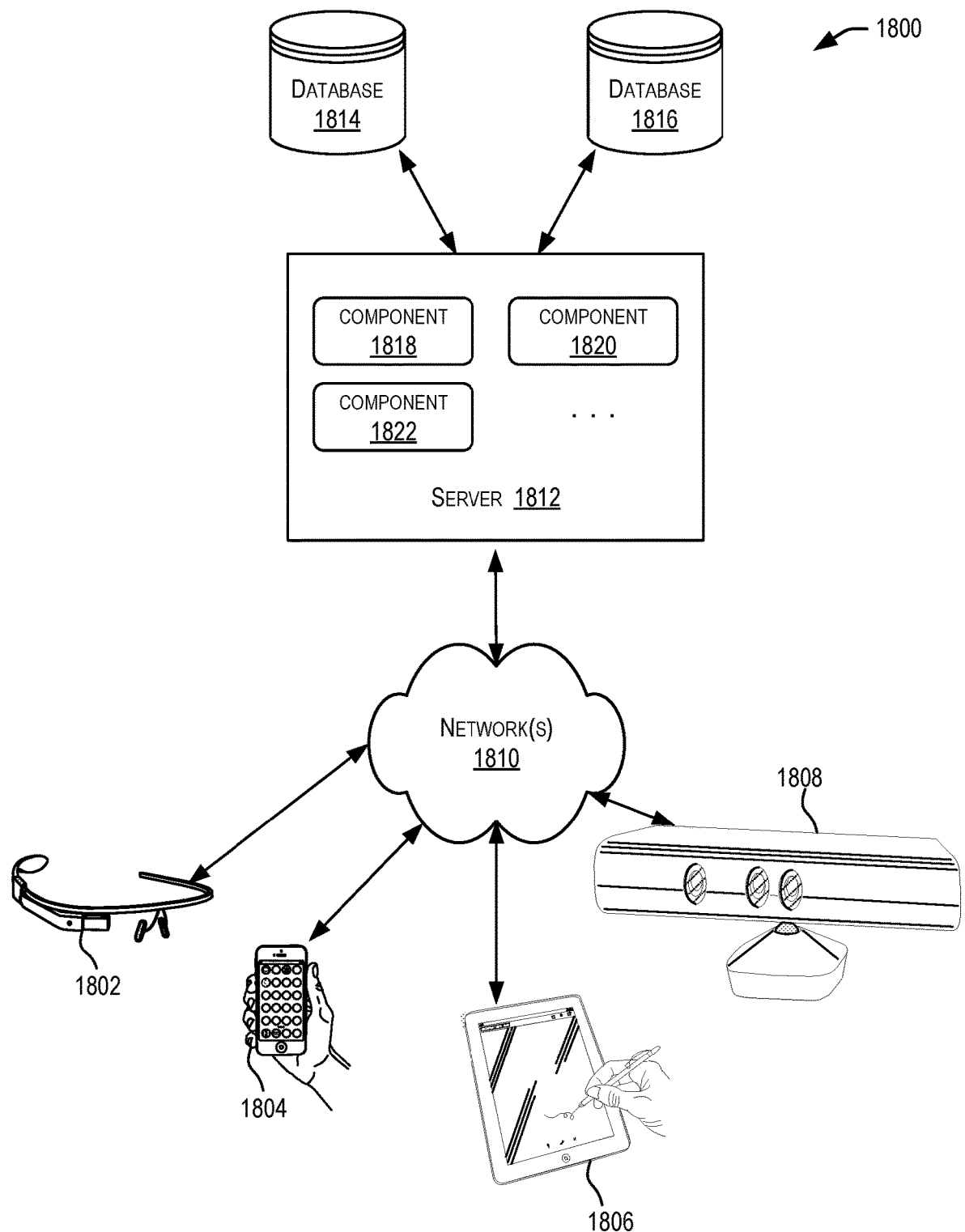
FIG. 18 depicts a simplified diagram of a distributed system for implementing an embodiment.

FIG. 18 depicts a simplified diagram of a distributed system 1800 for implementing an embodiment. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications. In certain embodiments, server 1812 may also provide other services or software applications can include non-virtual and virtual environments. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in FIG. 18, software components 1818, 1820 and 1822 of distributed system 1800 are shown as being implemented on server 1812. In other embodiments, one or more of the components of distributed system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in FIG. 18 is thus one example of a distributed system for implementing an embodiment system and is not intended to be limiting.

Client computing devices 1802, 1804, 1806, and/or 1808 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1810.

Although distributed system 1800 in FIG. 18 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 can include one or more virtual machines running virtual operating systems, or other computing architectures involving virtualization. One or more flexible pools of logical storage devices can be virtualized to maintain virtual storage devices for the server. Virtual networks can be controlled by server 1812 using software defined networking. In various embodiments, server 1812 may be adapted to run one or more services or software applications described in the foregoing disclosure. For example, server 1812 may correspond to a server for performing processing as described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. These databases may provide a mechanism for storing information such as user interactions information, usage patterns information, adaptation rules information, and other information used by embodiments of the present disclosure. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle that are adapted to store, update, and retrieve data in response to SQL-formatted commands.

Figure 19:
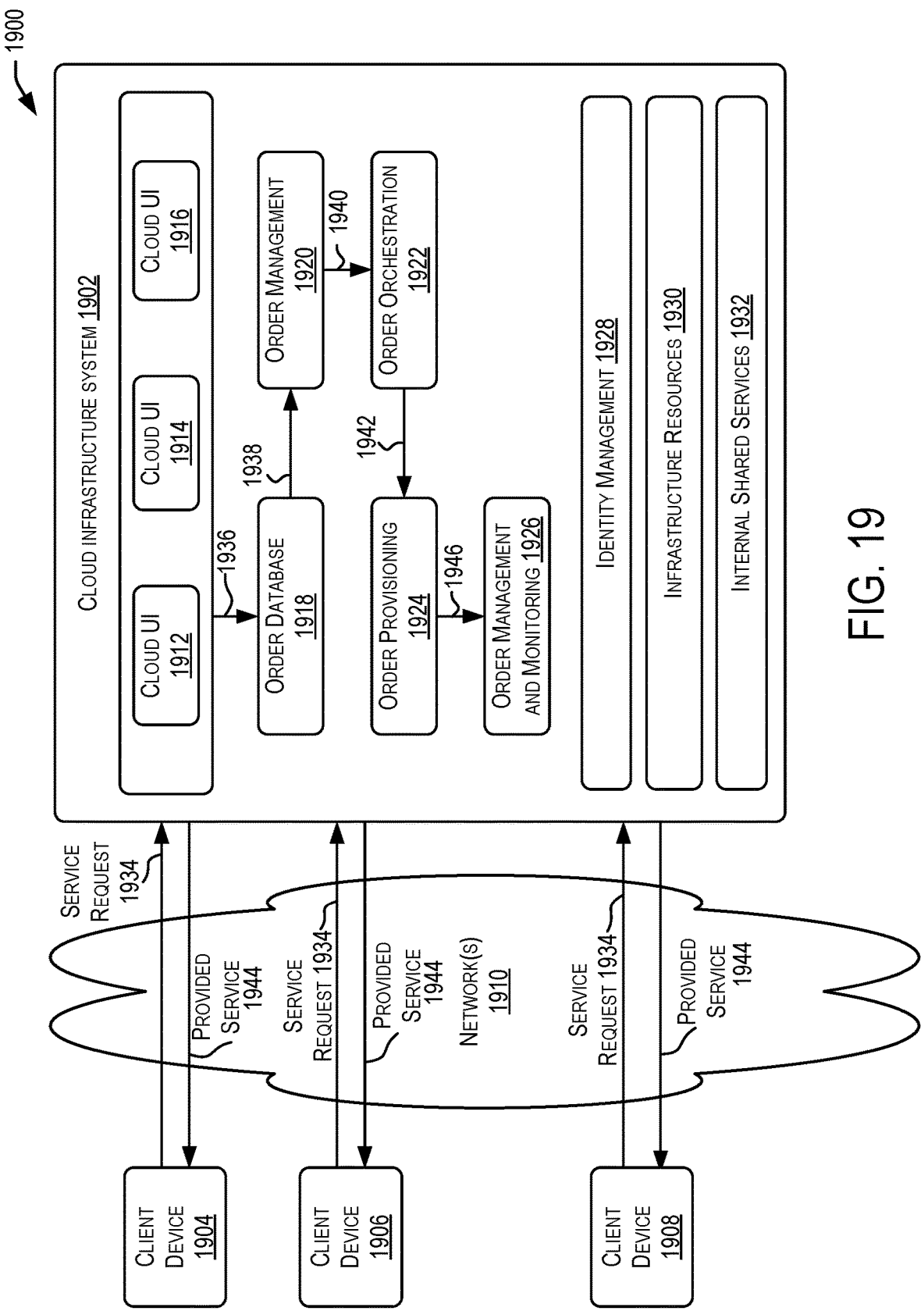
FIG. 19 illustrates a simplified block diagram of one or more components of a system environment in which services may be offered as cloud services, in accordance with an embodiment of the present disclosure.

In some embodiments, a cloud environment may provide one or more service. FIG. 19 is a simplified block diagram of one or more components of a system environment 1900 in which services may be offered as cloud services, in accordance with an embodiment of the present disclosure. In the illustrated embodiment in FIG. 19, system environment 1900 includes one or more client computing devices 1904, 1906, and 1908 that may be used by users to interact with a cloud infrastructure system 1902 that provides cloud services. Cloud infrastructure system 1902 may comprise one or more computers and/or servers that may include those described above for server 1812.

It should be appreciated that cloud infrastructure system 1902 depicted in FIG. 19 may have other components than those depicted. Further, the embodiment shown in FIG. 19 is only one example of a cloud infrastructure system that may incorporate an embodiment of the present disclosure. In some other embodiments, cloud infrastructure system 1902 may have more or fewer components than shown in the figure, may combine two or more components, or may have a different configuration or arrangement of components.

Client computing devices 1904, 1906, and 1908 may be devices similar to those described above for client computing devices 1802, 1804, 1806, and 1808. Client computing devices 1904, 1906, and 1908 may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902. Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between client computing devices 1904, 1906, and 1908 and cloud infrastructure system 1902. Each network may be any type of network familiar to those skilled in the art that can support data communications using any of a variety of commercially-available protocols, including those described above for network(s) 1810.

In certain embodiments, services provided by cloud infrastructure system 1902 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle Corporation) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some embodiments, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some embodiments, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1902 may also include infrastructure resources 1930 for providing the resources used to provide various services to customers of the cloud infrastructure system. In one embodiment, infrastructure resources 1930 may include pre-integrated and optimized combinations of hardware, such as servers, storage, and networking resources to execute the services provided by the PaaS platform and the SaaS platform, and other resources.

In some embodiments, resources in cloud infrastructure system 1902 may be shared by multiple users and dynamically re-allocated per demand. Additionally, resources may be allocated to users in different time zones. For example, cloud infrastructure system 1902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1932 may be provided that are shared by different components or modules of cloud infrastructure system 1902 to enable provision of services by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1902, and the like.

In one embodiment, as depicted in FIG. 19, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In an exemplary operation, at step 1934, a customer using a client device, such as client computing devices 1904, 1906 or 1908, may interact with cloud infrastructure system 1902 by requesting one or more services provided by cloud infrastructure system 1902 and placing an order for a subscription for one or more services offered by cloud infrastructure system 1902. In certain embodiments, the customer may access a cloud User Interface (UI) such as cloud UI 1912, cloud UI 1914 and/or cloud UI 1916 and place a subscription order via these Uls. The order information received by cloud infrastructure system 1902 in response to the customer placing an order may include information identifying the customer and one or more services offered by the cloud infrastructure system 1902 that the customer intends to subscribe to.

At step 1936, the order information received from the customer may be stored in an order database 1918. If this is a new order, a new record may be created for the order. In one embodiment, order database 1918 can be one of several databases operated by cloud infrastructure system 1902 and operated in conjunction with other system elements.

At step 1938, the order information may be forwarded to an order management module 1920 that may be configured to perform billing and accounting functions related to the order, such as verifying the order, and upon verification, booking the order.

At step 1940, information regarding the order may be communicated to an order orchestration module 1922 that is configured to orchestrate the provisioning of services and resources for the order placed by the customer. In some instances, order orchestration module 1922 may use the services of order provisioning module 1924 for the provisioning. In certain embodiments, order orchestration module 1922 enables the management of business processes associated with each order and applies business logic to determine whether an order should proceed to provisioning.

As shown in the embodiment depicted in FIG. 19, at step 1942, upon receiving an order for a new subscription, order orchestration module 1922 sends a request to order provisioning module 1924 to allocate resources and configure resources needed to fulfill the subscription order. Order provisioning module 1924 enables the allocation of resources for the services ordered by the customer. Order provisioning module 1924 provides a level of abstraction between the cloud services provided by cloud infrastructure system 1902 and the physical implementation layer that is used to provision the resources for providing the requested services. This enables order orchestration module 1922 to be isolated from implementation details, such as whether or not services and resources are actually provisioned on the fly or pre-provisioned and only allocated/assigned upon request.

At step 1944, once the services and resources are provisioned, a notification may be sent to the subscribing customers indicating that the requested service is now ready for use. In some instance, information (e.g. a link) may be sent to the customer that enables the customer to start using the requested services.

At step 1946, a customer's subscription order may be managed and tracked by an order management and monitoring module 1926. In some instances, order management and monitoring module 1926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1902 may include an identity management module 1928 that is configured to provide identity services, such as access management and authorization services in cloud infrastructure system 1902. In some embodiments, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.). Identity management module 1928 may also include the management of descriptive information about each customer and about how and by whom that descriptive information can be accessed and modified.

Figure 20:
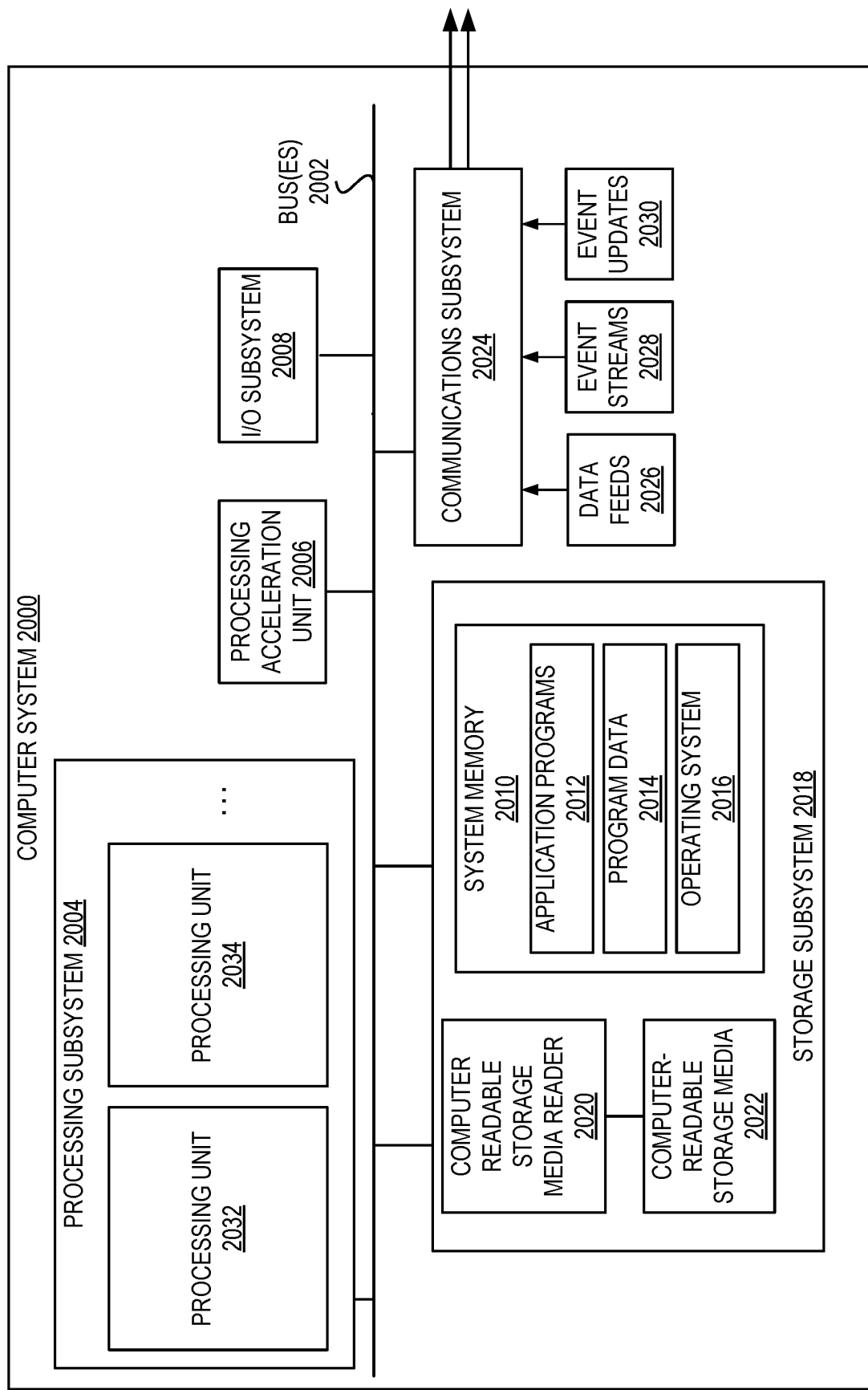
FIG. 20 illustrates an exemplary computer system that may be used to implement an embodiment of the present disclosure.

FIG. 20 illustrates an exemplary computer system 2000 that may be used to implement an embodiment of the present disclosure. In some embodiments, computer system 2000 may be used to implement any of the various servers and computer systems described above. As shown in FIG. 20, computer system 2000 includes various subsystems including a processing subsystem 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 may include tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2004 controls the operation of computer system 2000 and may comprise one or more processing units 2032, 2034, etc. A processing unit may include be one or more processors, including single core or multicore processors, one or more cores of processors, or combinations thereof. In some embodiments, processing subsystem 2004 can include one or more special purpose co-processors such as graphics processors, digital signal processors (DSPs), or the like. In some embodiments, some or all of the processing units of processing subsystem 2004 can be implemented using customized circuits, such as application specific integrated circuits (ASICs), or field programmable gate arrays (FPGAs).

In some embodiments, the processing units in processing subsystem 2004 can execute instructions stored in system memory 2010 or on computer readable storage media 2022. In various embodiments, the processing units can execute a variety of programs or code instructions and can maintain multiple concurrently executing programs or processes. At any given time, some or all of the program code to be executed can be resident in system memory 2010 and/or on computer-readable storage media 2022 including potentially on one or more storage devices. Through suitable programming, processing subsystem 2004 can provide various functionalities described above for semantic searching.

In certain embodiments, a processing acceleration unit 2006 may be provided for performing customized processing or for off-loading some of the processing performed by processing subsystem 2004 so as to accelerate the overall processing performed by computer system 2000.

I/O subsystem 2008 may include devices and mechanisms for inputting information to computer system 2000 and/or for outputting information from or via computer system 2000. In general, use of the term "input device" is intended to include all possible types of devices and mechanisms for inputting information to computer system 2000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2018 provides a repository or data store for storing information that is used by computer system 2000. Storage subsystem 2018 provides a tangible non-transitory computer-readable storage medium for storing the basic programming and data constructs that provide the functionality of some embodiments. Software (programs, code modules, instructions) that when executed by processing subsystem 2004 provide the functionality described above may be stored in storage subsystem 2018. The software may be executed by one or more processing units of processing subsystem 2004. Storage subsystem 2018 may also provide a repository for storing data used in accordance with the present disclosure.

Storage subsystem 2018 may include one or more non-transitory memory devices, including volatile and non-volatile memory devices. As shown in FIG. 20, storage subsystem 2018 includes a system memory 2010 and a computer-readable storage media 2022. System memory 2010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2000, such as during start-up, may typically be stored in the ROM. The RAM typically contains data and/or program modules that are presently being operated and executed by processing subsystem 2004. In some implementations, system memory 2010 may include multiple different types of memory, such as static random access memory (SRAM) or dynamic random access memory (DRAM).

By way of example, and not limitation, as depicted in FIG. 20, system memory 2010 may store application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2022 may store programming and data constructs that provide the functionality of some embodiments. Software (programs, code modules, instructions) that when executed by processing subsystem 2004 a processor provide the functionality described above may be stored in storage subsystem 2018. By way of example, computer-readable storage media 2022 may include non-volatile memory such as a hard disk drive, a magnetic disk drive, an optical disk drive such as a CD ROM, DVD, a Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable storage media 2022 may provide storage of computer-readable instructions, data structures, program modules, and other data for computer system 2000.

In certain embodiments, storage subsystem 2018 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for storing computer-readable information.

In certain embodiments, computer system 2000 may provide support for executing one or more virtual machines. Computer system 2000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2000. Accordingly, multiple operating systems may potentially be run concurrently by computer system 2000. Each virtual machine generally runs independently of the other virtual machines.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to establish a communication channel to one or more client computing devices via the Internet for receiving and sending information from and to the client computing devices.

Communication subsystem 2024 may support both wired and/or wireless communication protocols. For example, in certain embodiments, communications subsystem 2024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

Communication subsystem 2024 can receive and transmit data in various forms. For example, in some embodiments, communications subsystem 2024 may receive input communication in the form of structured and/or unstructured data feeds 2026, event streams 2028, event updates 2030, and the like. For example, communications subsystem 2024 may be configured to receive (or send) data feeds 2026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2024 may be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2000 depicted in FIG. 20 is intended only as a specific example. Many other configurations having more or fewer components than the system depicted in FIG. 20 are possible. Based on the disclosure and teachings provided herein, a person of ordinary skill in the art will appreciate other ways and/or methods to implement the various embodiments.

X. Mobile Interface Embodiments

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as User Interface (UI) software modules or components.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Such tasks may represent or be implemented via one or more software actions. A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on. The terms "software action" and "action" are employed interchangeably herein.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application. An example of a computing domain is a WebLogic Server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, routers, the Internet, administration servers, server cluster controllers, process schedulers, virtual machines, database management systems, mobile device managers, synchronization engines, Application Programming Interfaces (APIs), web services, and so on, are not necessarily explicitly called out in the figures. However, those skilled in the art with access to the present teachings will know which components to implement and how to implement them to meet the needs of a given implementation.

Figure 21:
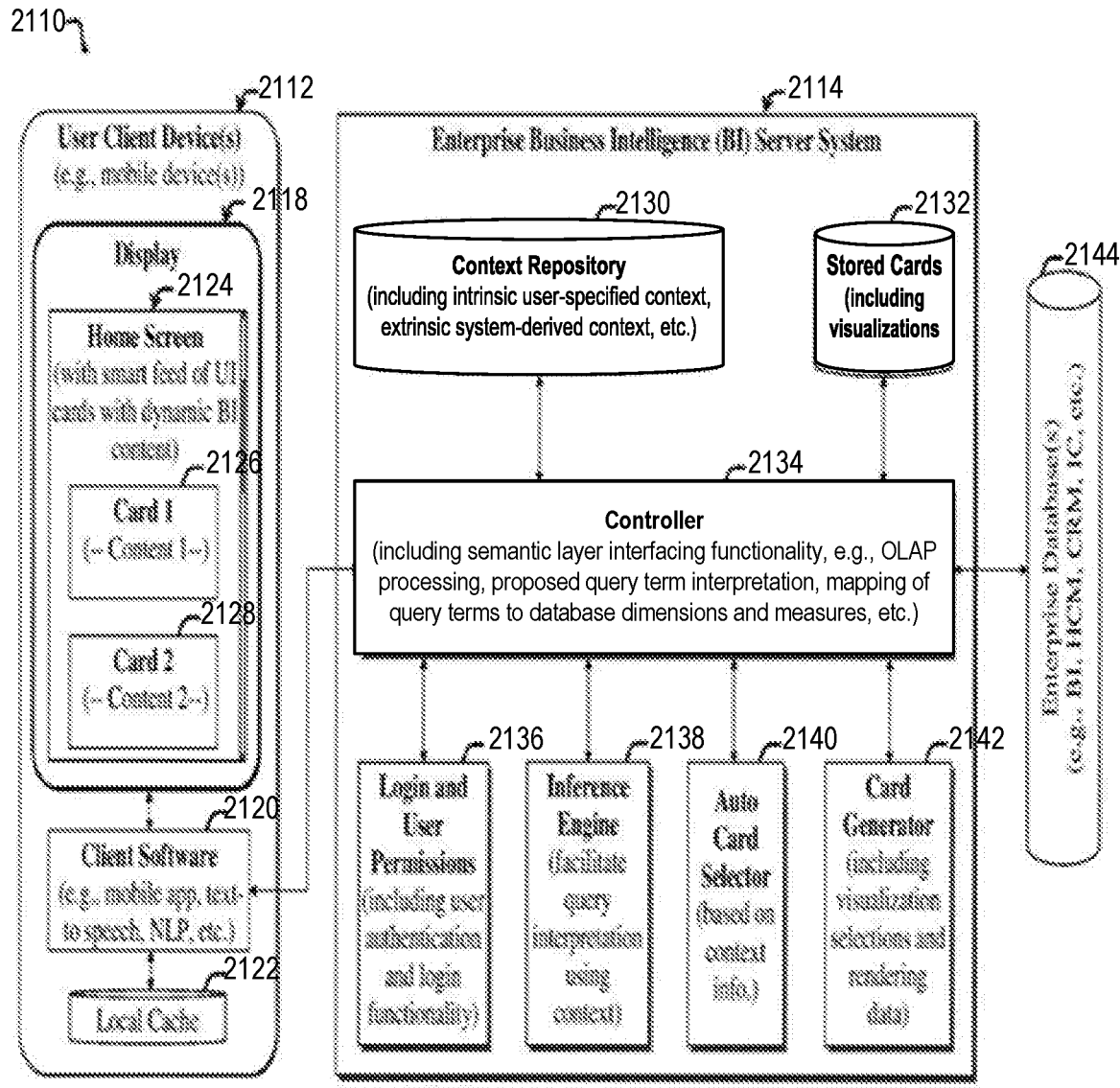
FIG. 21 illustrates a first example system and accompanying computing environment configured to enable selective context-based enterprise BI content delivery to one or more mobile computing devices, leveraging both intrinsic context information and extrinsic context information.

FIG. 21 illustrates a first example system 2110 and accompanying computing environment configured to enable selective context-based enterprise BI content delivery to one or more mobile computing client devices 2112, leveraging both intrinsic context (e.g., representing user-specified selections, conditions, etc.) and extrinsic context (e.g., overall system usage history, physical device location, user team membership, user data access permissions, etc.).

For the purposes of the present discussion, context information may be any metadata (e.g., data about or otherwise associated with other data or computing objects or entities) that may be associated with a user, user interaction with a computing device, a computing device (including software used by the computing device), and so on. The terms "context information" and "context" may be employed interchangeably herein.

A mobile device, also called a mobile computing device, may be any computer that is adapted for portable use. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on.

Intrinsic context information may be any context information that is specifically chosen or specified by the user, e.g., via user input. Examples of intrinsic context information characterizing information sought by a user include natural language query statements and expressions, user-specified bring back conditions, and so on. A bring back condition may be any user-specified data that when true, may be used to redisplay or retrieve content associated with the condition when the condition is met, as determined by the system with reference to extrinsic context information. Examples of bring back conditions are discussed more fully below.

Extrinsic context information may be any context information that is not explicitly chosen or specified by a user so as to affect software operation. Examples of extrinsic context information include, user data access permissions (e.g., associated with user login credentials), user computing device location (e.g., as indicated via a Global Positioning System (GPS) receiver), user teams or collaboration groups, business tasks assigned to a user, projects that a user is working on, data characterizing a history of user interaction with the system 2110, time of day, day of week, date, contact lists, information about who has recently contacted a user and where and how they were contacted, and so on. Extrinsic context information may also include aggregated metrics calculated from analysis of activities of plural users of the system 2110 (e.g., all authorized users interacting with the system 2110), and so on.

The example system 2110 may leverage both intrinsic and extrinsic context to facilitate efficient timely delivery of relevant BI content (e.g., analytics) to users, as discussed more fully below.

Business context information may include any context information that is related to a business entity, e.g., a resource, software application, employee, enterprise task, opportunity, contact, and so on. The terms "business context information" and "business context" are employed interchangeably herein.

As it pertains to Natural Language Processing (NLP), e.g., mechanisms for generating machine interpretations of natural language expressions, context information may include any information that may be employed to inform natural language processing to estimate user intent or meaning of natural language or portions thereof. User intent of a portion of natural language is said to be estimated if a meaning is associated with or attributed to the portion of natural language. Accordingly, context information may include any information pertaining to natural language input, including, but not limited to user data, such as user location information, calendar entries, appointments, business cycle information, contacts, employee performance metrics, user data access permissions or authentication level, and so on.

As it pertains to software visualizations (e.g., analytics and associated charts, graphs, diagrams, etc.), context information may include any information that is auxiliary to source data used to display a visualization. Source data may be any data used to build a structure of a visualization. For example, a corporate organizational chart may use employee names, employee enterprise roles, and hierarchal rules applicable to enterprise roles as source data to construct the organizational chart. In this example, context information may include, for example, information indicating that a user is seeking information as to whether a particular decision made by a particular employee was approved by the appropriate persons, or that the user is on a project pertaining to corporate compensation levels and may wish to ensure that higher level employees are not compensated less than lower level employees, and so on.

In the present example embodiment, the underlying system 2110 may collect context information via various mechanisms, such as via one or more user responses to a query; user answers to a questionnaire; monitoring of user software usage history; location information, and so on.

Context information is said to be associated with a user if the context information is associated with a device or software accessible to the user. For example, a mobile phone user may be employing a mobile device with a GPS receiver. The mobile device is said to be associated with the user, as is GPS location information provided by the GPS receiver thereof. Similarly, a user employing calendar software may enter appointments. Appoint information stored via the calendar software is associated with the user.

Accordingly, context information associated with a user (also called individual user context information) may include any context information pertaining directly to the user or pertaining to one or more tasks, opportunities, or other computing objects (e.g., business objects) that are associated with or otherwise employed by the user or used by software employed by the user).

Note that in certain embodiments discussed herein, user context information may be derived, in part, with reference to a permissions database that stores user enterprise access permissions, e.g., software and data access and use privileges. Note that user data may be any context information characterizing or otherwise associated with a user of software and/or hardware. For example, user data may include enterprise software permissions (i.e., privileges), job qualifications, such as work experience, education and related degrees, awards, and so on. User data may further include, for example, user job preferences, such as location, employer, vacation time allowed, hours worked per week, compensation (e.g., salary), and so on.

User privileges information may be any permissions or specification of permissions associated with a user, wherein the permissions specify whether or not and/or how a user may access or use data, software functionality, or other enterprise resources. Accordingly, user privileges information, also simply called user permissions or user privileges, may define what a user is permitted or not permitted to do in association with access to or use of enterprise resources, such as computing resources.

User job role information may include any data characterizing a position or description of a position held by the user at an enterprise. Accordingly, job role information may be a type of context information associated with the user, wherein the context information may also include user privileges information associated with the job role, i.e., position. For example, if a user is a system administrator employee, the user may have special permissions to change system configuration parameters and may then have access to various types of visualizations characterizing system architecture, operations, and so on.

In the example system 2110, the one or more mobile computing devices (e.g., smartphone, tablet, laptop, etc.) communicate with an enterprise BI server system 2114 via a network, such as the Internet. The BI server system 2114 communicates with backend enterprise databases 2144 (which may include warehouses or collections of databases), e.g., BI, HCM, CRM databases, and so on.

Note that various modules of the system 2110 may be grouped, arranged, coupled, and/or distributed differently than shown, without departing from the scope of the present teachings. For example, in an alternative grouping, the enterprise databases 2144 may be considered as part of the BI server system 2114. Similarly, some software functionality provided by the BI server system 2114 and enterprise databases 2144 may be offloaded to the client device 2112, e.g., enterprise content may be cached locally on the client device 2112 and used in an offline mode, as discussed more fully below. Similarly, in certain implementations, interconnections between modules may be different than those shown.

The example client device 2112 includes a display 2118 for presenting UI display screens, such as a home screen 2124, also called an activity screen, dashboard, smart feed of BI content, or simply feed.

For the purposes of the present discussion, a user interface display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or card (where a card may represent a sub-UI display screen within a larger UI display screen). Views or windows may include sections, such as sub-views or sub-windows, dialog boxes, graphs, tables, UI cards, and so on. In certain cases, a UI display screen may refer to all application windows presently displayed on a display.

For the purposes of the present discussion, a UI card may be UI display screen section. In various embodiments discussed herein UI cards may contain specific categories of content and associated enterprise data and/or analytics, as discussed more fully below.

The example home screen or smart feed 2124 of the client device 2112 includes a scrollable listing if UI cards, including a first example card 2126 and a second example card 2128. Examples of UI card types include analytic cards, detailed information cards, email cards, calendar cards, report cards, trending-data cards (also called "what's trending" cards), shared cards, activity summary cards, custom cards, and so on.

In general, content included in example analytic cards discussed herein may include analytics, e.g., interactive visualizations. For the purposes of the present discussion, an analytic may be any calculation or measurement based on a given input. Certain analytics may be displayed graphically. For example, an analytic that calculates a degree of a match between a user and a candidate position based on information about the user and various candidate positions may be displayed via a bar chart. In general, a graphically displayed analytic or other visual representation of data is called a visualization herein.

An interactive visualization may be any visualization that includes or is displayed in association with one or more UI controls enabling user interactions with the visualization and/or underlying data of the visualization. A user interaction may include any user input resulting in an adjustment to an appearance, behavior, type, or other property of a visualization.

Examples of interactions that may be supported by analytic cards discussed herein include drill-down (e.g., selection of a portion or node of a visualization to trigger display of additional details associated with data underlying the portion or node of the visualization), change chart type, pivot (e.g., changing chart axis), filter data, show/hide a group, data hierarchy, dimension, and so on. Note that user interactions and associated UI controls discussed herein with respect to analytic cards are not limited. For example, certain cards may be flipped or rotated to yield additional information; certain cards may support user edits to underlying data of a visualization, and so on.

For the purposes of the present discussion, underlying data may be any data used to generate a visualization, where nodes or components of the visualization may represent one or more objects, database dimensions, features, or other data characteristics. Hence, underlying data may include information and/or functionality represented by or corresponding to a node or visualization component, including link information. For example, a node representing a person in an enterprise organizational chart may be associated with additional underlying data that includes, for example, employee job title, phone number, address, and so on.

In various embodiments discussed herein, underlying data of a visualization may include structured data. Structured data may be any data organized or otherwise accessible in accordance with a data model, e.g., as may be provided via a relational database.

For the purposes of the present discussion, data dimension may be any category or classification of an amount or category. For example, columns of a table may represent data dimensions. The terms "data dimension" and "database dimension" may be employed interchangeably herein.

In the present example embodiment, the UI cards 2126, 2128 represent a home screen list of analytic cards that may be automatically selected by the system 2110 (as discussed more fully below) to populate the home screen 2124 based on context information. The context information may include information about what the user has been doing, i.e., user activity, e.g., who recently emailed, texted, or called the user, where the user was when contacted (i.e., where the computing client device 2112 associated with the user was), where the user (i.e., user device 2112) currently is located (as indicated by the GPS location of the mobile device 2112), the current time of day, date, what projects and/or business tasks the user is working on, what teams or enterprise groups the user is associated with, which content the user has been interacting with, user software navigation history, user interaction logs (e.g., tracking usage of the system 2110), and so on.

Cards that change or update throughout the day, e.g., in approximately real time, to reflect changing context; changing underlying data, etc., are called dynamic cards or dynamically updating cards herein. Note that in certain embodiments discussed herein, automatic selection of cards 2126, 2128 is not limited to selections based on individual user context, but may leverage aggregated context information derived or collected from plural users of the system 2110, including all users of the system 2110 or subsets thereof. Examples of subsets of users for which context may be aggregated and used include particular enterprise teams, contacts related by social network connections, persons sharing cards with nearby users, and so on.

The UI cards 2126, 2128 are rendered in part using client software 2120. In the present example embodiment, client software 2120 (also called a mobile application) includes Graphical User Interface (GUI) software in communication with speech-to-text software, Natural Language Processing (NLP) software, network communications modules (e.g., mobile synchronization functionality to synchronize communications with the BI server system 2114 over a network), and so on. Those skilled in the art with access to the present teachings may readily determine, implement, and incorporate appropriate software modules and associated software functionality to meet the needs of a given implementation, without undue experimentation.

Note that in alternative implementations, certain functions of the client software 2120 may instead be located on the BI server system 2114 and/or on other servers in communication with the BI server system 2114. For example, in certain implementations, the client software 2120 may be implemented via a mobile browser used to access a website hosted by a web server, which in turn uses web services and/or APIs to interface with one or more application servers of the BI server system 2114 to facilitate updating the UI cards 2126, 2128.

In the present example embodiment, the client software 2120 is implemented via a mobile application configured to communicate with and synchronize with a controller module 2134 of the BI server system 2114 to selectively retrieve data (including analytics) needed to implement the UI display home screen 2124 and accompanying UI cards 2126, 2128. Data retrieved to the client device 2112 during a particular session may be locally cached in a local client-side cache 2122. Accordingly, a user of the client device 2112 will be able to operate the client software 2120 and view and interact with cards 2126, 2128 that leverage data and/or instructions that are cached in the local cache 2122.

The example BI server system 2114 leverages functionality provided by various modules 2130-2142. The controller 2134 includes software functionality that facilitates interfacing and using data and functionality from various modules, including a user login and permission module 2136, an inference engine 2138, an automatic card selection module 2140 (also called auto card selector), a card generator module 2142, a context information repository 2130 (also simply called a context repository), stored cards 2132 (i.e., stored card content for each user), and one or more enterprise databases 2144.

Note that some of the software functionality provided by the modules 2130-2142 may alternatively and/or additionally be implemented via the client software 2120. For example, in certain implementations, the inference engine 2138 may be implemented client-side on the client device 2112.

The example controller 2134 includes semantic layer interfacing functionality, including OnLine Analytical Processing (OLAP), additional query term or expression (i.e., natural language input) interpretation (e.g., based on aggregated user context information) functionality, functionality for the mapping of query terms to database dimensions and measures, and so on.

For the purposes of the present discussion, natural language input may be any instruction or information provided via spoken or written (e.g., typed) human language. Examples of language input usable with certain embodiments discussed herein include voice queries and/or commands (which are then converted into text), text messages (e.g., Short Message Service (SMS) text messages), emails containing text, direct text entry, and so on. Natural language input provided to trigger a search for enterprise content is called a natural language query herein.

The login and user permissions module 2136 includes computer code for facilitating user login to the BI server system 2114. When initially accessing the BI server system 2114 using the client device 2112, the user may enter login information (e.g., username and password, biometric information, etc.) or may otherwise submit a biometric sample (e.g., fingerprint scan) to facilitate confirming user identity and application of appropriate restrictions, e.g., data access permissions, to the user client device session with the BI server system.

Note that user identity and associated data access permissions may represent a type of context information usable by the system 2110 to selectively adjust content provided via the cards 2126, 2128. In general, for the purposes of the present discussion, an identity of a user may be any information identifying a user. For example, a user's identity may include login information, email address, phone number, name, biometric sample, and so on. Certain embodiments discussed herein may employ any such identifying information to facilitate, for example, determining a mostly likely command or query term intended by particular language input or software interaction. The identifying information may be further used to associate the user of the client device 2112 with user-specific data maintained via the BI server system 2114, e.g., user context information stored in the context repository 2130, stored cards 2132, and so on.

The inference engine 2138 includes computer code for facilitating query term or expression interpretation, e.g., using context information maintained via the context repository 2130. The inference engine 2138 may be used to infer, for example, that the term "profitability" actually refers to a "profit margin" dimension of an OLAP hypercube harvested from the enterprise databases 2144 via the controller 2134 and associated interfaces, as discussed more fully below with reference to FIGS. 35 and 36.

The auto card selector module 2140 (which may alternatively and/or additionally be implemented client side, i.e., on the client device 2112) facilitates accessing OLAP hyper cubes; mapping of natural language input expressions into Multi-Dimensional eXpressions (MDX); and selection of card types in accordance with the mappings of the input expressions into database dimensions, measures, analytic calculations, and so on.

The card generator 2142 includes computer code for facilitating organizing data for use in visualizations, selections of visualizations in accordance with card type determined by the auto card selector 2140, collecting rendering data used to render the card, and so on. Note that certain functions of the card generator 2142 may also be implemented client-side, e.g., generation of card rendering instructions.

Various functional modules 2136-2142 of the BI server system 2114 may access data from the context repository 2130 and from the stored cards repository 2132 via interfacing functionality included in the controller 2134. The example context repository includes intrinsic user-specified context information, extrinsic system-derived context information, and so on.

Note that the context information maintained by the context repository 2130 may include dynamic context information, e.g., context information subject to periodic or daily change, including context information subject to approximately real time change. An example of dynamic context information subject to approximately real time change includes GPS location information characterizing the client device 2112. Additional dynamic context information may include context information indicating who the user is communicating with (and/or has been communicating with), where the user is located, what interactions the user is performing using the system 2110, when the user is performing the interactions (e.g., communicating, sharing content, following content of other users, and so on), and so on.

Note that the present example embodiment may facilitate dynamic context-based push of BI content to the home screen 2124, such that the home screen 2124 is updated periodically or in approximately real time with BI content that is calculated or otherwise determined based in part on dynamic context information.

The dynamic context information may include dynamic extrinsic context information, such as context information that changes based on user interaction with a mobile computing device, e.g., the client device 2112. The user interaction with the mobile computing device 2112 may include moving the device to different locations or regions; automatically updating employee key performance indicators, and so on.

Similarly, non-dynamic context information may include any context information that is not based solely on user interaction with the system 2110 via the client device 2112, e.g., user data access permissions, user name, job role, and so on.

Note that various implementations of the BI server system 2114 are possible and are not limited to that shown in FIG. 21. Additional details of an example server system that may be leveraged to implement various embodiments discussed here are discussed in the above-identified and incorporated U.S. Patent application, entitled "SEMANTIC SEARCHES IN A BUSINESS INTELLIGENCE SYSTEM," which is fully incorporated by reference herein.

Figure 22:
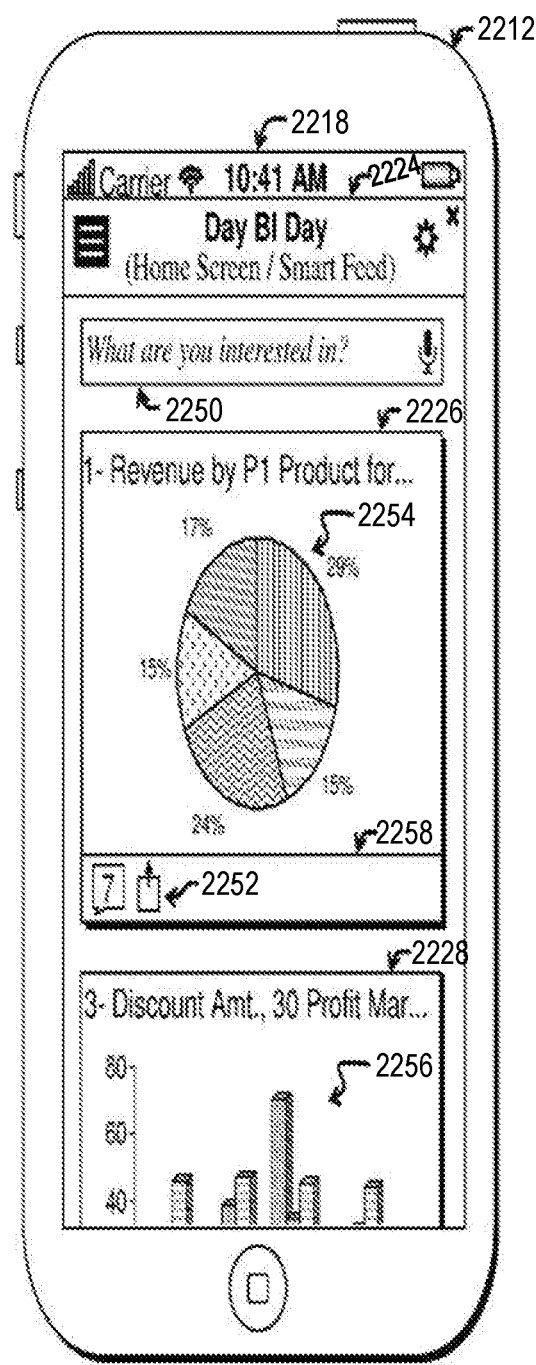
FIG. 22 illustrates a first example User Interface (UI display screen) suitable for use with the example system of FIG. 21 and representing a home screen (also called dashboard) with dynamically updatable (in accordance with changing context information) UI display screen sections and content, representing a sharable BI content smart feed.

FIG. 22 illustrates a first example UI display screen 2224 (shown on a touch display 2218 of the client device 2212, e.g., mobile computing device, also simply called mobile device) suitable for use with the example system 2110 of FIG. 21 and representing a home screen (also called dashboard) with dynamically updatable (in accordance with changing context information) UI display screen sections 2226, 2228 and content, representing a sharable BI content smart feed (also called activity feed or dashboard feed).

The example activity feed of UI cards 2226, 2228 includes a first UI card 2226, and a second UI card 2228. Note that the activity feed of UI cards 2226, 2228 may include several additional UI cards that are not shown in the home screen 2224 of FIG. 22, but which may be revealed in response to scrolling, e.g., via an upward swipe gesture on the touch display 2218.

The home screen includes a query entry field 2250, which may represent a UI control for enabling a user to enter natural language input, e.g., electronic text-based queries. For the purposes of the present discussion, electronic text may be any electronic representation of one or more letters, numbers or other characters, and may include electronic representations of natural language, such as words, sentences, and so on. The terms "electronic text" and "text" are employed interchangeably herein.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Electronic text entered into the text field 2250 may be entered via voice, i.e., by speaking into a microphone of the mobile device 2212; by typing text into the field 2250; or via other mechanisms (e.g., handwriting using a stylus and handwriting recognition software functionality). When voice is used to enter electronic text into the query entry field 2250, underlying speech-to-text functionality (which may include software, e.g., APIs running on the mobile device and/or on a server accessible to the mobile device 2212) converts spoken words and phrases into text, which is then automatically entered into the field.

In response to entry of natural language input into the text field 2250, underlying software parses and analyzes each expression of the natural language input and may determine candidate matches for each expression. When the text is entered using voice, the entire natural language input may be treated as a single expression, such that the underlying software estimates user intent behind the entire string of natural language input.

For the purposes of the present discussion, user intent of a portion of natural language, such as an entered query, is said to be estimated if a meaning is associated with or attributed to the portion of natural language. Accordingly, context information may include any information pertaining to natural language input, including, but not limited to user data, such as user location information, calendar entries, appointments, business cycle information, and so on.

Figure 28:
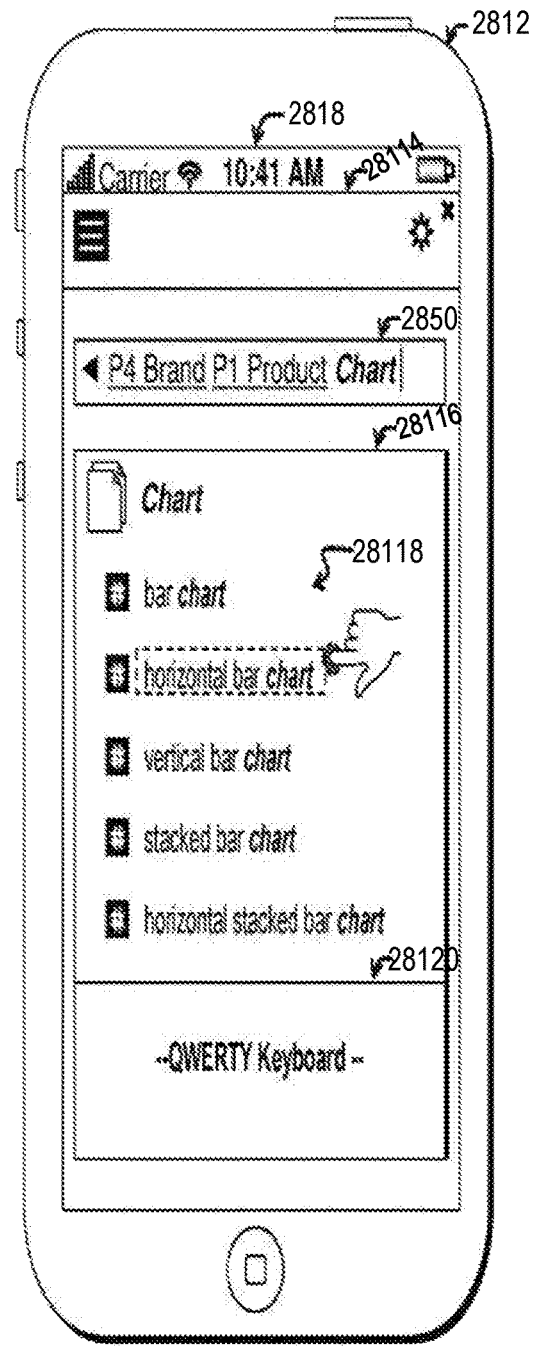
FIG. 28 illustrates a fifth example UI display screen showing example query entry functionality, enabling users to select among plural meanings for entered natural language terms, and in this case, to select among different types of charts or visualizations after entering the term "chart."
Figure 34:
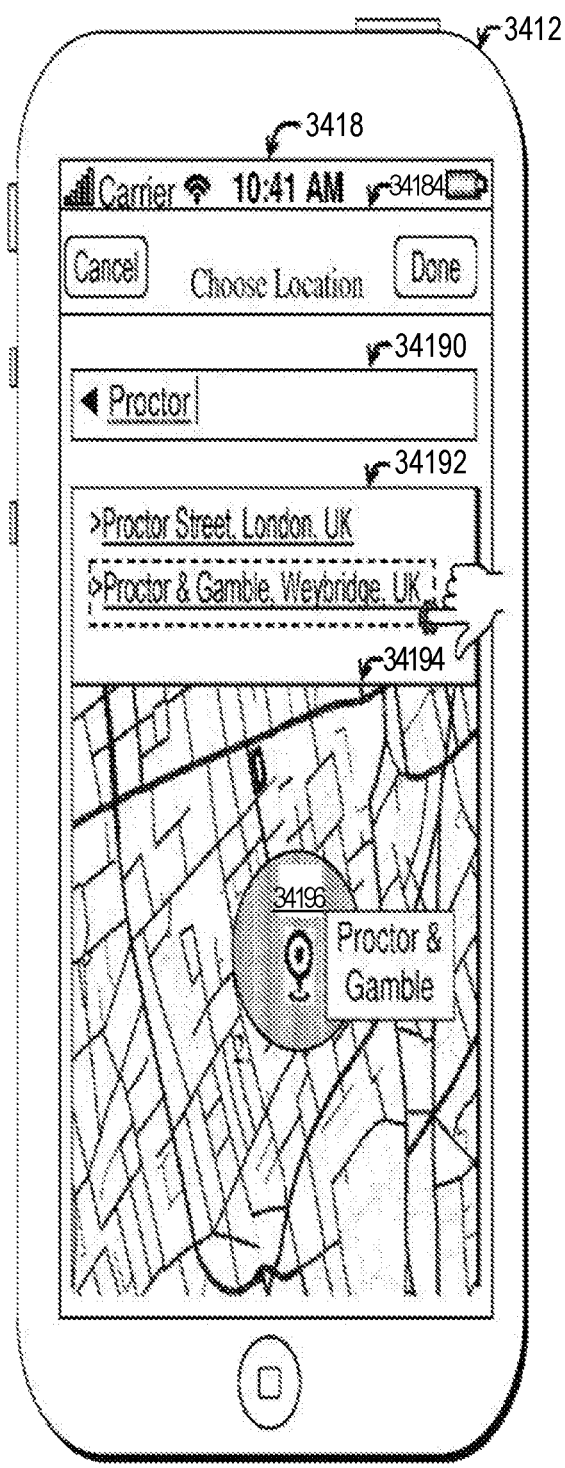
FIG. 34 illustrates a tenth example UI display screen showing additional user options for specifying a bring back condition pertaining to a particular device location or region.

When text is entered via typing, as each term or expression of the natural language input is entered, a search may be conducted, resulting in a listing of user selectable candidate interpretations for each entered expression (e.g., as exemplified in FIGS. 28 and 34). The underlying system (e.g., the system 2110 of FIG. 21) may remember user selections of proposed terms in association with typed expressions, and then store associated information pertaining to the user selections as metadata (i.e., context information) for subsequent use in refining the list of terms displayed when the term is subsequently typed. Such user context information based on user selections may also facilitate machine interpretation of entire sentences entered via voice input, as discussed more fully below with reference to FIGS. 35 and 36.

In response to entry of a natural language query, the UI display screen 2224 may change to reflect content identified by the query. The changed UI display screen 2224 may include different UI cards that are not necessarily initially included in the home screen 2224. However, during the course of a given day or other time interval (which may be implementation specific), UI cards generated in response to queries (and/or other interactions with the underlying software) may appear in the smart feed of the home screen 2224. Cards appearing in the home screen 2224 and constituent feed may be selectively dismissed (e.g., by using a "Don't show" UI control) by a user, and removed from the home screen 2224, as discussed more fully below (e.g., with reference to FIG. 32).

In the present example embodiment, a user has been interacting with enterprise content pertaining to revenue, discount amount, etc., as reflected by the appearance of the UI cards 2226, 2228.

The first example UI card 2226 represents an analytic card that includes an interactive visualization (which is a pie chart in the present example) illustrating a revenue breakdown in accordance with a previously entered query, and/or based on other context information that may indicate that the enterprise content represented by the first UI card 2226 may be of interest to the user. User interaction with the first visualization 2254 may be facilitated via UI controls (e.g., controls 2252 included in a UI card footer section 2258), which may provide various user options to manipulate the UI card 2226 and associated content (represented by the first visualization 2254).

For the purposes of the present discussion, information visualization may be any process involving graphically representing data according to a method or scheme. A graphical representation or rendering of data resulting from an information visualization technique is called a visualization. Example visualizations include pie charts, treemaps, bar charts, line graphs, and so on.

Note that, in general, a visualization may be coupled to our be considered to include one or more user interface controls, which are associated with software functionality, whereby user selection of the user interface control triggers execution of a software action.

Note that some UI controls (also called options herein) to interact with the first visualization 2254 may be integrated directly into the visualization 2254. For example, a tap-and-hold gesture on one of the sections of the pie chart 2254 may trigger display of a hover layer with additional details pertaining to the selected section. The hover layer may also include one or more UI controls (e.g., buttons, menus, etc.) to perform additional software actions (e.g., pivoting, data filtering, further drilling down to show even more detailed information pertaining to the selection, and so on).

Examples of possible user interactions with the first visualization 2254 include clearing or changing visualization title, axis labels, etc.; converting the visualization into a thumbnail; rating the usefulness of the visualization (e.g., thereby providing additional context information usable by the underlying system); sharing the UI card 2226 and content with other users (e.g., nearby users, users of a particular enterprise team, users in a similar social network hierarchy or grouping, people in a contact list of the user, etc.); expanding or maximizing the card 2226 so that it occupies a larger are of the UI display screen 2224; specifying conditions for bring back or redisplaying the visualization at a different time, place, other context setting, and so on (as discussed more fully below); dismissing and/or otherwise removing the UI card 2226 from the home screen 2224; accessing more information (e.g.,) about the UI card 2226 (e.g., by virtually flipping or rotating the UI card 2226 to reveal information that appears to be behind or on the back of the UI card 2226); and so on.

Examples of additional information and/or UI controls that may be available after flipping a card include UI controls for providing additional control over subsequent card behaviors and displayed controls, features, and content. Example details that may be revealed in response to a flipping of a UI card include data indicating when card was last updated, who the card has been shared with, the number of user views associated with the card, who viewed the card (i.e., context information associated with the card). A flipped card may provide additional user options or UI controls for setting additional priorities and properties for visualization types to display when certain contextual conditions are met, and so on.

Similarly, the second UI card 2228 includes an interactive visualization 2256 pertaining to potentially relevant subject matter, e.g., enterprise content estimated by the underlying system to be of potential interest to the user.

In summary, FIG. 22 shows a particular embodiment where a user is running the smart feed on a mobile computing device, e.g., smartphone. In other embodiments, other computing devices can be used such as a tablet, laptop, desktop, smart watch, etc.

Figure 23:
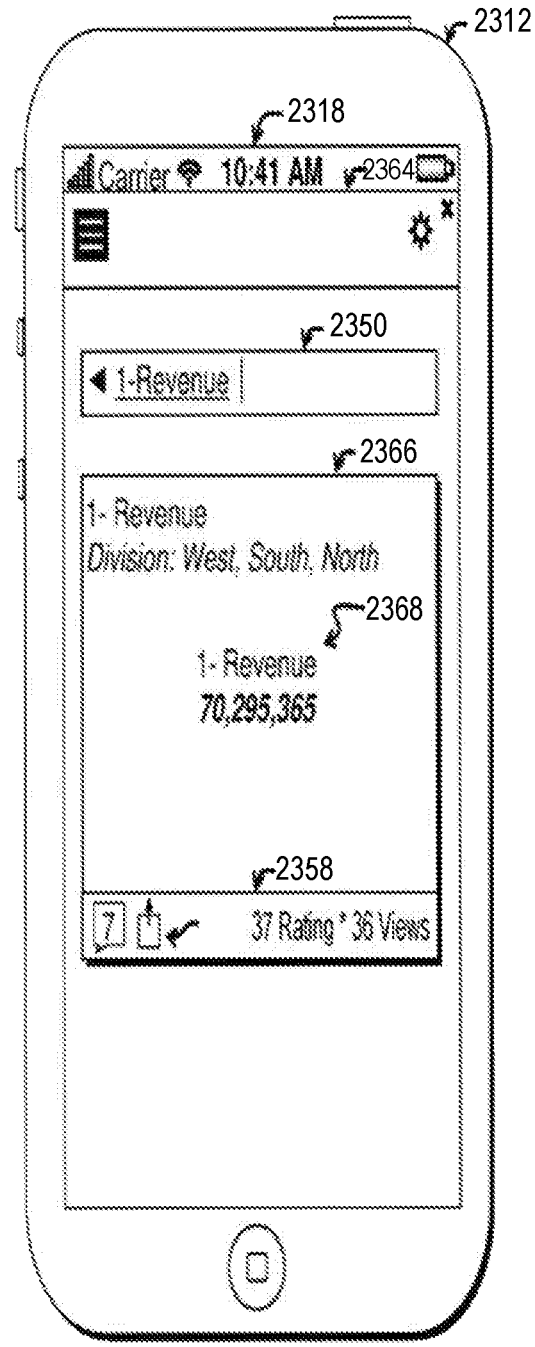
FIG. 23 illustrates a second example UI display screen, where a user has typed a simple natural language query and has selected to display revenue, resulting in display of a UI display screen section (also called card) with content determined based on the query and any applicable extrinsic context information.

FIG. 23 illustrates a second example UI display screen 2364, where a user has typed a simple natural language query specifying "Revenue" into the query field 2350, thereby selecting to display revenue. Information about revenue (pertaining to a particular entity) that is estimated or judged by the underlying system (by referencing context information) to be of interest to the user is shown in a subsequently displayed UI display screen section 2366 (i.e., UI card).

Note that the displayed UI card 2366 need not show a visualization, but can instead simply indicate a revenue amount in text form. Content 2368 of the revenue UI card 2366 is determined by the underlying system based on the query (representing a type of intrinsic context information) and any applicable extrinsic context information.

In summary, FIG. 23 shows that the user has entered the word "Revenue," and the system then displays information on, for example, total revenue. The revenue is associated with a context such as a particular company, division, market, etc., that the user had specified or was working with before.

Figure 24:
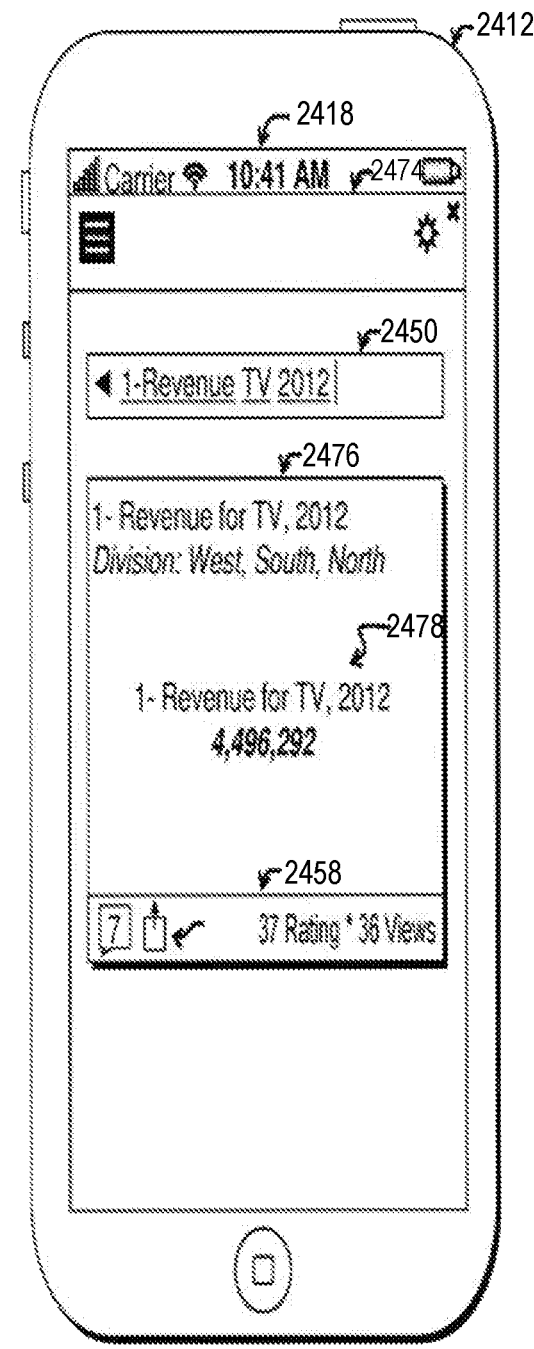
FIG. 24 illustrates a third example UI display screen after a user has added additional limitations (natural language input search terms) to the query of FIG. 23, resulting in further filtered or adjusted results, as presented in an updated UI card.

FIG. 24 illustrates a third example UI display screen 2474 after a user has added additional limitations (natural language input search terms) to the query entered in the query field 2350 of FIG. 23, resulting in further filtered or adjusted results, as presented in an updated UI card 2476.

The additional terms include "TV" and "2012." Accordingly, updated content 2478 of the updated UI card 2476 includes revenue information for TV sales for the year 2012 for a particular business entity estimated by the system to be of importance to or otherwise associated with the user.

In summary, FIG. 24 shows the effect of the user adding the words "TV" and "2012" to the query text field 2450 (also called text box). As the user types added words, the associated filtered data (that is further filtered based on the additional terms) is used to update the UI display screen 2474 so that in FIG. 24, the data being shown is revenue for television (i.e., TV) sales in 2012.

Figure 25:
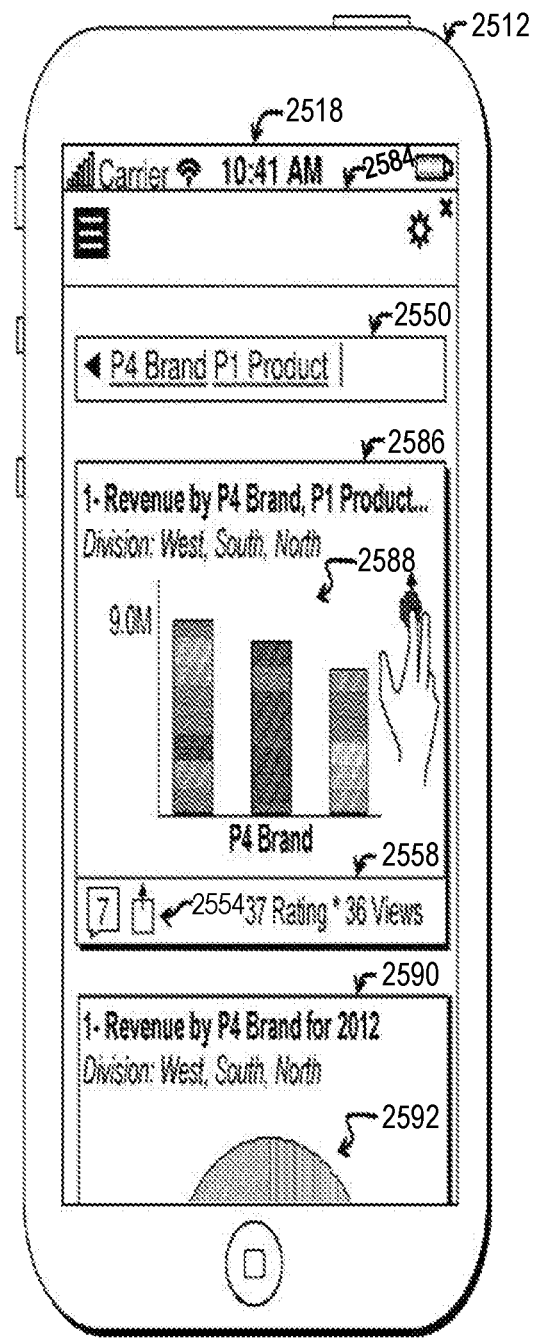
FIG. 25 illustrates a fourth example UI display screen showing a first portion of plural UI cards, wherein the plural UI cards include updated enterprise content responsive to further updates to the natural language query of FIG. 24.

FIG. 25 illustrates a fourth example UI display screen 2584 showing a first portion of plural UI cards 2586, 2590, wherein the plural UI cards 2586, 2590 include updated enterprise content 2588, 2592 responsive to further updates to the natural language query entered in the text field 2450 of FIG. 24.

The text field 2550 in FIG. 25 includes additional terms (i.e., "P4 Brand" and "P1 Product") added to the natural language input, such that the natural language input represents a query expression stating "Revenue TV 2012 P4 Brand P1 Product." The additional terms represent additional intrinsic context that filters and/or adds data dimensions to data underlying enterprise content that underlies cards 2586, 2590 displayed in the fourth example UI display screen 2584.

The adjusted underlying data facilitates automatic generation of visualizations 2588, 2592, in response to the query adjustment, including a vertical stacked bar chart 2588 that incorporates all data dimensions, including 2012 revenue, P4 Brand, and P1 product in the underlying data.

The second automatically generated card 2590 that is generated in response to the query entered in the text field 2550 includes a pie chart 2592 based on the underlying data of the stacked vertical bar chart 2588 of the first card 2586, but filtered to remove one data dimension, e.g., P1 Product, from the underlying data used to generated the stacked bar chart 2588.

In the present example embodiment, three UI cards were automatically generated in response to the query input in the text field 2550. While only two UI cards 2586, 2590 are shown in FIG. 25, additional cards can be revealed, e.g., in response to a vertical scroll of the updated UI display screen 2584.

The first card 2586 includes enterprise content with all database dimensions of the query, whereas subsequent cards, e.g., the second card 2590 leverages similar underlying data, but which has been selectively filtered to provide additional user insight and views of the underlying data.

The exact choice of which cards to show in response to the query and which filters and visualizations to show in the cards 2586, 2590 are determined by the underlying system (e.g., system 2110 of FIG. 21) based on context information, e.g., user software interaction history, e.g., navigation history, content selection history, visualization selection history, and so on. Recall that various UI controls may be provided in each card 2586, 2590 enabling user adjustments to the UI cards 2586, 2590.

The underlying system may remember any user adjustments, including chart selections, preference ratings, and so on, for the entered query. Accordingly, the next time the user enters a similar query, the UI cards 2586, 2590, reflect the previous modifications (the modifications of which generate a type usage context information). Recall that automatically selected UI cards and associated visualizations and visualization types that are initially shown may also incorporate aggregated context information from plural users, and/or extrinsic context information characterizing the user (e.g., data access permissions, data about the enterprise for which the user works, and so on).

Exact details of the content-selection algorithm and system are implementation specific and may be varied to meet the needs of a given implementation, without departing from the scope of the present teachings.

Figure 26:
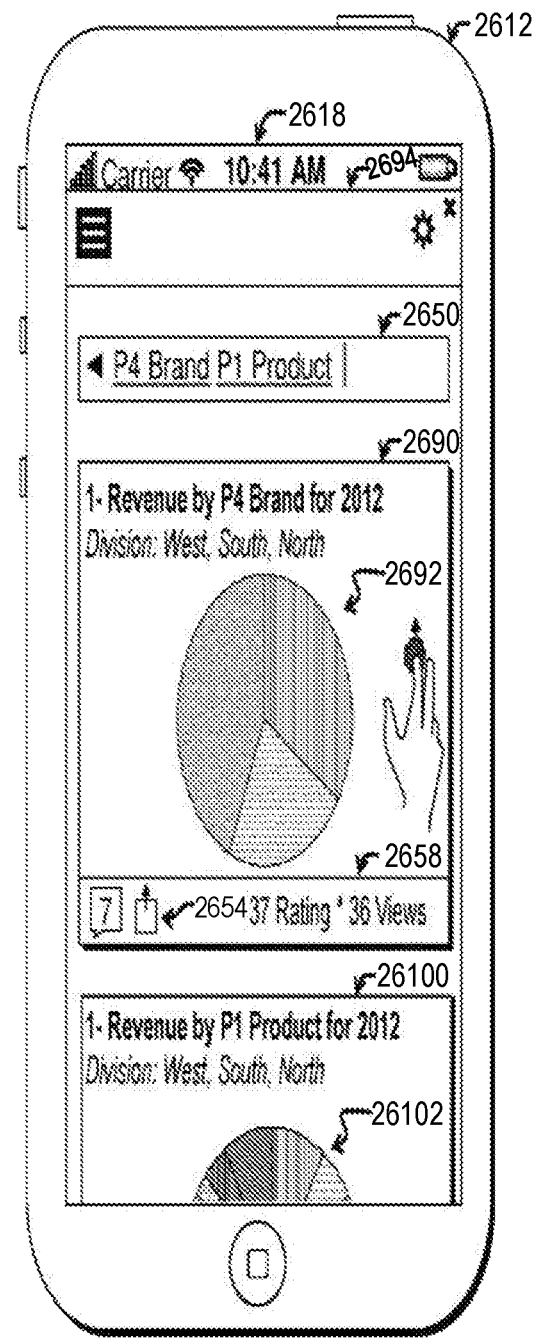
FIG. 26 illustrates second portion of the plural UI cards of FIG. 25, which more clearly shows a second UI card, which represents a filtered version of a first UI card that is shown in FIG. 25.

FIG. 26 illustrates second portion 2654 of the plural UI cards 2586, 2590 of FIG. 25, which more clearly shows (after a vertical scroll of the UI display screen 2584 of FIG. 25) the second UI card 2690, which illustrates content representing a filtered version of content underlying the first UI card 2586 shown in FIG. 25.

The result of the scroll operation applied to the UI display screen 2584 of FIG. 25 further reveals a portion of a third card 26100 and accompanying third visualization 26102. Data underlying the third visualization 26102 includes data represented by the first visualization 2588 of FIG. 25, but filtered to shown revenue by P1 product for 2012, as opposed to revenue by both P1 product and P4 brand (represented by the first visualization 2588) or revenue by just P4 brand (represented by the second visualization 2692).

Note that more complex queries entered in the text field 2650 may result in display of additional UI cards that facilitate enabling the user to view data associated with the query from different perspectives resulting from application of different filters to the underlying data. By facilitating multiple perspectives of the underlying data, users may more readily understand that data from different visual perspectives, thereby potentially providing additional user insights and a deeper understanding of enterprise content retrieved in response to the search.

Figure 27:
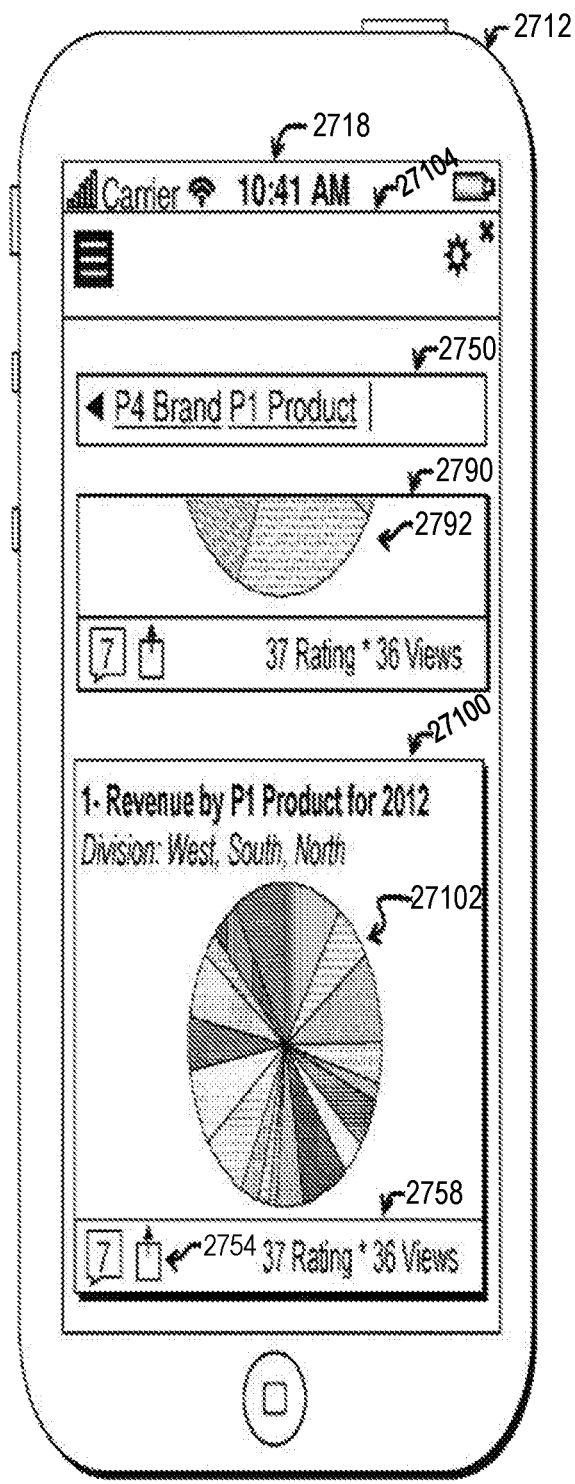
FIG. 27 illustrates a third portion of the plural UI cards of FIG. 25, which more clearly shows a third UI card.

A further UI scroll applied to the second portion 2654 of the search results (corresponding to the scrollable listing of cards 2750, 2790 and 27100) further reveals the entire third UI card 27100, as shown in FIG. 27.

FIG. 27 illustrates a third portion 27104 of the plural UI cards 2586, 2590, 100? of FIG. 25, which more clearly shows the third UI card 27100 and accompanying third visualization 27102.

In summary, with reference to FIGS. 25-27, three data visualizations 2588, 2692, 27102 included in three respective UI cards 2586, 2590, 27100 are shown. In FIG. 25 the user has entered additional query terms as "P4 Brand" and "P1 Product." The first visualization 2588 shown in FIG. 25 is a stacked bar chart that includes revenue, brand and product all in one chart. The user didn't have to specify the format of the visualization as it is determined automatically by the system and offered up as a desirable, or most likely desired, format for viewing the data.

The second visualization 26102 (accessed by swiping the display upwards) is a pie chart showing revenue distribution by brand. This chart 26102 is one that is automatically suggested by the system as one that the user may be interested in based on the search, while not literally following all the keywords in the search.

Similarly, the third visualization 26102 of FIG. 26 is still in response to the same user query and compares revenue by product as an automatically recommended and presented visualization in order to help the user perform data analysis such as to spot trends, anomalies, etc.

FIG. 28 illustrates a fifth example UI display screen 28114 showing example query entry functionality, enabling users to select among plural meanings for entered natural language terms, and in this case, to select among different types of charts or visualizations after entering the term "chart" in the text field 2850.

In response to entering the term "chart" as part of a natural language query, the underlying system automatically determines that the user may wish to view chart options. Accordingly another UI card appears 28116 with various user options 28118 to specify a type of chart to include among the search results returned in response to the portion of the query before the term "chart."

Note that a QWERTY keyboard 28120 may also selectively appear among UI display screens to facilitate entering or adjusting the natural language query provided in the text field 2850. Alternatively, or in addition, voice entry options may be provided (e.g., as discussed more fully below with reference to FIGS. 25 and 26).

Note that while a listing of UI controls 28118 for selecting visualization types is shown in the resulting chart-type UI card 28116, that the UI controls may be provided in a different manner, e.g., via another type of visualization picker.

For the purposes of the present discussion, a visualization picker may be any set of user interface controls adapted to enable a user to select a visualization type from among plural visualization types. The set of user interface controls may be implemented via a widget, form, questionnaire, and/or other mechanisms. For an alternative visualization picker (as an alternative to the list 28118) may include an interactive graphic with various buttons that may be user selected to register user selection of a visualization type and/or sub-type.

In summary, if the user wants to see different visualizations than the charts initially provided, the user can position the cursor in the text field 2850 and type the word "chart" or select that option by other means. This brings up a list 28118 of different types of charts as shown in FIG. 28.

Figure 29:
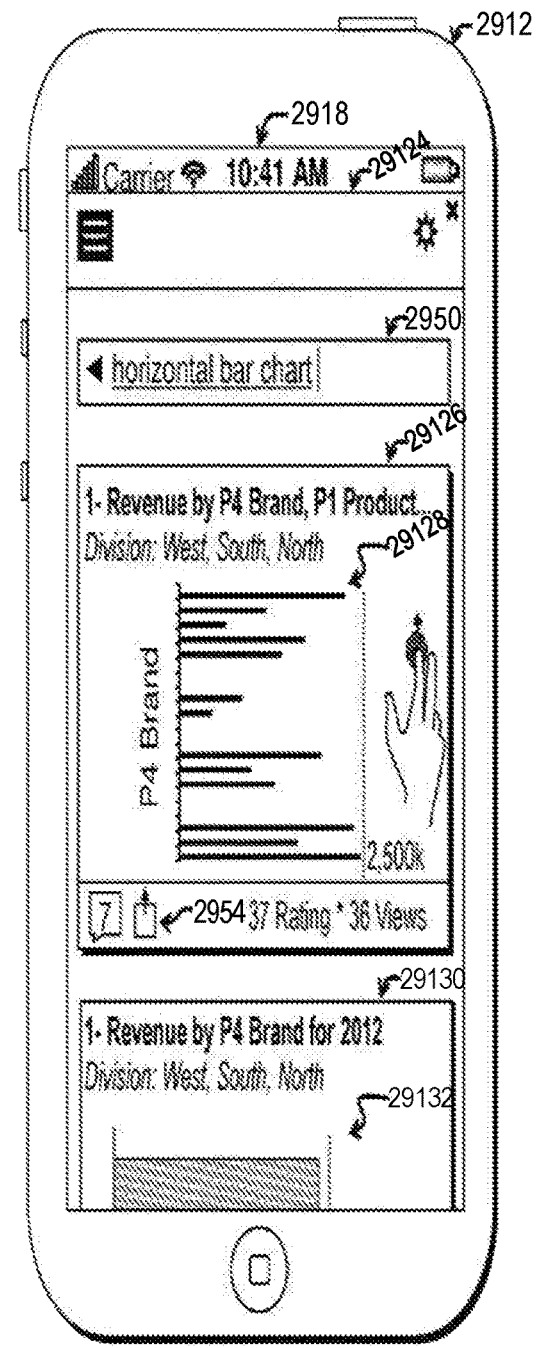
FIG. 29 illustrates a sixth example UI display screen showing a first portion of a set of plural UI cards responsive to a query (including the term "horizontal bar chart") entered and/or selected via the UI display screen of FIG. 28.

FIG. 29 illustrates a sixth example UI display screen 29124 showing a first portion 29126, 29130 of a set of plural UI cards responsive to a query (including the term "horizontal bar chart") entered and/or selected via the UI display screen of FIG. 28.

The first portion 29126, 29130 includes a first UI card 29126 and a second UI card 29130 illustrating a first horizontal bar chart 29128 with all of the data dimensions of the query entered in the text field 2950, and a second horizontal bar chart 29132 with one of the dimensions filtered or removed from the underlying data.

In summary, FIG. 29 shows the display after "horizontal bar chart" has been selected. A horizontal bar chart using the same data as in the prior charts is added to the list of displayed charts. In a preferred embodiment, the newly selected chart replaces the top most chart.

Figure 30:
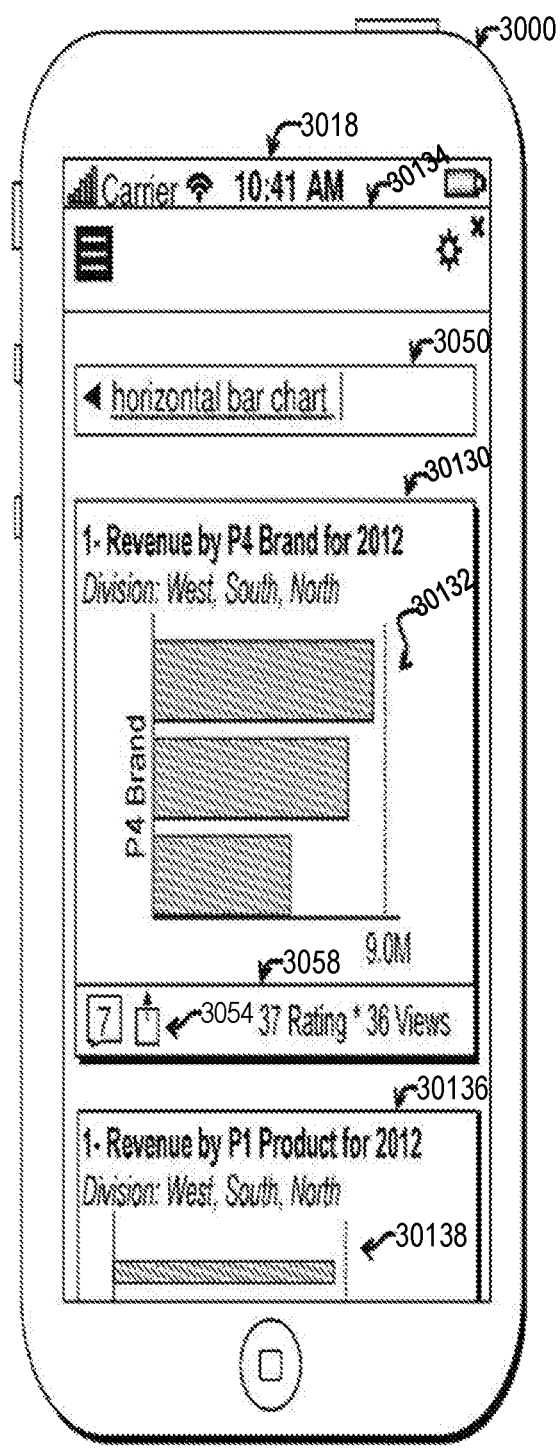
FIG. 30 illustrates a second portion of the set of plural UI cards of the sixth UI display screen of FIG. 29.

FIG. 30 illustrates a second portion 30134 of the set of plural UI cards 29126, 29130?, 30136? that were generated and displayed in response to the query as entered and shown in the UI display screen 29124 of FIG. 29. The second portion 30134 may appear in response to a vertical scroll applied to the UI display screen 29124 of FIG. 29. FIG. 29 reveals the entire UI card 29130 that is only partially shown in 29.

The vertical scroll applied to the UI display screen 29124 of FIG. 29 also reveals a portion of an additional UI card 30136 and accompanying horizontal bar chart 30138, the underlying data of which represents a filtered version of data in the first UI card 126 of FIG. 29.

Note that a given UI card, e.g., the UI card 30130 may be expanded to occupy a larger display area, e.g., to occupy an entire area of the UI display screen 30134.

Figure 31:
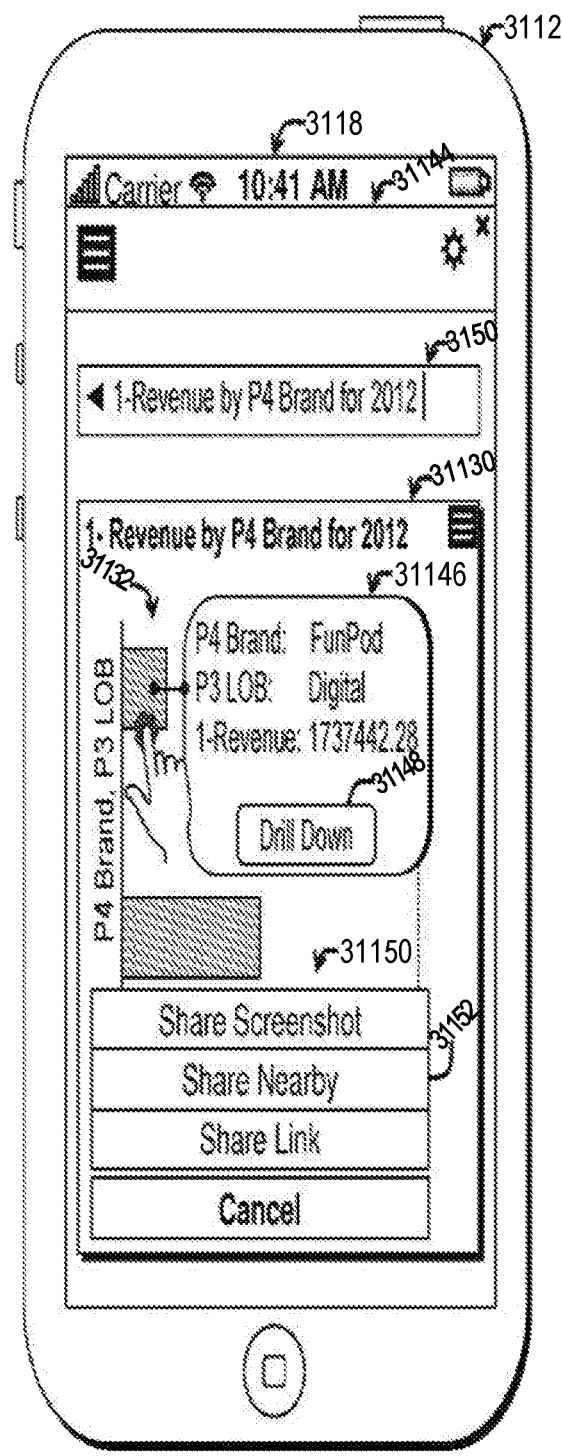

FIG. 31 illustrates a seventh example UI display screen 31144 showing various user options 31146, 31150 for interacting with content of a selected UI card, including drilling 31148, sharing a live chart or screen shot thereof, sharing content with nearby users, and so on. Note that annotation options may be revealed in response to user selection of one of the UI controls 31150.

User selection of a share nearby option 31152 may trigger display of a subsequent UI display screen with additional options for configuring content to be shared with nearby users. Functionality for sharing content with nearby users may leverage various communication mechanisms, e.g., Bluetooth, WiFi, etc., and location information associated with surrounding users.

Content to be shared nearby may be automatically filtered by the underlying mobile application (e.g., the client software 2120 of FIG. 21) and/or by the BI server system 2114 before delivery to nearby users. The content may be filtered in accordance with data access permissions associated with various nearby users.

Note that in some implementations of the share nearby functionality, may determine nearby users that are within communication range of native device transceivers, e.g., Bluetooth. Alternatively and/or in addition, the server system 2114 of FIG. 21 may automatically determine which users are near by a particular user that has chosen to share content. The determination may be done by referencing stored context information pertaining to other users, the context information of which may be maintained via the context repository 2130 of FIG. 21. Use of the BI server system 2114 of FIG. 21 may further facilitate filtering delivered content in accordance with data access permissions of the various nearby users.

In summary, FIG. 31 shows the screen after a user has "opened up" the "revenue by brand" chart of FIGS. 29 and 30 to show additional details, fields and controls. Other characteristics can be shown for more detail and control. FIG. 31 further shows options 31150 for sharing visualizations or other information associated with the data. Visualizations, or portions thereof, including annotations or additional information can be shared using the device's standard communication channels such as email, text, etc. for a smartphone or other computing device.

Figure 32:
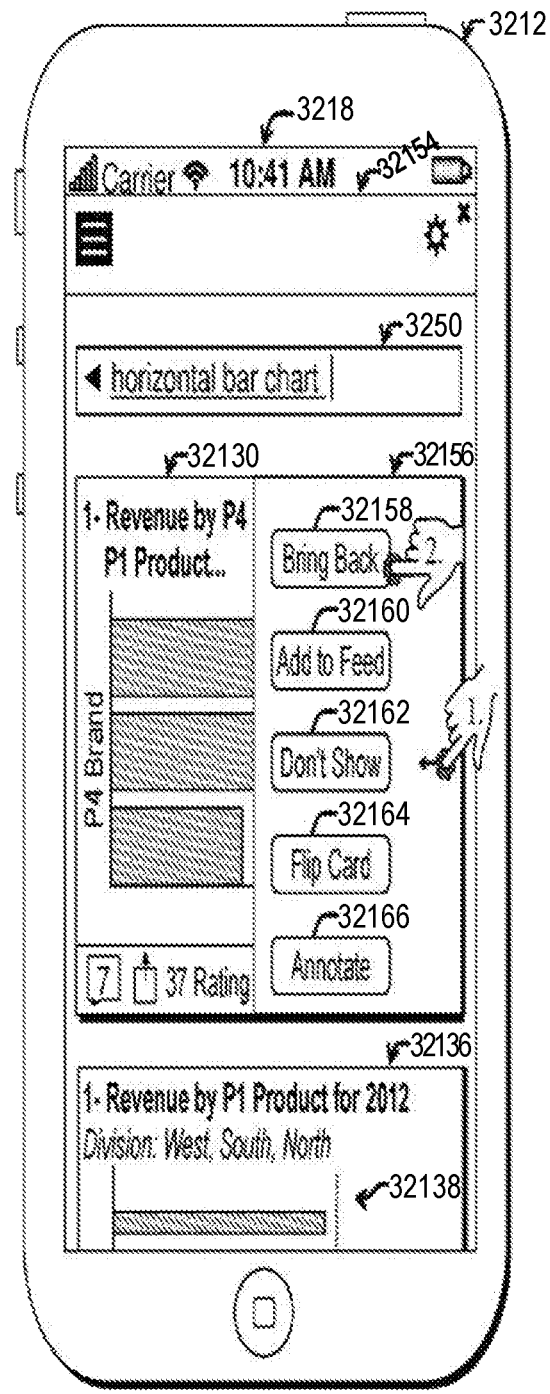
FIG. 32 illustrates a eighth example UI display screen showing additional user options for interacting with a UI card, including an option to selectively bring back or redisplay the card, add the card to a home screen or activity feed, an option to flip the card, and an option to not show the UI card.

FIG. 32 illustrates a eighth example UI display screen 32154 showing additional user options 32158-32166 (e.g., UI controls) for interacting with a UI card 32130, including an option 32158 to selectively bring back or redisplay the card 32130, an option 32160 to add the card 32130 to a home screen or activity feed, an option 32162 to not show the UI card 32130, an option 32164 to flip the UI card 32156, and an option 32166 to annotate the card. The UI display screen 32154 of FIG. 32 appears when the user activates an options panel 32156, e.g., by swiping left on an edge of the UI card 32130.

Note that the various UI controls 32158-32166 are merely examples and that more or fewer UI controls may be included in the panel 32156 and/or in menus (e.g., tap and hold menus) or other UI mechanisms for enabling display of additional UI controls.

User selection of one of the UI controls 32158-32166 may trigger display of an additional window, which may include additional UI controls and user access to functionality for triggering implementation of associated software actions. For example, user selection of a flip card option 32164 may reveal additional UI controls and details about the UI card 32130 that may appear as though they are on the back of the UI card 32130.

User selection of the don't show UI control 32162 may trigger display of additional options for specifying whether selection of the "don't show" option 32162 will act to permanently remove the UI card 32130 from the UI display screen, such that it will not appear again, or whether the UI card 32130 should simply be removed from the current screen 32154 and remain available for redisplay later. Note that, in certain implementations, user selectin of the don't show UI control 32162 automatically triggers both removal of the UI card 32130 from the UI display screen 32154 and further augments context information usable by the underlying system to estimate a usefulness of the UI card 32130.

When the card is dismissed, this dismissal information can then affect subsequent query search results, e.g., display of the UI card 32130 may be allocated a lower priority for not just the current user, but other users, especially of some of the other users have also dismissed the card 32130 after it has appeared in search results (i.e., UI cards) in response to a similar query as that entered in the text field 3250.

User selection of the annotate option 32166 may reveal an additional menu, panel, toolbar, or other UI features that provide controls to draw on, make notes on, or otherwise annotate the UI card 32130, e.g., in preparation for sharing, saving, etc.

User selection of the UI control 32160 for adding the UI card 32130 to the feed (i.e., home screen feed, also called smart feed) may trigger inclusion of the UI card 32130 among the feed or listing of cards appearing upon user login into the underlying software.

User selection of the bring back UI control 32158 may trigger display of an additional window with additional UI controls for enabling a user to specify a condition, which if met, results in redisplay of the UI card 32130 in the UI display screen shown to the user. The specified condition may represent specified intrinsic context information, which is then compared to extrinsic context information gathered by the underlying system, to determining when the intrinsic context matches the associated extrinsic context. When a match occurs, the UI card 32130 is redisplayed if it is not currently displayed in the UI display screen that the user is currently interacting with, as discussed more fully below with reference to FIG. 33.

In summary, FIG. 32 illustrates a feature referred to as "bring back" that allows a user to have a selected UI card and associated visualization automatically generated and loaded into a device's memory, application, dashboard, home screen or other visible or non-visible location. In FIG. 32, as the user is viewing the "revenue by product for 2012" UI card 32130, they can perform an input action to select the bring back feature, e.g., by performing a swipe to the left followed by selecting the bring back UI control 32158. After invoking display of the panel 32156, which is displayed adjacent to a subject visualization of the UI card, and after selecting the bring back option 32158, additional bring back options or UI controls are provided.

Note that in other embodiments, the controls 32158-32166 may be associated with the subject UI card and/or visualization in any suitable manner. Furthermore, note that the various options 32158-32166 may be applicable to other types of UI cards, not just analytic cards with visualizations.

Figure 33:
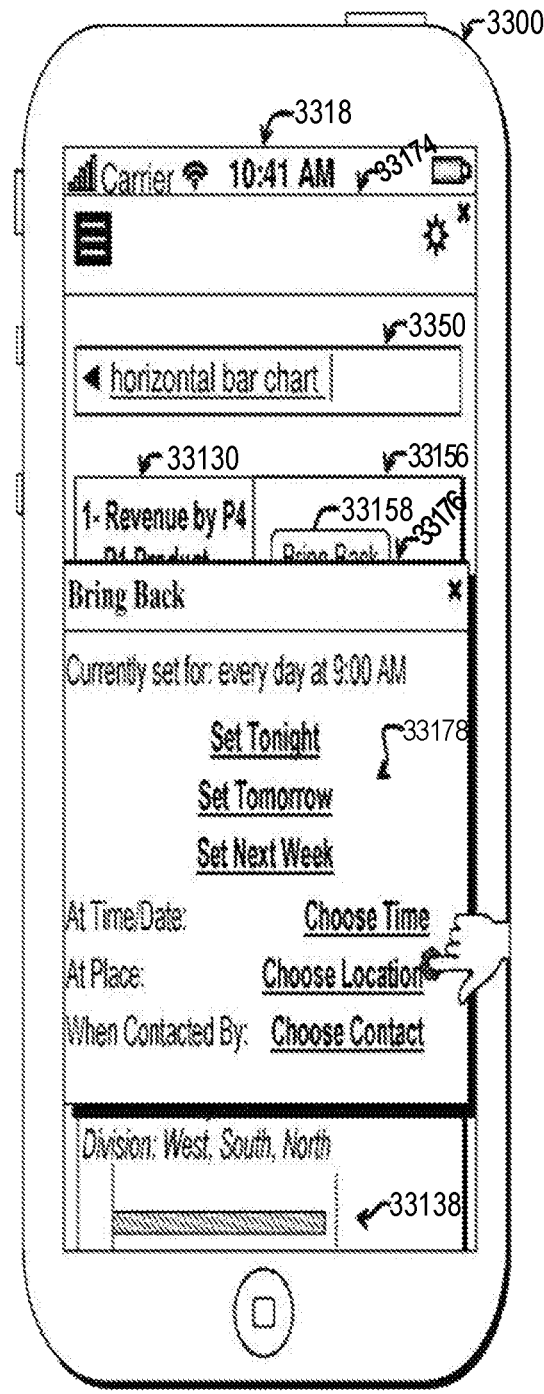

FIG. 33 illustrates a ninth example UI display screen 33174 showing a pop up window 33176 displayed responsive to user selection of the bring back option 33158 from the eighth UI display screen 32154 of FIG. 32. The pop up window 33176 includes additional user options 33178 (e.g., UI controls) for facilitating user specification of bring back conditions, e.g., time, place, when contacted by, and so on.

In summary, upon pressing the "bring back" button 32158 of FIG. 32, the window 33176 shown in FIG. 33 appears to allow the user to specify the conditions under which the UI card 33130 and associated visualization will be loaded in the future. The visualization will use the same format but will incorporate the future data that will be available at the time of loading. Types of conditions that the user can specify include time, place and person. So for example, every day at 8 am, every Monday at 8 am, when the user (or user's device) is determined to be at a customer's site, whenever a particular person contacts the device/user by phone, text, email, etc., the visualization can be loaded and displayed on the user's home screen or other area. The condition for updating and loading the visualization and data can be automated so that the user need not manually specify the condition but, instead, the system will derive a condition.

FIG. 34 illustrates a tenth example UI display screen 34184 showing additional user options 34192 for specifying a bring back condition pertaining to a particular device location or region. The UI display screen 34184 may appear in response to user selection of a choose location option from among the options 33178 indicated in the window 33176 of FIG. 33.

In the present example use case, a user has entered "Proctor" into text field 34190, resulting in display of candidate matches 34192 for the term "Proctor." The candidate matches may be derived in view of stored context information, where each candidate match may represent or be associated with a computing object and/or data dimension maintained in an enterprise database, e.g., a BI database.

The user may select an option from the list 34192 and/or may manipulate an associated map 34194 to perform selection of a location or region used to trigger redisplay, i.e., "bringing back of" the UI card 30130, 32130, and 33130 of FIGS. 30, 32, and 33 when the mobile device 3412 enters the selected region 34196 and/or is at the specified location.

Figure 35:
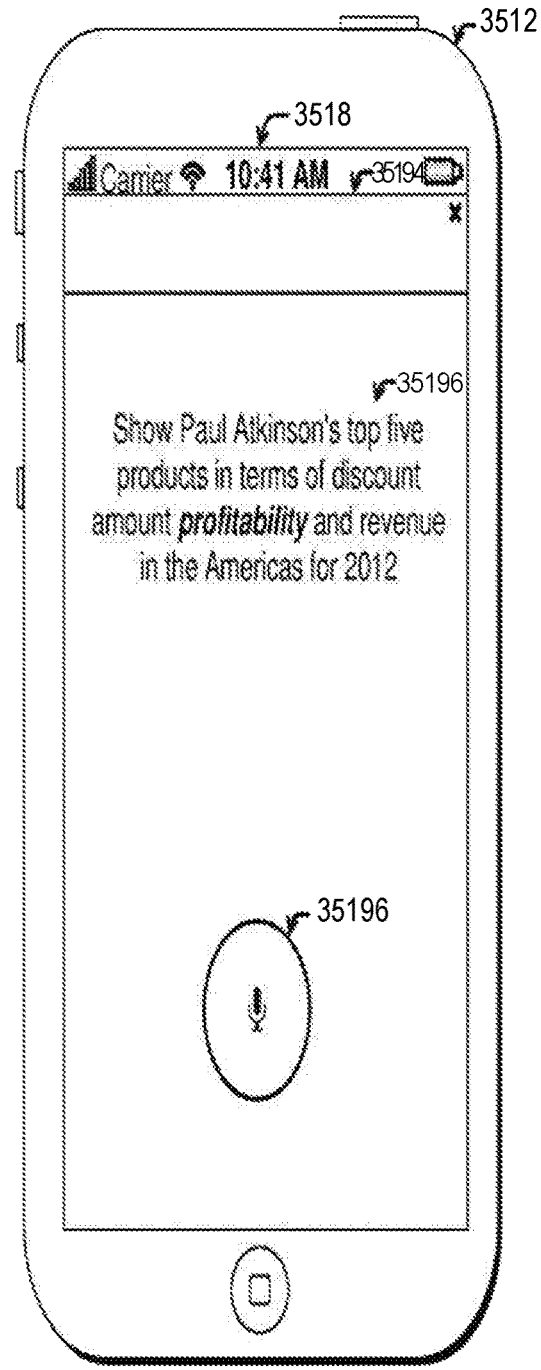
FIG. 35 illustrates an eleventh example UI display screen showing use of voice to input a natural language query to selectively retrieve BI content.

FIG. 35 illustrates an eleventh example UI display screen 35194 showing use of voice to input a natural language query to selectively retrieve BI content. In the present example embodiment, a voice icon 35196 indicates that voice entry mode is activated. A user is specifying a detailed natural language query 35196, which may be processed as a whole expression and need not prompt the user to select options for each term of the expression 35196.

Note that use of the system in text entry mode, e.g., as shown in FIGS. 23-34 (and particularly in FIGS. 28 and 34) may train the underlying system to facilitate more accurate processing of terms provided via voice input. For example, previous user selections confirming association of the term "profitability" (when operating in manual text entry mode) with a database dimension and/or object called "profit margin" may be leveraged by the underlying system to accurately associate profitability with profit margin.

Note however, that even in absence of prior training (whereby additional context information is gathered and leveraged), the underlying system and associated inference engine (e.g., the inference engine 2138 of FIG. 21) may be able to guess or estimate which database dimension that the term "profitability" refers to. For example, such determination may be determined in part by analysis of word stems (e.g., the profit portion of the term "profitability") and comparison of the stems with existing database dimensions.

Figure 36:
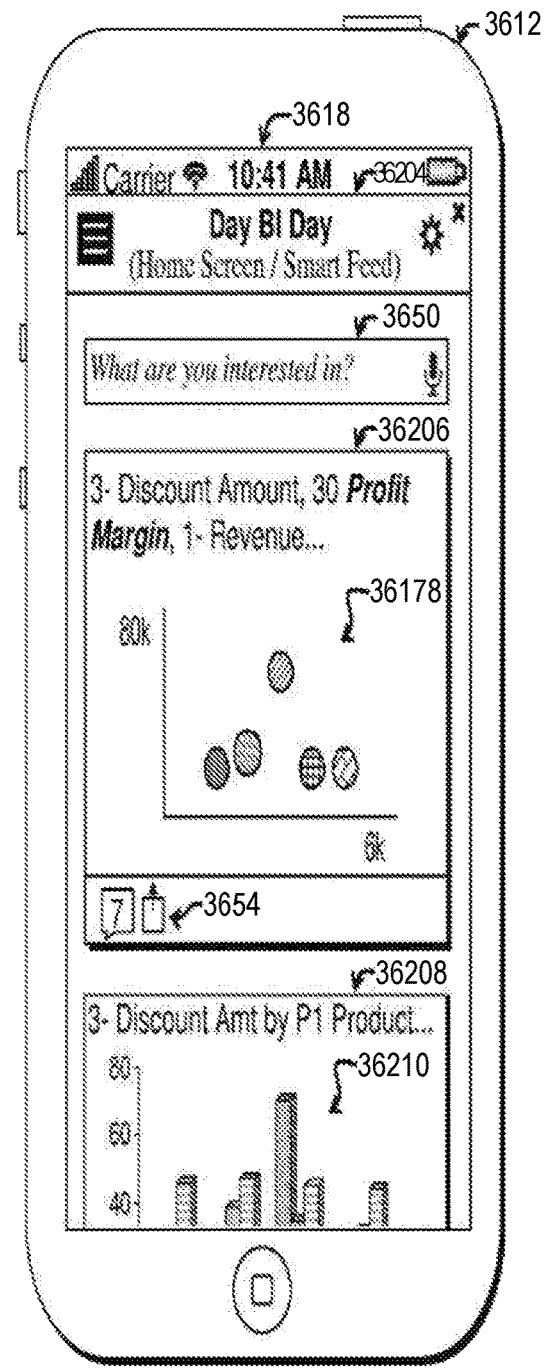
FIG. 36 illustrates a twelfth example UI display screen appearing after the voice query indicated in FIG. 35.

FIG. 36 illustrates a twelfth example UI display screen 36204 appearing after the voice query 35196 indicated in FIG. 35. Note that the system has interpreted the term "profitability" to refer to "profit margin," and a corresponding series of UI cards 36206, 36208 are then generated (along with respective visualizations 36178, 36210) in accordance with a context-based estimate of user intent derived by the underlying system.

Figure 37:
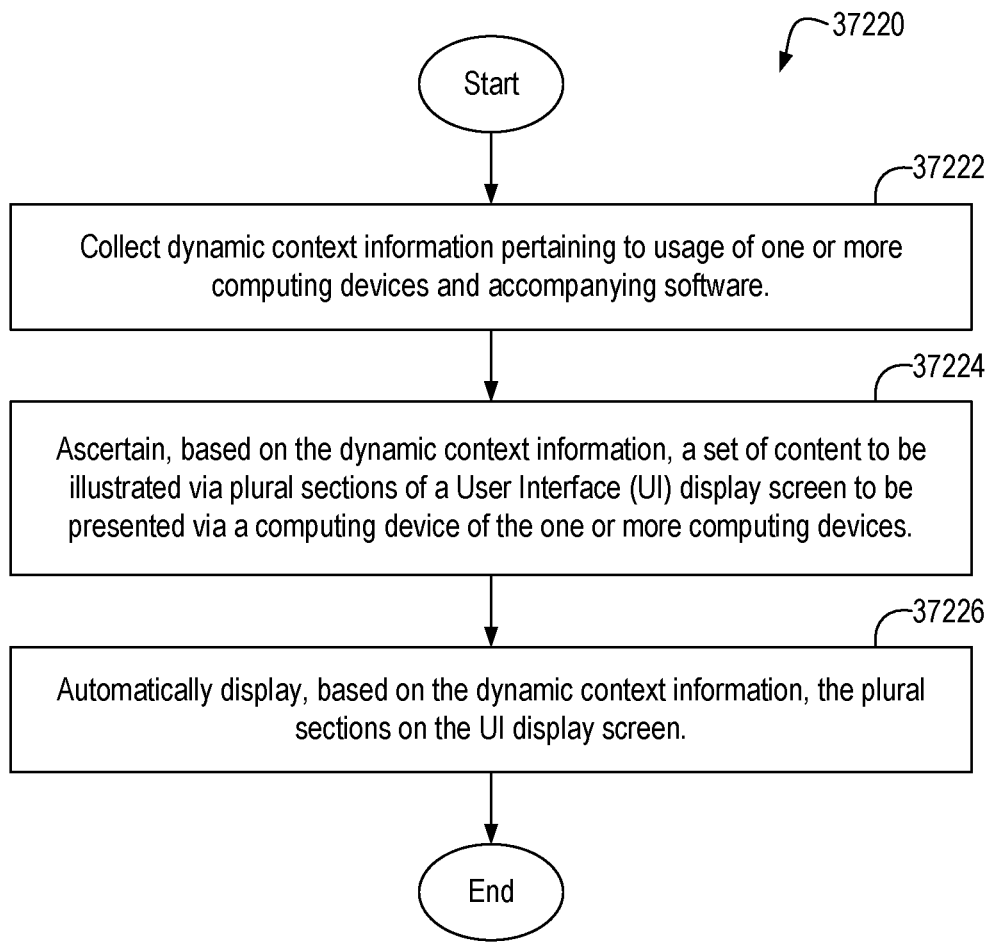
FIG. 37 is a flow diagram of a first example method suitable for use with the embodiments of FIGS. 21-36.

FIG. 37 is a flow diagram of a first example method 37220 suitable for use with the embodiments of FIGS. 21-36. The example method 37220 facilitates conveying electronic content between user devices and other resources of a computing environment. For the purposes of the present discussion, electronic content may be any content conveyed using electronics and/or electromagnetic energy.

The first example method 37220 includes an initial context-collection step 37222, which involves collecting dynamic context information pertaining to usage of one or more computing devices and accompanying software. The usage may refer to context information specific to a particular user, but is not limited thereto. The usage may also refer to aggregated usage associated with aggregated context information.

Next, a content-ascertaining step 37224 includes using the dynamic context information to ascertain or otherwise determine or calculate a set of content to be illustrated via plural sections of a UI display screen, where the plural sections (e.g., UI cards) to be presented via a computing device (e.g., the client device 2112, 2212, 2312, 2412, 2512, 2612, 2712, 2812, 2912, 3000, 3112, 3212, 3300, 3412, 3512, 3612 of FIGS. 21-36) of the one or more computing devices.

Finally, an automatic-displaying step 37226 includes automatically displaying, based on the dynamic context information, the plural sections on the UI display screen.

The method 37220 may be altered, augmented, or replaced, without departing from the scope of the present teachings. For example, more narrow recitations of the method 37220 may further specify that the context information includes user input provided through user interaction with a software UI display screen.

The context information may further include natural language input, such as a query. The context information may further include information indicating who a user of a computing device of the one or more computing devices has been communicating with and a subject matter related to communications between the user and one or more other users. The context information may further include information provided via user input, such as information indicating a particular time of day (and/or date, day of week, etc.) relevant to content to be displayed at the particular time. The context information further includes information associating a particular location or region with particular content to be displayed when a computing device of the user is at the particular location or within the region.

The computing environment may be an enterprise computing environment, wherein the software includes BI software. For the purposes of the present discussion, BI software may be any enterprise software with one or more features and/or software functionality for performing or otherwise facilitating business analysis, e.g., analysis involving identifying business needs, determining solutions for business problems, facilitating informed business decisions, etc.

The set of content may include dynamic content that is selectively updated, e.g., as the one or more computing devices (representing user devices) and associated users interact with software (e.g., BI software, such as client software, BI server software, enterprise database software, and so on) used to implement the method.

The set of content determined in the content-ascertaining step 37224 may include content illustrated via plural visualizations (e.g., charts, graphs, etc.). Each of the plural visualizations may be presented, i.e., displayed, on a separate UI card, each UI card representing a section of the plural sections.

Each of the plural visualizations may include an interactive visualization. The interactive visualization may incorporate and or be included in a UI card that incorporates one or more UI controls for filtering underlying data of the interactive visualization. The one or more UI controls may include a control for enabling filtering of the underlying data by time frame using natural language input that specifies a time frame.

The underlying data may include dynamic content (e.g., content subject to daily change) sourced from a database, e.g., one or more enterprise databases. The method 37220 may further specify a step involving providing one or more UI controls for enabling sharing the interactive visualization with one or more devices (and thereby one or more associated users) that are in proximity to a device that is displaying the interactive visualization. The method 37220 may be further augmented to recite providing one or more UI controls for enabling changing a type of the interactive visualization.

An example alternative method that may replace and/or be used with the method 37220 includes a method for facilitating content determination and delivery in a computing environment, e.g., a networked enterprise computing environment. The example alternative method includes determining context information pertaining to user interaction with a first mobile computing device that is operating within the computing environment; and selectively pushing content to the first mobile computing device based on the context information, wherein content includes content derived from a BI database and presented via one or more UI cards on a UI display screen of the mobile computing device.

The alternative method may also leverage dynamic context information. In addition, the content derived from a BI database may include dynamic content, such that changes to the dynamic context information and changes to data stored in the BI database result in updated content being represented via the one or more UI cards. The updated content may be updated in response to a change to the data stored in the BI database and used to render the one or more cards and dynamic content thereof.

The alternative method may further specify that the one or more UI cards include an activity stream associated with activities of a user of the first mobile computing device. The activity stream includes a blog (and/or other updating data) with information pertaining to communications between collaborators of a user of the first mobile computing device.

A first UI control may facilitate initiating an operation to share the one or more UI cards with one or more additional mobile computing devices in proximity to the first mobile computing device. The one or more additional mobile computing devices may run operating systems that are different that the operating system running on the first mobile computing device. Accordingly, embodiments may include cross-platform and/or platform-independent content sharing.

The alternative method may further include employing native content sharing functionality (e.g., content sharing functionality provided by and/or delivered with or otherwise preexisting or running on a mobile device)) of the first mobile computing device and the one or more additional mobile computing devices to trigger transfer of content represented by the one or more UI cards to the one or more additional mobile computing devices.

The content may include dynamic content, e.g., an interactive visualization constructed using one or more natural language terms of a search query entered via the first mobile computing device. The one or more natural language terms may be associated with one or more data dimensions maintained via the BI database. The one or more data dimensions include data used to construct the interactive visualization.

The interactive visualization may be included within a first UI card. The first UI card may include one or more UI controls configured to trigger delivery of an instance of the first UI card to a specified contact of the user of the first mobile computing device.

The interactive visualization may be included within a first UI card. The first UI card may include one or more UI controls configured to allow user specification of a condition to redisplay the first UI card. The condition to redisplay the first UI card may include a condition specifying redisplay of the first UI card at a particular future time.

The condition to redisplay the first UI card may include a condition specifying selective redisplay of the first UI card when the first mobile computing device is approximately at a user-specified location. The condition to redisplay the first UI card may include a condition specifying redisplay of the first UI card when the first mobile computing device receives a communication from a second computing device from a particular contact of a user of the first mobile computing device.

The context information may include dynamic context information that includes usage history associated with the first mobile computing device. The dynamic context information may further include location information associated with the first mobile computing device. The dynamic context information may further include usage history associated with plural mobile computing devices included in the computing environment.

Figure 38:
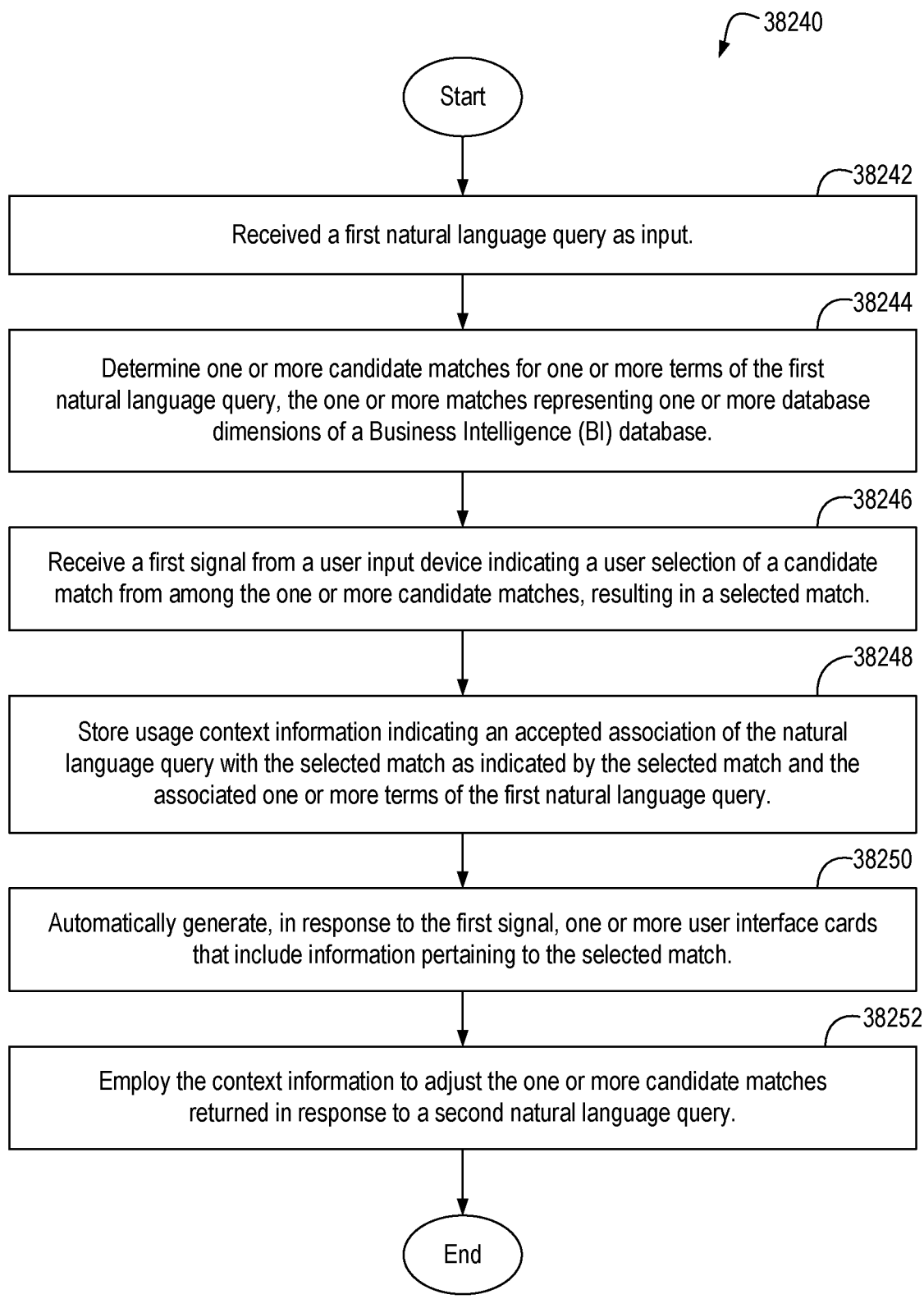
FIG. 38 is a flow diagram of a second example method suitable for use with the embodiments of FIGS. 21-37.

FIG. 38 is a flow diagram of a second example method 38240 suitable for use with the embodiments of FIGS. 21-37. The second example method 38240 facilitates selecting and displaying content, e.g., enterprise data, analytics, etc.

The second example method 38240 includes a first receiving step 38242, which involves receiving a first natural language query as input.

A second determining step 38244 includes determining one or more candidate matches for one or more terms of the first natural language query. The one or more matches may represent one or more database dimensions of a BI database and/or other enterprise database.

A third receiving step 38246 includes receiving a first signal from a user input device, wherein the first signal indicates a user selection of a candidate match from among the one or more candidate matches, resulting in a selected match.

A fourth storing step 38248 includes storing usage context information. The stored usage context information indicates an accepted association of the natural language query with the selected match as indicated by the selected match and the associated one or more terms of the first natural language query.

A fifth generating step 38250 includes automatically generating, in response to the first signal, one or more UI cards that include information pertaining to the selected match.

Finally, a sixth employing step 38252 includes employing the context information to adjust the one or more candidate matches returned in response to a second natural language query.

Note that the method 38240 may be altered, without departing from the scope of the present teachings. For example, the method 38240 may further recite that the natural language input includes voice input. A natural language sentence provided via the voice input may represent or be treated as a single term of the one or more terms for the purposes of interpreting and/or parsing the meaning(s) of the voice input.

The information pertaining to the selected match may include information represented by an interactive visualization. The interactive visualization may include a first UI mechanism (e.g., UI control) that includes one or more drill down operations. Another mechanism may enable one or more data filtering operations to select, add, or omit data underlying the interactive visualization.

The interactive visualization may be included or displayed within a UI card that includes one or more UI controls (e.g., natural language input field, e.g., a text input field and/or voice text field) for enabling a user to change a type of the visualization.

The second example method 38240 may be further modified to include determining when the natural language input has been entered via voice input, and then employing the voice input to automatically generate the first signal to yield the candidate match.

The fifth generating step 38250 may further include automatically displaying plural UI cards on a UI display screen of a mobile computing device. Each of the plural UI cards may include a visualization illustrating one or more database dimensions associated with the one or more terms of the natural language query.

The plural UI cards may include a first UI card that includes a first visualization illustrating representations of all database dimensions indicated by the one or more terms.

The plural UI cards may include a second UI card that includes a second visualization illustrating representations of a subset of all dimensions indicated by the one or more terms. A first UI control may facilitate enabling a user to dismiss a card from among the plural UI cards.

The second example method 38240 may further include, in response to a dismissal of the card, storing dismissal information indicating that the card was dismissed, the dismissal information included among the context information. The context information may further include selection information and dismissal information associated with plural users of a software application used to facilitate implementing the method.

The third receiving step 38246 may further include determining one or more content topics in accordance with a first user selection from a list of candidate matches associated with the one or more content topics; automatically triggering a second search in accordance with a second signal that indicates a second user selection from among the one or more candidate matches; and displaying search results as plural visualizations, wherein each of the plural visualizations includes information pertaining to the one or more database dimensions and the second user selection. The one or more of the plural visualizations may further include one or more analytics derived from data characterizing the one or more database dimensions.

The second example method 38240 may further include providing a second UI control enabling a user to remove one or more candidate matches from the list of candidate matches; storing an updated association between the one or more terms of the natural language query and remaining candidate matches of the list of candidate matches, the remaining candidate matches remaining displayed via a UI card after removal of the one or more candidate matches from the list; and using the context information to adjust a subsequently displayed list of candidate matches in response to a natural language query that would otherwise return candidate matches that have previously been dismissed via the second UI control.

Figure 39:
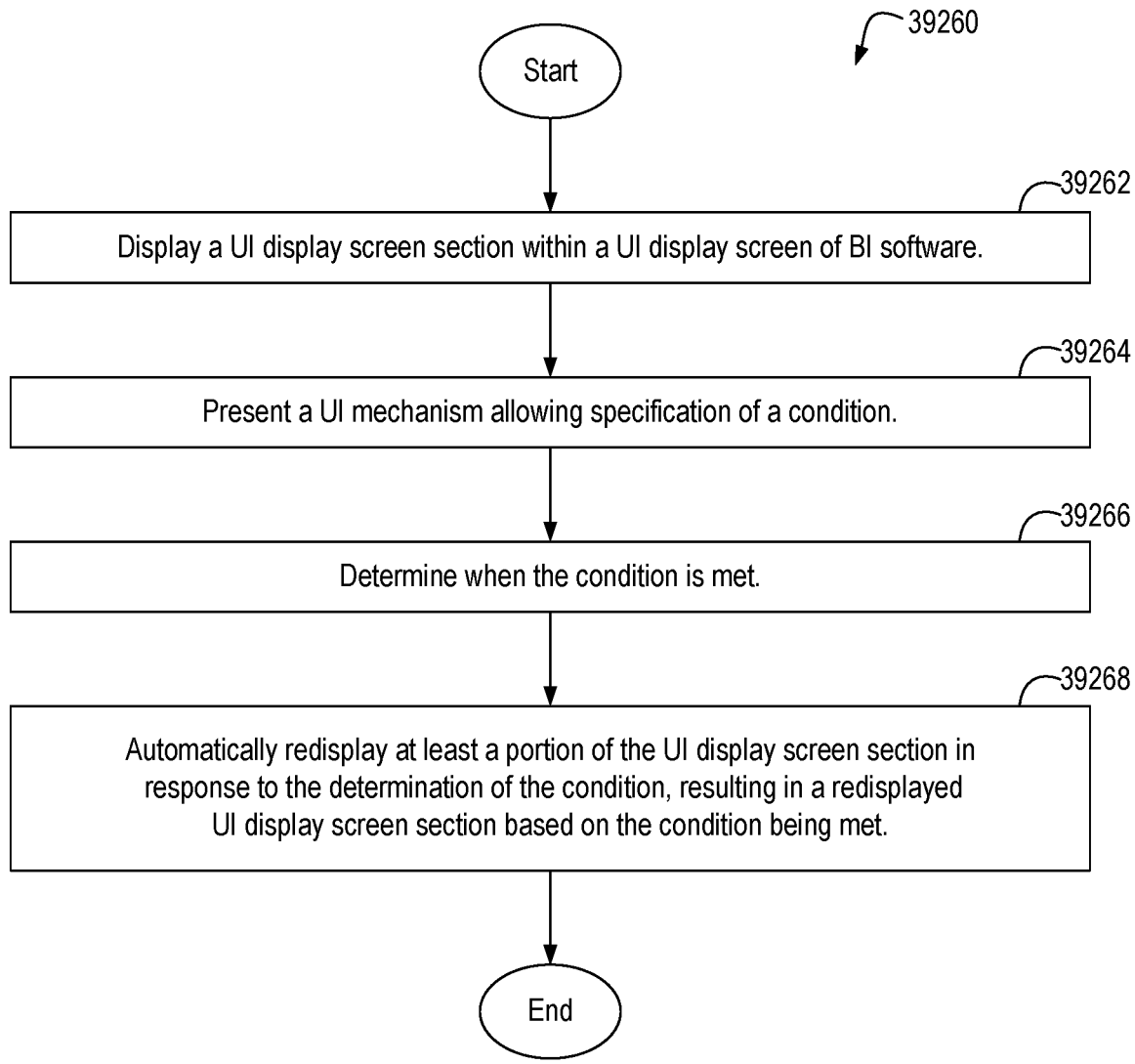
FIG. 39 is a flow diagram of a third example method suitable for use with the embodiments of FIGS. 21-38.

FIG. 39 is a flow diagram of a third example method 39260 suitable for use with the embodiments of FIGS. 21-38. The third example method 39260 facilitates presenting (i.e., displaying) UI display screen sections, e.g., UI cards.

The third example method 39260 includes a first step 39262, which involves displaying a UI display screen section within a UI display screen.

A second step 39264 includes presenting a UI mechanism allowing specification of a condition.

A third step 39266 includes determining when the condition is met.

A fourth step 39268 includes automatically redisplaying at least a portion of the UI display screen section in response to the determining, resulting in a redisplayed UI display screen section based on the condition being met.

The third example method 39260 may be altered, without departing from the scope of the present teachings. For example, the third step 39266 may further include determining when the condition is met after the UI display screen section has been closed but while software for facilitating implementing the method is running.

The fourth step 39268 may further specify automatic redisplaying of a UI card based on the condition being met, wherein the redisplayed UI card includes an interactive visualization; wherein underlying data of the interactive visualization includes structured enterprise data derived from an enterprise database; wherein the enterprise data includes one or more database dimensions associated with one or more portions (e.g., slice of a pie chart) of the interactive visualization.

The UI display screen section may include plural UI display screen sections. The plural UI display screen sections may include one or more visualizations that are displayed within one or more of the plural UI display screen sections.

The plural UI display screen sections may include one or more UI cards configured for display on the computing device, e.g., a mobile computing device.

The one or more UI display screen cards may represent an activity feed (also called a smart feed, home screen feed, dashboard feed, series of dynamic UI cards representing selectively pushed content based on context, including dynamic context). Each of the one or more UI display screen cards may be automatically selected for display based on usage context information derived from user interaction with software used to implement the method.

The UI mechanism may include one or more UI controls for enabling user specification of at least one aspect (e.g., time, location, contact, communication mode of contact, e.g., voice mode, email, text message communication, etc.) of the condition. The aspect may be based on user-specified context information.

The third step 39266 may further include comparing the user-specified context information with dynamic context information to determine if the context information matches; then, in response to a match, determining that the user-specified condition has been met.

The user-specified context information may include a particular geographical location or region, such that when the mobile computing device is at the location or within the region, the condition is met. The user-specified context information may further include and/or alternatively include data indicating a particular time, person, or contact of a user of the UI display screen.

The third step 39266 may further include using both the user-specified context information and additional context information to determine if the condition is met. The additional context information may further include information indicating that the user has been contacted by the particular person.

The third step 39266 may further include determining a communication mode employed by a user to communicate with the contact, and providing a UI control enabling initiation of a communication session between the user and the contact via the communication mode when the condition is met. The communication mode may include, for example, one or more of the following modes: electronic text-based messaging mode (e.g., Short Message Services (SMS) text communication mode), voice mode (e.g., telephone communications, video conferencing (e.g., using Voice Over Internet Protocol (VOIP))).

The third example method 39260 may further include automatically specifying the condition using an inference derived from context information, wherein automatically specifying further includes: employing an inference engine to automatically specify the condition using context information to make an inference used to determine the condition.

The UI display screen section may include an activity feed comprising one or more UI display screen cards. The one or more UI display screen cards may include one or more automatically determined UI display screen cards that are automatically determined, at least in part, on usage history of software used to implement the method. The usage history may represent dynamic context information that is selectively updated as a user interacts with the computing device and accompanying software used to implement the method.

The UI mechanism may be displayed on the UI display screen while at least a portion of the visualization is displayed. The UI display screen may represent a home screen (e.g., dashboard with a smart feed, i.e., activity feed) of software used to implement the method.

The third example method 39260 may be further used with and/or be replaced with a method that includes the following steps: receiving a natural language input query, the natural language input query representing intrinsic context information; accessing dynamic extrinsic context information; using the intrinsic context information and the extrinsic context information to select and display one or more interactive visualizations; providing one or more UI controls enabling specification of the condition; comparing the condition with extrinsic context information to determine when the condition is met; and when the condition is met, automatically displaying an updated version of the one or more interactive visualizations when software used to implement the method is active, the software used to implement the method including software running on the computing device.

Figure 40:
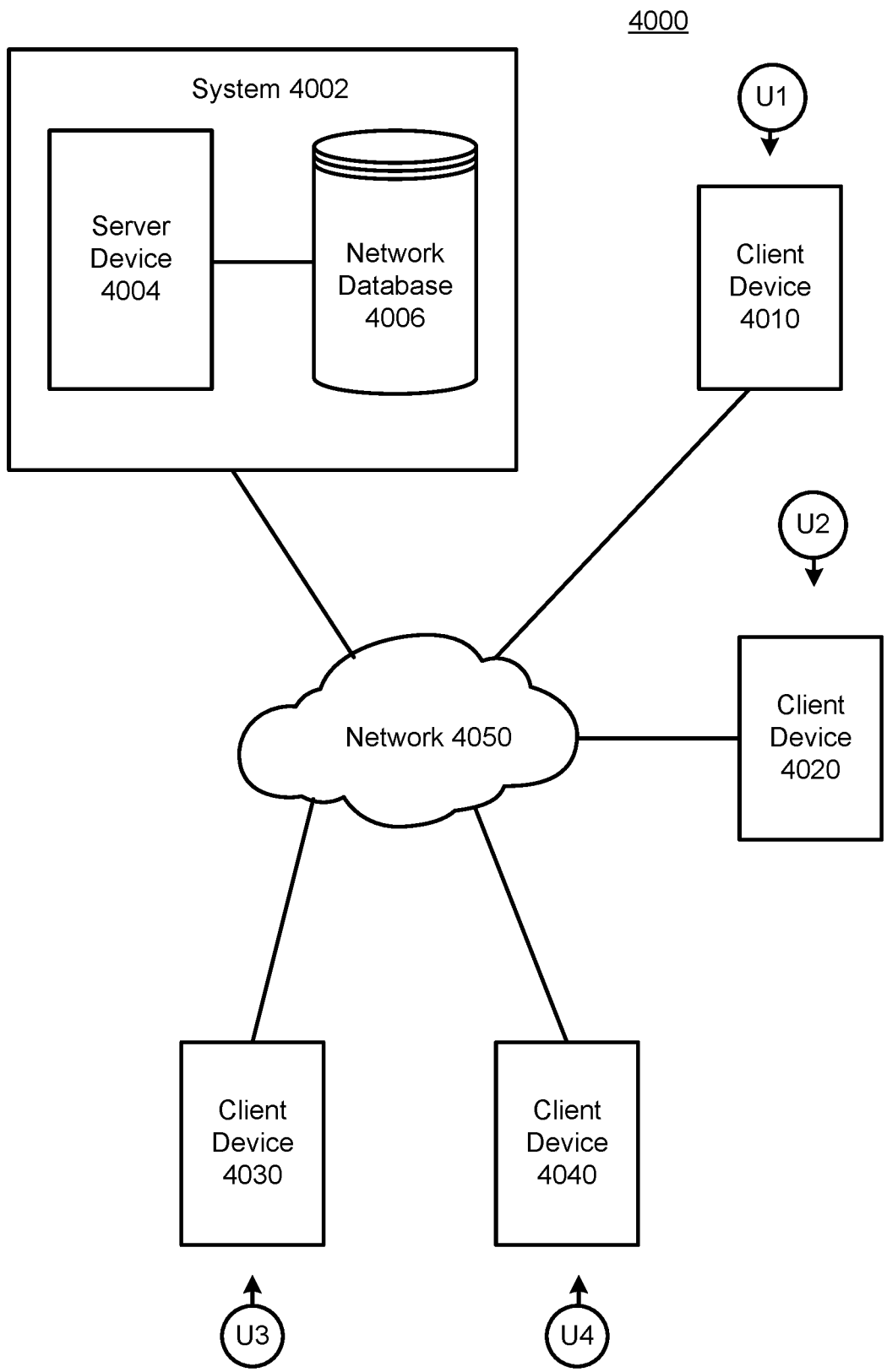
FIG. 40 illustrates an example generic system and computing environment suitable for implementation of various embodiments discussed herein.

FIG. 40 illustrates an example generic system and computing environment suitable for implementation of various embodiments discussed herein. FIG. 40 includes a block diagram of an example network environment 4000, according to some implementations. In some implementations, network environment 4000 includes a system 4002, which includes a server device 4004 and a network database 4006. Network environment 4000 also includes client devices 4010, 4020, 4030, and 4040, which may communicate with each other directly or via system 4002. Network environment 4000 also includes a network 4050.

For ease of illustration, FIG. 40 shows one block for each of system 4002, server device 4004, and network database 4006, and shows four blocks for client devices 4010, 4020, 4030, and 4040. Blocks 4002, 4004, and 4006 may represent multiple systems, server devices, and network databases. Also, there may be any number of client devices. In other implementations, network environment 4000 may not have all of the components shown and/or may have other elements including other types of elements instead of, or in addition to, those shown herein. In various implementations, users U1, U2, U3, and U4 may view metrics data using respective client devices 4010, 4020, 4030, and 4040.

While system 4002 of FIG. 40 is described as performing the steps as described in the implementations herein, any suitable component or combination of components of system 4002 or any suitable processor or processors associated with system 4002 may perform the steps described.

Figure 41:
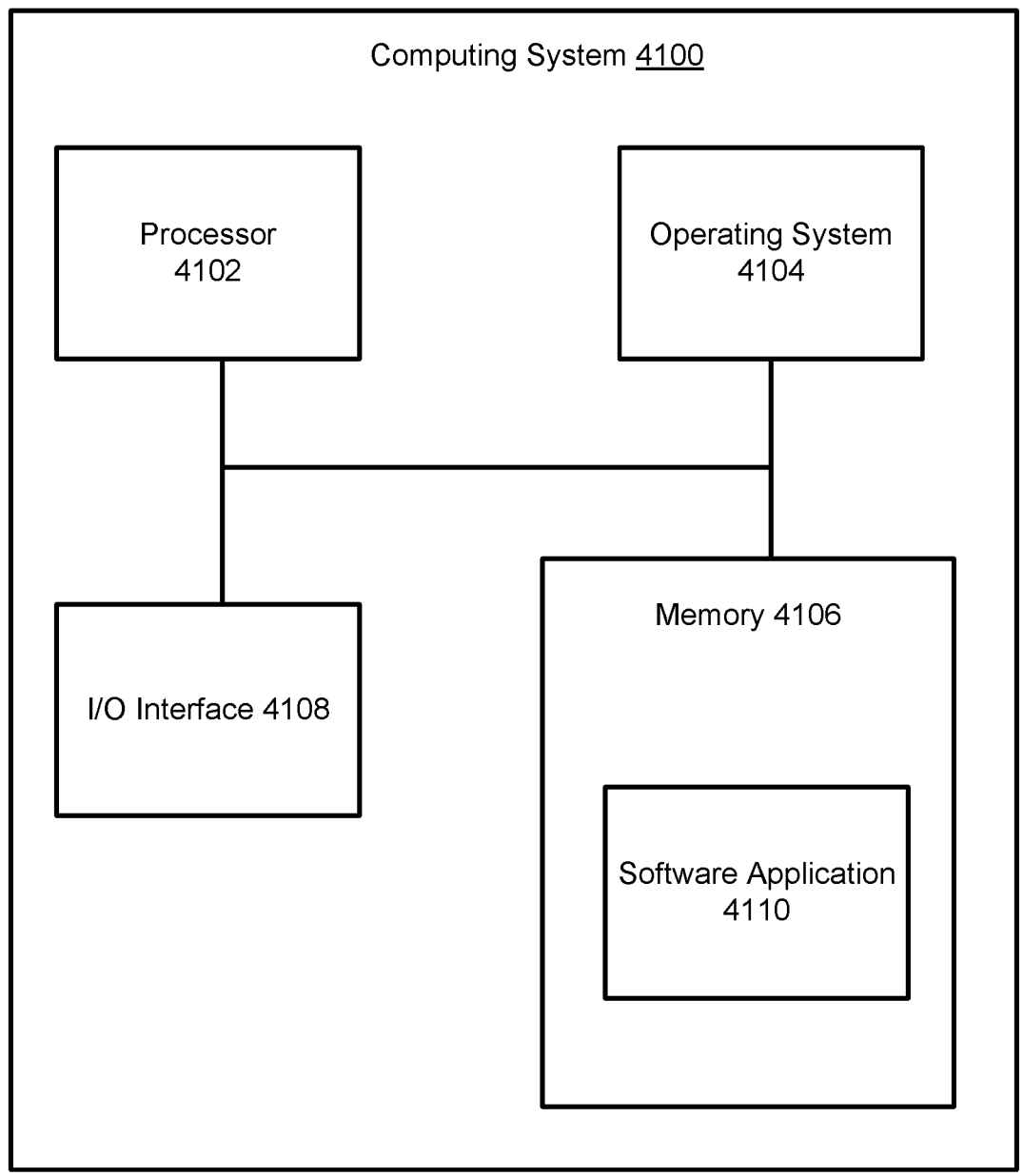
FIG. 41 illustrates an example generic client computing device usable with the generic system of FIG. 40.

FIG. 41 illustrates an example generic client computing device suitable usable with the generic system of FIG. 40. FIG. 41 includes a block diagram of an example computing system 4100, which may be used for implementations described herein. For example, computing system 4100 may be used to implement server device 4004 of FIG. 40 as well as to perform the method implementations described herein. In some implementations, computing system 4100 may include a processor 4102, an operating system 4104, a memory 4106, and an input/output (I/O) interface 4108. In various implementations, processor 4102 may be used to implement various functions and features described herein, as well as to perform the method implementations described herein. While processor 4102 is described as performing implementations described herein, any suitable component or combination of components of computing system 4100 or any suitable processor or processors associated with computing system 4100 or any suitable system may perform the steps described. Implementations described herein may be carried out on a user device, on a server, or a combination of both.

Computing device 4100 also includes a software application 4110, which may be stored on memory 4106 or on any other suitable storage location or computer-readable medium. Software application 4110 provides instructions that enable processor 4102 to perform the functions described herein and other functions. The components of computing system 4100 may be implemented by one or more processors or any combination of hardware devices, as well as any combination of hardware, software, firmware, etc.

For ease of illustration, FIG. 41 shows one block for each of processor 4102, operating system 4104, memory 4106, I/O interface 4108, and software application 4110. These blocks 4102, 4104, 4106, 4108, and 4110 may rep-resent multiple processors, operating systems, memories, I/O interfaces, and software applications. In various implementations, computing system 4100 may not have all of the components shown and/or may have other elements including other types of components instead of, or in addition to, those shown herein.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure.

Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

Although the description has been described with respect to particular embodiments thereof, these particular embodiments are merely illustrative, and not restrictive. For example, while various embodiments herein are discussed with respect to mobile device BI application implementations, embodiments are not limited thereto. Various embodiments disclosed herein may be adapted for use with virtually any computer, including desktop computers. Furthermore, embodiments are not limited to facilitating conveying BI information, tools, and analytics.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method for rendering an interactive visualization on a mobile computing device comprising:
   receiving, on a query field displayed on the mobile computing device, a natural language input comprising a first term, wherein the natural language input is a natural language expression based at least in part on a human language input;

retrieving, from a database of an enterprise associated with the mobile computing device, a first data dimension associated with the first term that is the natural language input;
generating, based at least in part on the first data dimension associated with the first term of the natural language input, a first visualization, wherein the first visualization is an interactive visualization that is displayed with a user interface control to enable a user interaction with one or more user interface cards displayed in the first visualization on the mobile computing device, wherein the first visualization comprises a scrollable list of a plurality of user interface cards that display on a display of the mobile computing device a plurality of different categories of content associated with enterprise data;
rendering, for display on the mobile computing device, the first visualization;
retrieving, based at least in part on the first term, a first set of candidate interpretations associated with the first term, the first set of candidate interpretations being associated with the first data dimension;
rendering, for display on the mobile computing device, at least a portion of the first set of candidate interpretations; and
receiving, from a graphical user interface of the mobile computing device, a selection a candidate interpretation from the at least the portion of the first set of candidate interpretations.

2. The computer-implemented method of claim 1, further comprising:
retrieving, from the database, a second data dimension associated with a second term in the natural language input; and
modifying the first visualization to generate a second visualization based at least in part on the first data dimension and the second data dimension.

3. The computer-implemented method of claim 2, further comprising:
generating, based at least in part on the second data dimension, a third visualization; and
rendering, for display on the mobile computing device, the third visualization.

4. The computer-implemented method of claim 3, further comprising:
displaying, at a same instance in time, the first visualization and the third visualization.

5. The computer-implemented method of claim 4, wherein generation of the third visualization is exclusive of the first data dimension.

6. The computer-implemented method of claim 1, further comprising modifying the first visualization to generate a second visualization based at least in part on the selected candidate interpretation.

7. The computer-implemented method of claim 1, wherein the first data dimension is a column within a table within the database.

8. The method according to claim 1, wherein the database is associated with one or more enterprise applications.

9. The method according to claim 1, wherein the user interaction comprises a user input to adjust an appearance, a behavior, a type, or a property of the first visualization.

10. The method according to claim 1, wherein a user interface card of the scrollable list of the plurality of user interface cards comprises at least one of an analytic card, a detailed information card, an email card, a calendar card, a report card, a trending-data card, a shared card, an activity summary card, and a custom card.

11. The method according to claim 1, wherein a user interface card is a dynamically updating card that updates in real time to reflect changing context.

12. A system comprising:
one or more processors; and
a memory accessible to the one or more processors, the memory comprising one or more instructions that, upon execution by the one or more processors, causes the one or more processors to:
receive, on a query field displayed on a mobile computing device, a natural language input comprising a first term, wherein the natural language input is a natural language expression based at least in part on a human language input;
retrieve, from a database of an enterprise associated with the mobile computing device, a first data dimension associated with the first term that is the natural language input;
generate, based at least in part on the first data dimension associated with the first term of the natural language input, a first visualization, wherein the first visualization is an interactive visualization that is displayed with a user interface control to enable a user interaction with one or more user interface cards displayed in the first visualization on the mobile computing device, wherein the first visualization comprises a scrollable list of a plurality of user interface cards that display on a display of the mobile computing device a plurality of different categories of content associated with enterprise data;
render for display on the mobile computing device, the first visualization;
retrieve, based at least in part on the first term, a first set of candidate interpretations associated with the first term, the first set of candidate interpretations being associated with the first data dimension;
render for display on the mobile computing device, at least a portion of the first set of candidate interpretations; and
receive a selection a candidate interpretation from the at least a portion of the first set of candidate interpretations.

13. The system of claim 12, wherein the one or more instructions, upon execution by the one or more processors, further causes the one or more processors to:
retrieve, from the database, a second data dimension associated with a second term in the natural language input; and
modify the first visualization to generate a second visualization based at least in part on the first data dimension and the second data dimension.

14. The system of claim 13, wherein the one or more instructions, upon execution by the one or more processors, further causes the one or more processors to:
generate, based at least in part on the second data dimension, a third visualization; and
render for display on the mobile computing device, the third visualization.

15. The system of claim 14, wherein the one or more instructions, upon execution by the one or more processors, further causes the one or more processors to display, at a same instance in time, the first visualization and the third visualization.

16. The system of claim 15, wherein generation of the third visualization is exclusive of the first data dimension.

17. The system of claim 12, wherein the one or more instructions, upon execution by the one or more processors, further causes the one or more processors to:

modify the first visualization to generate a second visualization based at least in part on the selected candidate interpretation.

18. The system of claim 12, wherein the first data dimension is a column within a table within the database.

19. A non-transitory computer readable medium storing one or more instructions that, upon execution by one or more processors, causes the one or more processors to:

receive, on a query field displayed on a mobile computing device, a natural language input comprising a first term, wherein the natural language input is a natural language expression based at least in part on a human language input;

retrieve, from a database of an enterprise associated with the mobile computing device, a first data dimension associated with the first term that is the natural language input;

generate, based at least in part on the first data dimension associated with the first term of the natural language input, a first visualization, wherein the first visualization is an interactive visualization that is displayed with a user interface control to enable a user interaction with one or more user interface cards displayed in the first visualization on the mobile computing device, wherein the first visualization comprises a scrollable list of a plurality of user interface cards that display on a display of the mobile computing device a plurality of different categories of content associated with enterprise data;

render for display on the mobile computing device, the first visualization;

retrieve, based at least in part on the first term, a first set of candidate interpretations associated with the first term, the first set of candidate interpretations being associated with the first data dimension;

render for display on the mobile computing device, at least a portion of the first set of candidate interpretations; and receive a selection a candidate interpretation from the at least a portion of the first set of candidate interpretations.

20. The non-transitory computer readable medium of claim 19, wherein the one or more instructions, upon execution by the one or more processors, further causes the one or more processors to:

modify the first visualization to generate a second visualization based at least in part on the selected candidate interpretation.

* * * * *